United States Patent
Mizushima et al.

(10) Patent No.: US 11,999,838 B2
(45) Date of Patent: *Jun. 4, 2024

(54) RESIN ADDITIVE COMPOSITION, THERMOPLASTIC RESIN COMPOSITION, AND MOLDED ARTICLE THEREOF

(71) Applicant: ADEKA CORPORATION, Tokyo (JP)

(72) Inventors: Hiroaki Mizushima, Saitama (JP); Yuri Okamoto, Saitama (JP); Takahiro Horikoshi, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/953,887

(22) Filed: Sep. 27, 2022

(65) Prior Publication Data

US 2023/0073126 A1 Mar. 9, 2023

Related U.S. Application Data

(63) Continuation of application No. 16/081,807, filed as application No. PCT/JP2017/008266 on Mar. 2, 2017, now Pat. No. 11,492,461.

(30) Foreign Application Priority Data

| Mar. 2, 2016 | (JP) | 2016-040283 |
| Feb. 28, 2017 | (JP) | 2017-037165 |
| Feb. 28, 2017 | (JP) | 2017-037166 |
| Feb. 28, 2017 | (JP) | 2017-037167 |
| Feb. 28, 2017 | (JP) | 2017-037168 |
| Feb. 28, 2017 | (JP) | 2017-037169 |

(51) Int. Cl.
*C08K 5/521* (2006.01)
*C08F 10/06* (2006.01)
(Continued)

(52) U.S. Cl.
CPC ............ *C08K 5/521* (2013.01); *C08F 10/06* (2013.01); *C08F 210/02* (2013.01);
(Continued)

(58) Field of Classification Search
CPC ......... C08K 5/521; C08K 3/34; C08K 5/098; C08K 5/527; C08K 13/02; C08L 31/00;
(Continued)

(56) References Cited

U.S. PATENT DOCUMENTS 5,108,892 A 4/1992 Chiolle et al.
5,342,888 A 8/1994 Kimura et al.
(Continued)

FOREIGN PATENT DOCUMENTS

CN 102137893 A 7/2011
CN 102850577 A 1/2013
(Continued)

OTHER PUBLICATIONS

AZoM, "Polyolefin Elastomer-Properties and Applications of Polyolefins Elastomers (POE)", Publication Date is May 2, 2003 (Year: 2003).*
AZoM, "Polyolefin Elastomer-Properties and Applications of Polyolefins Elastomers (POE)", Publication Date is May 2, 2003.
Extended European Search Report for European Application No. 17760125.9, dated Oct. 31, 2019.
International Search Report for PCT/JP2017/008266 (PCT/ISA/210) mailed on May 30, 2017.
Japanese Notice of Reasons for Refusal for Japanese Application No. 2018-119272, dated Nov. 17, 2020, with an English translation.
Korean Office Action for Korean Application No. 10-2018-7028588, dated Oct. 21, 2020.
Office Action and Search Report for Russian Federation Application No. 2018134327, mailed on Mar. 13, 2020, including an English translation of the Office Action and Search Report.
Taiwanese Office Action and Search Report for Taiwanese Application No. 106106853, dated Nov. 20, 2020.
(Continued)

*Primary Examiner* — Deve V Hall
(74) *Attorney, Agent, or Firm* — Birch, Stewart, Kolasch & Birch, LLP

(57) ABSTRACT

Provided are a resin additive composition which is excellent in fluidity and can impart excellent physical properties to a thermoplastic resin, a thermoplastic resin composition, and a molded article thereof.

A resin additive composition is composed of a phosphoric acid ester compound (A) represented by the following general formula (1):

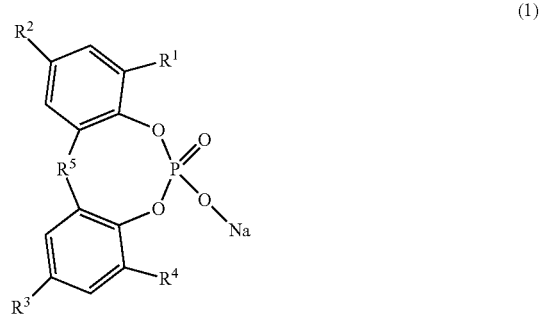

(1)

(in the formula (1), $R^1$ to $R^4$ each independently represent a hydrogen atom or a linear or branched alkyl group having 1 to 9 carbon atoms, and $R^5$ represents an alkylidene group having 1 to 4 carbon atoms) and a fatty acid sodium salt (B) represented by the following general formula (2):

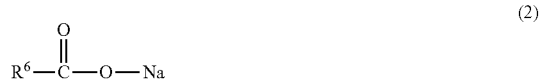

(2)

(in the formula (2), $R^6$ represents a group introduced from an aliphatic organic acid having 7 to 30 carbon atoms), and the mass ratio of (B)/(A) is 0.55 to 2.0.

5 Claims, No Drawings

(51) Int. Cl.
  *C08F 210/02* (2006.01)
  *C08F 220/10* (2006.01)
  *C08K 3/34* (2006.01)
  *C08K 5/098* (2006.01)
  *C08K 5/524* (2006.01)
  *C08K 5/527* (2006.01)
  *C08K 13/02* (2006.01)
  *C08L 23/00* (2006.01)
  *C08L 31/00* (2006.01)
  *C08L 101/00* (2006.01)

(52) U.S. Cl.
  CPC .............. *C08F 220/10* (2013.01); *C08K 3/34* (2013.01); *C08K 5/098* (2013.01); *C08K 5/524* (2013.01); *C08K 5/527* (2013.01); *C08K 13/02* (2013.01); *C08L 23/00* (2013.01); *C08L 31/00* (2013.01); *C08L 101/00* (2013.01); *C08K 2003/343* (2013.01); *C08K 2201/014* (2013.01)

(58) Field of Classification Search
  CPC ........ C08L 101/00; C08L 23/00; C08F 10/06; C08F 210/02; C08F 220/10
  USPC ......................................................... 524/394
  See application file for complete search history.

(56) References Cited

U.S. PATENT DOCUMENTS

| | | | |
|---|---|---|---|
| 5,563,194 | A | 10/1996 | Watanabe et al. |
| 11,492,461 | B2 * | 11/2022 | Mizushima ............ C08K 5/526 |
| 2003/0125432 | A1 | 7/2003 | Yukino et al. |
| 2006/0189744 | A1 * | 8/2006 | Tse ......................... C08L 23/20 524/451 |
| 2007/0054996 | A1 | 3/2007 | Tobita et al. |
| 2010/0093899 | A1 | 4/2010 | Saitou et al. |
| 2010/0204374 | A1 * | 8/2010 | Tanji ....................... C08L 23/12 524/117 |
| 2011/0218279 | A1 | 9/2011 | Urushihara et al. |

FOREIGN PATENT DOCUMENTS

| | | | |
|---|---|---|---|
| JP | S63-69853 | A | 3/1988 |
| JP | H03-81368 | A | 4/1991 |
| JP | 5-140466 | A | 6/1993 |
| JP | H05-156078 | A | 6/1993 |
| JP | H07-48473 | A | 2/1995 |
| JP | H08-59921 | A | 3/1996 |
| JP | H08-92405 | A | 4/1996 |
| JP | H08-316508 | A | 11/1996 |
| JP | H09-71695 | A | 3/1997 |
| JP | H09-137010 | A | 3/1997 |
| JP | H09-118793 | A | 5/1997 |
| JP | H08-269262 | A | 10/1998 |
| JP | H11-228753 | A | 8/1999 |
| JP | 2003-041073 | A | 2/2003 |
| JP | 2003-313444 | A | 11/2003 |
| JP | 2005-054036 | A | 3/2005 |
| JP | 2013-133364 | A | 7/2013 |
| JP | 2013-256628 | A | 12/2013 |
| JP | 2014-095042 | A | 5/2014 |
| JP | 2014-095043 | A | 5/2014 |
| JP | 2014-095045 | A | 5/2014 |
| JP | 2014-095046 | A | 5/2014 |
| JP | 2014-095044 | A | 8/2014 |
| JP | 2015-086246 | A | 5/2015 |
| KR | 10-1488858 | B1 | 2/2015 |
| RU | 2002772 | C1 | 11/1993 |
| SU | 385983 | A1 | 6/1973 |
| SU | 430121 | A1 | 5/1974 |
| SU | 527459 | A1 | 9/1976 |

OTHER PUBLICATIONS

US Notice of Allowance for U.S. Appl. No. 16/081,807 dated Jun. 28, 2022.
US Office Action for U.S. Appl. No. 16/081,807 dated Dec. 10, 2019.
US Office Action for U.S. Appl. No. 16/081,807 dated Dec. 8, 2021.
US Office Action for U.S. Appl. No. 16/081,807 dated Mar. 26, 2020.
US Office Action for U.S. Appl. No. 16/081,807 dated May 27, 2021.
US Office Action for U.S. Appl. No. 16/081,807 dated Sep. 16, 2020.
Written Opinion of the International Searching Authority for PCT/JP2017/008266 (PCT/ISA/237) mailed on May 30, 2017.
Chinese Office Action for corresponding Chinese Application No. 201780014747.4, dated Mar. 22, 2024, with partial English translation.
Zhou, "Plastic Packaging Materials Forming and Color Printing Process," China Logistics Publishing House, 1st Edition, Sep. 1997, pp. 209-212.

* cited by examiner

RESIN ADDITIVE COMPOSITION, THERMOPLASTIC RESIN COMPOSITION, AND MOLDED ARTICLE THEREOF

CROSS-REFERENCE TO RELATED APPLICATIONS

This application is a Continuation of copending application Ser. No. 16/081,807 filed on Aug. 31, 2018, which is the U.S. National Phase of PCT/JP2017/008266, filed Mar. 2, 2017, and which claims priority under 35 U.S.C. § 119(a) to Application No. 2016-040283 filed in Japan on Mar. 2, 2016, Application No. 2017-037165 filed in Japan on Feb. 28, 2017, Application No. 2017-037166 filed in Japan on Feb. 28, 2017, Application No. 2017-037167 filed in Japan on Feb. 28, 2017, Application No. 2017-037168 filed in Japan on Feb. 28, 2017, and Application No. 2017-037169 filed in Japan on Feb. 28, 2017, the entire contents of all of which are expressly incorporated by reference into the present application.

TECHNICAL FIELD

The present invention relates to a resin additive composition, a thermoplastic resin composition (hereinafter, also simply referred to as "resin composition"), and a molded article thereof, and specifically to a resin additive composition which is excellent in fluidity and can impart excellent physical properties to a thermoplastic resin, a thermoplastic resin composition, and a molded article thereof.

BACKGROUND ART

The thermoplastic resin is widely utilized for a variety of molded articles such as building materials, automobile materials, household electric and electronic materials, textile materials, packaging materials, agricultural materials, housing materials for home appliances, houseware goods, films, sheets and structural parts depending on a variety of physical properties such as molding processability and low specific gravity. In particular, a polyolefin resin such as polyethylene, polypropylene, or polybutene-1 has an advantage that molding processability, heat resistance, mechanical properties, and low specific gravity are excellent, these resins are widely used for general goods, medical instruments, food packaging materials, automobile materials, or the like. However, in order to be used widely, it is necessary to satisfy physical properties required for such a polyolefin resin.

It is known that a polyolefin resin can control crystallization during molding processing of a polyolefin resin by adding a crystal nucleating agent or a composition containing a specific compound. In general, a polyolefin resin having a promoted crystallization action can obtain an advantage such as shortening of molding cycle time, improvement of transparency of a molded article of a polyolefin resin composition, or improvement of heat resistance and physical properties.

Known examples of the crystal nucleating agent for promoting crystallization action of a polyolefin resin include a metal carboxylate such as sodium benzoate, aluminum 4-tert-butylbenzoate, sodium adipate or disodium bicyclo[2.2.1]heptane-2,3-dicarboxylate, a phosphoric ester compound such as sodium bis(4-tert-butylphenyl)phosphate, sodium 2,2'-methylenebis(4,6-di-tert-butylphenyl)phosphate, or lithium-2,2'-methylenebis(4,6-di-tert-butylphenyl) phosphate, a polyhydric alcohol derivative such as dibenzylidene sorbitol, bis(methylbenzylidene)sorbitol, bis(3,4-dimethylbenzylidene)sorbitol, bis(p-ethylbenzylidene) sorbitol, or bis(dimethylbenzylidene)sorbitol, and an amide compound such as N,N',N"-tris[2-methylcyclohexyl]-1,2,3-propane tricarboxamide, N,N',N"-tricyclohexyl-1,3,5-benzenetricarboxamide, N,N'-dicyclohexylnaphthalenedicarboxamide, or 1,3,5-tri(2,2-dimethylpropanamido)benzene.

Among these compounds, a phosphoric acid ester compound is known as a compound having a great effect of improving the transparency and physical properties of a polyolefin resin and an effect of improving a crystallization action of a polyolefin resin. For example, Patent Document 1 proposes that a cyclic organophosphate basic aluminum salt and an alkali metal compound such as an alkali metal carboxylate, an alkali metal μ-diketonate, or an alkali metal salt β-ketoacetate are added to polyolefin or polyethylene terephthalate. Patent Document 2 proposes a nucleating agent composition containing an acidic phosphate metal salt and an aliphatic organic acid metal salt, and it has been shown to improve transparency and flexural modulus of a polyolefin.

Further, Patent Document 3 proposes a nucleating agent composition comprising a lithium salt of a cyclic phosphate ester, a lithium salt of an aliphatic organic acid, and an aliphatic organic acid salt composed of a divalent metal atom, and it has been shown to improve transparency for a polyolefin resin. Furthermore, Patent Documents 4 to 9 propose a polyolefin resin composition obtained by adding a cyclic phosphate ester compound having a hydroxy group at the time of olefin polymerization, further adding a fatty acid metal salt, an antioxidant, and the like after polymerization, followed by melt-kneading. Patent Document proposes a composition containing an aromatic phosphate metal salt and a metal salt of Group I of the periodic table of a higher fatty acid.

Meanwhile, in order to improve the impact resistance of a thermoplastic resin, a thermoplastic elastomer is also used in combination. However, when a nucleating agent is added, there is a problem that the impact resistance is lowered. To solve such a problem, for example, Patent Document 11 proposes that an ethylene-propylene rubber and an ethylene-based polymer are coordinated to a specific polypropylene. Patent Document 12 proposes a combination of a specific polypropylene-based resin and high-density polyethylene subjected to ionizing radiation treatment. Furthermore, Patent Document 13 proposes to use a nucleating agent comprising a partial metal salt of a rosin acid in a resin composition comprising a propylene polymer and an elastomer. Furthermore, Patent Document 14 proposes to use a partially crosslinked composition of an ethylene copolymer comprising an ethylene/α-olefin copolymer and surface vinylsilane-modified inorganic fine particles as a modifier.

Many thermoplastic resins are flammable substances, and it is essential that such resins be made flame retardant depending on the application. As a flame retarding method, for example, Patent Document 15 proposes a method of adding an inorganic hydroxide such as magnesium hydroxide, basic magnesium carbonate, hydrotalcite, aluminum hydroxide, or the like to an ethylene copolymer. Patent Document 16 proposes a flame-retardant polymer composition in which 80 to 300 parts by mass of an inorganic hydroxide flame retardant is blended with 100 parts by weight of a copolymer of two types of ethylene-α-olefin. Patent Document 17 proposes a polypropylene molding material blended with 0.1 to 0.5 parts by mass of a nucleating agent and 4 to 6% by mass of a flame retardant and a flame retardant aid based on 100 parts by mass of homopolypropylene.

Furthermore, when a thermoplastic resin is subjected to the action of heat, oxygen, light, or the like, it is known that molecular chain scission and molecular cross-linking are accompanied by deterioration of resin physical properties and deterioration of appearance such as coloration or discoloration, and markedly impair the commercial value. In order to solve such problems, stabilization of the thermoplastic resin composition has been carried out by adding a variety of antioxidants/stabilizers such as phenolic antioxidants, phosphorus antioxidants, thioether antioxidants, lactone stabilizers, hydroxyamine antioxidants, vitamin E antioxidants, hindered amine stabilizers, or ultraviolet absorbers and melt-kneading using a processing machine such as an extruder.

Among these, it is known that a hindered amine compound or ultraviolet absorber imparts a stable light stabilizing effect to an olefinic resin over a long period of time, for example, Patent Document 18 proposes a polypropylene composition in which a hindered amine compound and a nucleating agent are blended with polypropylene.

A phosphorus antioxidant having a phosphite structure is known as a compound having a particularly high effect of preventing discoloration and may be used in combination with other stabilizers to exhibit further synergistic effects and is widely used.

RELATED ART DOCUMENTS

Patent Documents

Patent Document 1: Japanese Unexamined Patent Application Publication No. H07-48473;
Patent Document 2: Japanese Unexamined Patent Application Publication No. 2003-313444;
Patent Document 3: Japanese Unexamined Patent Application Publication No. 2005-54036;
Patent Document 4: Japanese Unexamined Patent Application Publication No. 2013-256628;
Patent Document 5: Japanese Unexamined Patent Application Publication No. 2014-95042;
Patent Document 6: Japanese Unexamined Patent Application Publication No. 2014-95043;
Patent Document 7: Japanese Unexamined Patent Application Publication No. 2014-95044;
Patent Document 8: Japanese Unexamined Patent Application Publication No. 2014-95045;
Patent Document 9: Japanese Unexamined Patent Application Publication No. 2014-95046;
Patent Document 10: Japanese Unexamined Patent Application Publication No. S63-69853;
Patent Document 11: Japanese Unexamined Patent Application Publication No. H08-059921;
Patent Document 12: Japanese Unexamined Patent Application Publication No. H08-269262;
Patent Document 13: Japanese Unexamined Patent Application Publication No. H09-071695;
Patent Document 14: Japanese Unexamined Patent Application Publication No. H11-228753;
Patent Document 15: Japanese Unexamined Patent Application Publication No. H08-316508;
Patent Document 16: Japanese Unexamined Patent Application Publication No. H09-137010;
Patent Document 17: Japanese Unexamined Patent Application Publication No. 2003-41073; and
Patent Document 18: Japanese Unexamined Patent Application Publication No. H09-118793.

SUMMARY OF THE INVENTION

Problems to be Solved by the Invention

However, although a variety of nucleating agents have been studied so far, the performance required for a polyolefin-based resin becomes higher, and a nucleating agent excellent in further improvement of the physical properties is demanded. A phosphoric acid ester compound has poor fluidity as a powder and has a property of easily adhering to a wall surface of a blending tank, and thus improvement of fluidity is required from the viewpoints of transportability, workability, and metering properties.

In these Patent Documents 11 to 14, since the applicable resin is limited, the range of use is also limited. A nucleating agent effect was insufficient and not satisfactory, and the rigidity was insufficient. As described above, it is difficult for a conventional resin composition to satisfy impact resistance and rigidity to a high degree, and there is room for further improvement at present.

Furthermore, along with expansion of applications, the physical properties required for molded articles also become high, nucleating agents capable of exerting further crystallization promoting action and imparting other properties are demanded. It is known that fatty acid metal salts are used as dispersants for nucleating agents. However, in these Documents, there is no description suggesting that a resin additive composition prepared by adjusting a phosphate ester compound and a fatty acid sodium salt at a specific ratio can impart an excellent nucleating agent effect. A phosphorus antioxidant is an additive excellent in discoloration preventing effect, and in a molding method with a long thermal history such as film molding or bottle molding, an effect of preventing discoloration may be insufficient.

However, when the amount of such a phosphorus antioxidant is increased or a large number of other additives are used, there is a problem that the inherent physical properties of a resin are impaired.

Accordingly, an object of the present invention is to provide a resin additive composition which is excellent in fluidity and can impart excellent physical properties to a thermoplastic resin, a thermoplastic resin composition, and a molded article thereof. Another object of the present invention is to provide a thermoplastic resin composition which can provide a molded article highly satisfying both excellent impact resistance and high rigidity, and a molded article thereof.

Still another object of the present invention is to provide a thermoplastic resin composition having excellent crystallization action and capable of providing a molded article having an effect of preventing discoloration due to thermal history and a molded article thereof.

Means for Solving the Problems

As a result of intensive studies to solve the above problems, the inventors of the present invention have found that the above-described problems can be solved by including a fatty acid sodium salt at a specific ratio for a specific nucleating agent, thereby completing the present invention.

Specifically, the resin additive composition of the present invention is characterized in that a phosphoric acid ester compound (A) represented by the following general formula (1):

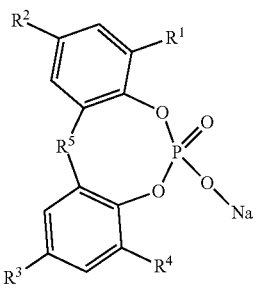

(1)

(in the formula (1), $R^1$ to $R^4$ each independently represent a hydrogen atom or a linear or branched alkyl group having 1 to 9 carbon atoms, and $R^5$ represents an alkylidene group having 1 to 4 carbon atoms) and a fatty acid sodium salt (B) represented by the following general formula (2):

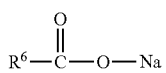

(2)

(in the formula (2), $R^6$ represents a group introduced from an aliphatic organic acid having 7 to 30 carbon atoms), are in the range of (B)/(A)=0.55 to 2.0 by mass ratio.

The thermoplastic resin composition of the present invention is characterized in that the resin additive composition of the present invention is contained in such a manner that the phosphoric acid ester compound (A) represented by the general formula (1) is 0.001 to 10 parts by mass based on 100 parts by mass of a thermoplastic resin.

In the resin composition of the present invention, the thermoplastic resin is preferably a polyolefin resin. In the resin composition of the present invention, it is also preferable to further contain 1 to 80 parts by mass of a thermoplastic elastomer (C) and 1 to 80 parts by mass of a filler (D). Further, in the resin composition of the present invention, the thermoplastic elastomer (C) is preferably a copolymer of ethylene and an α-olefin or a copolymer of ethylene and a vinyl ester. Further, in the resin composition of the present invention, it is preferable to further contain 0.01 to 10 parts by mass of a phosphite compound (E) represented by the following general formula (3):

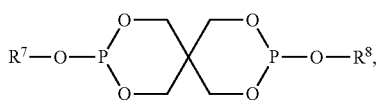

(3)

(in the formula (3), $R^7$ and $R^8$ each independently represent an alkyl group having 1 to 40 carbon atoms or an aryl group having 6 to 40 carbon atoms).

The molded article of the present invention is characterized by using the thermoplastic resin composition of the present invention.

Effects of the Invention

According to the present invention, it is possible to provide a resin additive composition which is excellent in fluidity and can impart excellent physical properties to a thermoplastic resin, a thermoplastic resin composition, and a molded article thereof.

According to the present invention, it is possible to provide a thermoplastic resin composition which can provide a molded article highly satisfying both excellent impact resistance and rigidity, and a molded article thereof.

Further, according to the present invention, it is possible to provide a thermoplastic resin composition which can provide a molded article having an excellent crystallization action and an excellent effect of preventing discoloration due to thermal history, and a molded article thereof.

MODE FOR CARRYING OUT THE INVENTION

Hereinafter, embodiments of the present invention will be described in detail.

The resin additive composition of the present invention is a resin additive composition comprising a phosphoric acid ester compound (A) represented by the general formula (1) above and a fatty acid sodium salt (B) represented by the general formula (2) above, and the mass ratio of (B)/(A) is 0.55 to 2.0. By satisfying such requirements, a resin additive composition can be obtained which can impart excellent physical properties to a thermoplastic resin.

<(A) Phosphoric Acid Ester Compound Represented by General Formula (1)>

The phosphate compound in the resin additive composition of the present invention is represented by the following formula (1):

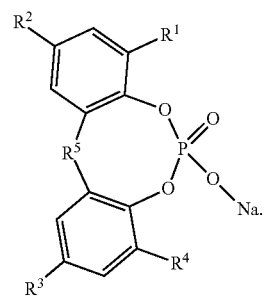

(1)

Examples of the linear or branched alkyl group having 1 to 9 carbon atoms represented by $R^1$ to $R^4$ in the general formula (1) include a methyl group, an ethyl group, a propyl group, an isopropyl group, a butyl group, a sec-butyl group, a tert-butyl group, an isobutyl group, an amyl group, a tert-amyl group, a hexyl group, a heptyl group, an octyl group, an isooctyl group, a tert-octyl group, a 2-ethylhexyl group, a nonyl group, and an isononyl group, and $R^1$ to $R^4$ are preferably tert-butyl group.

Examples of the alkylidene group having 1 to 4 carbon atoms represented by $R^5$ in the general formula (1) include a methylene group, an ethylidene group, a propylidene group, and a butylidene group, and in the resin composition of the present invention, a methylene group is preferred.

Specific examples of the compound represented by the general formula (1) include compounds below, however, the resin additive composition of the present invention is not limited to these compounds:

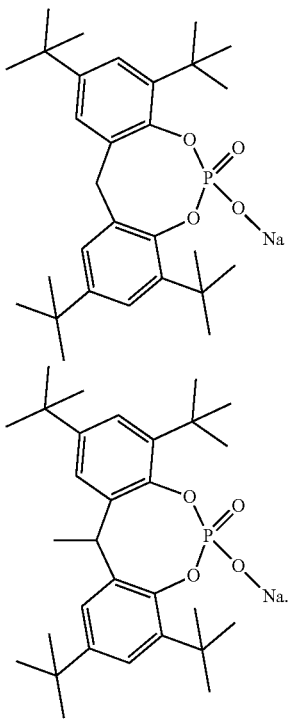

In the present invention, sodium [2,2'-methylenebis(4,6-di-tert-butylphenyl)phosphate] is preferable because the compound can impart excellent physical properties to a polyolefin resin.

<(B) Fatty Acid Sodium Represented by General Formula (2)>

A fatty acid sodium in the resin additive composition of the present invention is represented by the following formula (2):

$R^6$ in the general formula (2) is a group introduced from an aliphatic organic acid having 7 to 30 carbon atoms, and examples of the group introduced from an aliphatic organic acid having 7 to 30 carbon atoms include a hydrocarbon group such as an alkyl group, an alkynyl group, an alkenyl group, and an alkyl group having two or more unsaturated bonds introduced therein, each having 7 to 30 carbon atoms. These may be substituted with a hydroxyl group and may be branched.

Specific examples thereof include a saturated fatty acid such as a capric acid, a 2-ethylhexanoic acid, an undecylic acid, a lauric acid, a tridecylic acid, a myristic acid, a pentadecylic acid, a palmitic acid, a margaric acid, a stearic acid, a nonadecylic acid, an arachidic acid, a heicosylic acid, a behenic acid, a tricosylic acid, a lignoceric acid, a cerotic acid, a montanic acid, or a melissic acid, a linear unsaturated fatty acid such as 4-decenoic acid, 4-dodecenoic acid, palmitoleic acid, α-linolenic acid, linoleic acid, γ-linolenic acid, stearidonic acid, petroselinic acid, oleic acid, elaidic acid, a vaccenic acid, an eicosapentaenoic acid, a docosapentaenoic acid, or a docosahexaenoic acid, and an aromatic fatty acid such as a trimesic acid. In the resin additive composition of the present invention, an aliphatic group having 10 to 21 carbon atoms is preferable, and in particular, a saturated fatty acid such as a lauric acid, a myristic acid, a stearic acid, a palmitic acid, or a 12-hydroxystearic acid is preferable because an effect of the resin additive composition of the present invention becomes remarkable.

In the resin additive composition of the present invention, the mass ratio of the fatty acid sodium salt (B) represented by the general formula (2) to the phosphoric acid ester compound (A) represented by the general formula (1), (B)/(A), is preferably 0.55 to 2.0, and more preferably 0.67 to 1.50. When the ratio of (B) to (A) is less than 0.55, the fluidity may be poor, and when the ratio exceeds 2.00, the nucleating agent effect may be poor.

Although the resin additive composition of the present invention is not limited by particle state such as particle size or particle size distribution, it is known that the phosphoric acid ester compound (A) represented by the general formula (1) is improved in dispersibility into a resin as long as the particle size is fine, and the volume average particle size is preferably 20 μm or less, and more preferably 10 m or less.

Next, the thermoplastic resin composition of the present invention will be described.

A thermoplastic resin composition in one suitable embodiment of the present invention contains the resin additive composition of the present invention in such a manner that the phosphoric acid ester compound (A) represented by the general formula (1) is 0.001 to 10 parts by mass based on 100 parts by mass of the thermoplastic resin.

A resin that can be used in the resin composition of the present invention is not limited as long as the resin is a thermoplastic resin, and from the viewpoint of the remarkable effect of the present invention, a polyolefin resin, a styrene resin, a polyester resin, a polyether resin, a polycarbonate resin, a polyamide resin, or a halogen-containing resin is preferable, and the polyolefin resin is more preferable.

Examples of the polyolefin resin include an α-olefin polymer such as polyethylene, low density polyethylene, linear low density polyethylene, high density polyethylene, crosslinked polyethylene, ultrahigh molecular weight polyethylene, polypropylene, homopolypropylene, random copolymer polypropylene, block copolymer polypropylene, isotactic polypropylene, syndiotactic polypropylene, hemiisotactic polypropylene, polybutene, cycloolefin polymer, stereoblock polypropylene, poly-3-methyl-1-butene, poly-3-methyl-1-pentene, or poly-4-methyl-1-pentene, an α-olefin copolymer such as ethylene-propylene block or random copolymer, impact copolymer polypropylene, ethylene-methyl methacrylate copolymer, ethylene-methyl acrylate copolymer, ethylene-ethyl acrylate copolymer, ethylene-butyl acrylate copolymer, or ethylene-vinyl acetate copolymer, polyfluoroolefin, and polyolefin thermoplastic elastomer, and a copolymer of two or more thereof may be used.

Examples of the styrene-based resin include a vinyl group-containing aromatic hydrocarbon alone and a copolymer of a vinyl group-containing aromatic hydrocarbon and another monomer (for example, maleic anhydride, phenyl maleimide, a (meth)acrylic acid ester, butadiene, or (meth)acrylonitrile), and examples thereof include a thermoplastic resin such as a polystyrene (PS) resin, a high impact polystyrene (HIPS), an acrylonitrile-styrene (AS) resin, an acrylonitrile-butadiene-styrene (ABS) resin, a methyl methacrylate-butadiene-styrene (MBS) resin, a heat resistant ABS resin, an acrylonitrile-styrene (AAS) resin, a styrene-maleic anhydride (SMA) resin, a methacrylate-styrene (MS)

resin, a styrene-isoprene-styrene (SIS) resin, an acrylonitrile-ethylene propylene rubber-styrene (AES) resin, a styrene-butadiene-butylene-styrene (SBBS) resin, or a methyl methacrylate-acrylonitrile-butadiene-styrene (MABS) resin, and a hydrogenated styrene elastomer resin, obtained by hydrogenating double bonds of the above butadiene or isoprene, such as a styrene-ethylene-butylene-styrene (SEBS) resin, a styrene-ethylene-propylene-styrene (SEPS) resin, a styrene-ethylene-propylene (SEP) resin, or a styrene-ethylene-ethylene-propylene-styrene (SEEPS) resin.

Examples of the polyester resin include a polyalkylene terephthalate such as polyethylene terephthalate, polybutylene terephthalate, or polycyclohexane dimethylene terephthalate; an aromatic polyester such as a polyalkylene naphthalate such as polyethylene naphthalate or polybutylene naphthalate; a linear polyester such as polytetramethylene terephthalate; and a degradable aliphatic polyester such as polyhydroxybutyrate, polycaprolactone, polybutylene succinate, polyethylene succinate, polylactic acid, polymalic acid, polyglycolic acid, polydioxane, poly(2-oxetanone).

Examples of the polyether resin include polyacetal, polyphenylene ether, polyether ketone, polyether ether ketone, polyether ketone ketone, polyether ether ketone ketone, polyether sulfone, and polyether imide.

Examples of the polycarbonate resin include polycarbonate, polycarbonate/ABS resin, and branched polycarbonate.

Examples of the polyamide resin include a polymer such as ε-caprolactam (nylon 6), undecane lactam (nylon 11), lauryllactam (nylon 12), aminocaproic acid, enantolactam, 7-aminoheptanoic acid, 11-aminoundecanoic acid, 9-aminononanoic acid, α-pyrrolidone, or α-piperidone; a copolymer obtained by copolymerizing a diamine such as hexamethylene diamine, nonanediamine, nonane methylene diamine, methyl pentadiamine, undecane methylene diamine, dodecane methylene diamine, or metaxylene diamine and a carboxylic acid compound such as a dicarboxylic acid such as adipic acid, sebacic acid, terephthalic acid, isophthalic acid, dodecanedicarboxylic acid, or glutaric acid; and a mixture of these polymers or copolymers. Examples thereof include an aramid resin such as trade name "Kevlar®" manufactured by Du Pont, trade name "Nomex®" manufactured by Du Pont, trade names "TWARON®" and "CONEX®" manufactured by TEIJIN LIMITED.

Examples of the halogen-containing resin include polyvinyl chloride, polyvinylidene chloride, chlorinated polyethylene, chlorinated polypropylene, polyvinylidene fluoride, chlorinated rubber, vinyl chloride-vinyl acetate copolymer, vinyl chloride-ethylene copolymer, vinyl chloride-vinylidene chloride copolymer, vinyl chloride-vinylidene chloride-vinyl acetate terpolymer, vinyl chloride-acrylate copolymer, vinyl chloride-maleic acid ester copolymer, and vinyl chloride-cyclohexyl maleimide copolymer.

Examples of the thermoplastic resin include a thermoplastic resin such as a petroleum resin, a coumarone resin, polyvinyl acetate, an acrylic resin, polymethyl methacrylate, polyvinyl alcohol, polyvinyl formal, polyvinyl butyral, polyphenylene sulfide, polyurethane, a cellulose resin, a polyimide resin, polysulfone, a liquid crystal polymer, and a blend thereof.

The thermoplastic resin may be an elastomer such as isoprene rubber, butadiene rubber, acrylonitrile-butadiene copolymer rubber, styrene-butadiene copolymer rubber, fluororubber, silicone rubber, polyester elastomer, nitrile elastomer, nylon elastomer, vinyl chloride elastomer, a polyamide elastomer or a polyurethane elastomer, or may be used in combination.

In the thermoplastic resin composition of the present invention, these thermoplastic resins may be used singly, or in combination of two or more kinds thereof. These thermoplastic resins may be alloyed. These thermoplastic resins can be used regardless of the molecular weight, the degree of polymerization, the density, the softening point, the proportion of insoluble matter in solvent, the degree of stereoregularity, the presence or absence of catalyst residue, the kind and blending ratio of raw material monomer, the type of polymerization catalyst (for example, Ziegler catalyst or metallocene catalyst), or the like.

The method of blending the component (A) and the component (B) in the resin additive composition of the present invention into a thermoplastic resin is not particularly limited, and examples of commonly used methods include a method of dry-blending each component with thermoplastic resin powder or pellet, a method in which a master batch containing any of the respective components in a high concentration is prepared and added to a thermoplastic resin, and a method in which the resin additive composition of the present invention is processed into a pellet form and added to a thermoplastic resin. The components may be simultaneously added to an olefin resin or may be added separately.

The thermoplastic resin can be produced in pellet form by the following processing method, for example, by heating a mixture obtained by mixing the resin additive composition of the present invention and a phenolic antioxidant and other additives contained as necessary, and mixing in the presence of a phenolic antioxidant in a molten state. Processing conditions, processing machines, and the like are not limited in any way, and well-known general processing methods and processing equipment can be used. Specific manufacturing methods thereof include a disk pelleter method and an extrusion method.

In the resin composition of the present invention, regarding the blending amount of the resin additive composition to the thermoplastic resin, the phosphate ester compound (A) represented by the general formula (1) is, based on 100 parts by mass of the thermoplastic resin, 0.001 to 10 parts by mass, and more preferably 0.006 to 5 parts by mass. When the blending amount is less than 0.001 parts by mass, the nucleating agent effect may not be obtained, and when the amount exceeds 10 parts by mass, dispersion in a thermoplastic resin becomes difficult, which may adversely affect the physical properties and appearance of a molded article.

In the resin additive composition or thermoplastic resin composition of the present invention, known a resin additive (for example, a phenolic antioxidant, a phosphorus antioxidant, a thioether antioxidant, an ultraviolet absorber, a hindered amine compound, a nucleating agent different from the phosphoric acid ester compound (A) represented by the general formula (1), a flame retardant, a flame retardant aid, a lubricant, a filler, a hydrotalcite, an antistatic agent, a pigment, a fluorescent brightener, or a dye) may optionally be contained within a range not significantly impairing the effects of the present invention.

Examples of the phenolic antioxidant include a 3-(3,5-dialkyl-4-hydroxyphenyl) propionic acid derivative such as 2,6-di-tert-butyl-4-ethylphenol, 2-tert-butyl-4,6-dimethylphenol, styrenated phenol, 2,2'-methylenebis (4-ethyl-6-tert-butylphenol), 2,2'-thiobis-(6-tert-butyl-4-methylphenol), 2,2'-thiodiethylene bis [3-(3,5-di-tert-butyl-4-hydroxyphenyl) propionate], 2-methyl-4,6-bis (octylsulfanylmethyl) phenol, 2,2'-isobutylidenebis (4,6-dimethylphenol), isooctyl-3-(3,5-di-tert-butyl-4-hydroxyphenyl) propionate, N,N'-hexane-1,6-diylbis[3-(3,5-di-tertbutyl-4-hydroxyphenyl)propionamide, 2,2'-oxamide-bis[ethyl-3-(3,5-di-tert-butyl-4-hydroxyphenyl) propionate], 2-ethylhexyl-3-(3'5'-di-tert-butyl-4'-hydroxyphenyl) propionate, 2,2'-ethylenebis (4,6-di-tert-butylphenol), an ester of 3,5-di-tert-butyl-4-hydroxy-benzenepropanoic acid and C13-15 alkyl, 2,5-di-tert-amylhydroquinone, a polymer of hindered phenol (trade name "AO.OH.98" manufactured by ADEKA PALMAROLE SAS), 2,2'-methylenebis [6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenz[d,fj[1,3,2]-dioxaphosphobin, hexamethylenebis[3-(3,5-di-tert-butyl-4-hydroxyphenyl)propionate, bis[monoethyl(3,5-di-tert-butyl-4-hydroxybenzyl)phosphonate] calcium salt, a reaction product of 5,7-bis(1,1-dimethylethyl)-3-hydroxy-2 (3H)-benzofuranone and o-xylene, 2,6-di-tert-butyl-4-(4,6-bis (octylthio)-1,3,5-triazin-2-ylamino)phenol, DL-α-tocopherol (vitamin E), 2,6-bis(α-methylbenzyl)-4-methylphenol, bis[3,3-bis-(4'-hydroxy-3'-tert-butyl-phenyl) butanoic acid] glycol ester, 2,6-di-tert-butyl-p-cresol, 2,6-diphenyl-4-octadecyloxyphenol, stearyl(3,5-di-tert-butyl-4-hydroxyphenyl) propionate, distearyl(3,5-di-tert-butyl-4-hydroxybenzyl) phosphonate, tridecyl-3,5-tert-butyl-4-hydroxybenzyl thioacetate, thiodiethylene bis[(3,5-di-tert-butyl-4-hydroxyphenyl) propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl) butyric acid] glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl) isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethylene glycol bis[β8-(3-tert-butyl-4-hydroxy-5-methylphenyl) propionate], stearyl-3-(3,5-di-tert-butyl-4-hydroxyphenyl) propionic acid amide, palmityl-3-(3,5-di-tert-butyl-4-hydroxyphenyl) propionic acid amide, myristyl-3-(3,5-di-tert-butyl-4-hydroxyphenyl) propionic acid amide, or lauryl 3-(3,5-di-tert-butyl-4-hydroxyphenyl) propionic acid amide. These may be used singly, or in combination of two or more kind thereof. When a phenolic antioxidant is blended, the blending amount thereof is, based on 100 parts by mass of the thermoplastic resin, 0.001 to 5 parts by mass, and more preferably 0.03 to 3 parts by mass.

Examples of the phosphorus antioxidant include triphenyl phosphite, diisooctyl phosphite, heptakis (dipropylene glycol) triphosphite, triisodecyl phosphite, diphenyl isooctyl phosphite, diisooctylphenyl phosphite, diphenyl tridecyl phosphite, triisooctyl phosphite, trilauryl phosphite, diphenyl phosphite, tris(dipropylene glycol) phosphite, dioleyl hydrogen phosphite, trilauryl trithiophosphite, bis(tridecyl) phosphite, tris(isodecyl) phosphite, tris(tridecyl) phosphite, diphenyldecyl phosphite, dinonylphenylbis(nonylphenyl) phosphite, poly(dipropylene glycol)phenyl phosphite, tetraphenyl dipropyl glycol diphosphite, tris nonylphenyl phosphite, tris (2,4-di-tert-butylphenyl) phosphite, tris (2,4-di-tert-butyl-5-methylphenyl) phosphite, tris[2-tert-butyl-4-(3-tert-butyl-4-hydroxy-5-methylphenylthio)-5-methylphenyl] phosphite, tri(decyl) phosphite, octyl diphenyl phosphite, di(decyl)monophenyl phosphite, a mixture of distearyl pentaerythritol and calcium stearate, alkyl (C10) bisphenol A phosphite, tetraphenyl-tetra(tridecyl)pentaerythritol tetraphosphite, bis(2,4-di-tert-butyl-6-methylphenyl)ethyl phosphite, tetra(tridecyl)isopropylidene diphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, (1-methyl-1-propenyl-3-ylidene) tris (1,1-dimethylethyl)-5-methyl-4,1-phenylene) hexatridecyl phosphite, 2,2'-methylenebis (4,6-di-tert-butylphenyl)-2-ethylhexyl phosphite, 2,2'-methylenebis (4,6-di-tert-butylphenyl) octadecyl phosphite, 2,2'-ethylidenebis (4,6-di-tert-butylphenyl) fluorophosphite, 4,4'-butylidenebis (3-methyl-6-tert-butylphenyl ditridecyl) phosphite, tris(2-[(2,4,8,10-tetrakis-tert-butyldibenzo[d, fj[1,3,2]dioxaphosphepin-6-yl)oxy]ethyl) amine, 3,9-bis(4-nonylphenoxy)-2,4,8,10-tetraoxa-3,9-diphosphespiro[5.5]undecane, 2,4,6-tri-tert-butylphenyl-2-butyl-2-ethyl-1,3-propanediol phosphite, poly 4,4'-isopropylidenediphenol C12-15 alcohol phosphite, bis(diisodecyl)pentaerythritol diphosphite, bis(tridecyl) pentaerythritol diphosphite, bis(octadecyl)pentaerythritol diphosphite, bis(nonylphenyl)pentaerythritol diphosphite, bis(2,4-di-tert-butylphenyl)pentaerythritol diphosphite, bis (2,4,6-tri-tert-butylphenyl)pentaerythritol diphosphite, bis (2,6-di-tert-butyl-4-methylphenyl)pentaerythritol diphosphite, and bis(2,4-dicumylphenyl)pentaerythritol diphosphite. These may be used singly, or in combination of two or more kinds thereof. When a phosphorus antioxidant is blended, the blending amount thereof is, based on 100 parts by mass of the thermoplastic resin, 0.001 to 10 parts by mass, and more preferably 0.01 to 0.5 parts by mass.

Examples of the thioether antioxidant include tetrakis [methylene-3-(laurylthio)propionate]methane, bis(methyl-4-[3-n-alkyl(C12/C14)thiopropionyloxy] 5-tert-butylphenyl) sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis(6-tert-butyl-p-cresol), and distearyl-disulfide. These may be used singly, or in combination of two or more kinds thereof. When a thioether antioxidant is blended, the blending amount thereof is, based on 100 parts by mass of the thermoplastic resin, 0.001 to 10 parts by mass, and more preferably 0.01 to 0.5 parts by mass.

Examples of the ultraviolet absorber include 2-hydroxybenzophenones such as 2,4-dihydroxybenzophenone or 5,5'-methylenebis(2-hydroxy-4-methoxybenzophenone); a 2-(2-hydroxyphenyl)benzotriazole such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), a polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl] benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, or 2-[2-hydroxy-4-(3-methacryloyloxypropyl)phenyl]benzotriazole; a benzoate such as phenyl salicylate, resorcinol monobenzoate, 2,4-di-tert-butylphenyl-3,5-di-tert-butyl-4-hydroxybenzoate, octyl (3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate, or behenyl(3,5-di-tert-butyl-4-hydroxy)benzoate; a substituted oxanilide such as 2-ethyl-2'-ethoxyoxanilide or 2-ethoxy-4'-dodecyloxanilide; a cyanoacrylate such as ethyl-α-cyano-β,β-diphenyl acrylate or methyl-2-cyano-3-methyl-3-(p-methoxyphenyl) acrylate; and a variety of metal salts or metal chelates, in particular, a salt or chelate of nickel or chromium. These may be used singly, or in combination of two or more kinds thereof. When an ultraviolet absorber is blended, the blending amount thereof is, based on 100 parts by mass of the thermoplastic resin, 0.001 to 10 parts by mass, and more preferably 0.01 to 0.5 parts by mass.

Examples of the hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)-di(tridecyl)-1,2,3,4-butane tetracarboxylate, bis(1,2,2,6,6-pentamethyl-4-piperidyl)-di(tridecyl)-1,2,3,4-butane tetracarboxylate, bis(1,2,2,4,4-pentamethyl-4-piperidyl)-2-butyl-2-(3,5-di-tert-butyl-4-hydroxy benzyl) malonate, 1-(2-hydroxyethyl)-2,2,6,6-tetramethyl-4-piperidinol/succinic acid diethyl polycondensate, 1,6-bis(2,2,6,6-tetramethyl-4-piperidyl amino)hexane/2,4-dichloro-6-morpholino-s-triazine polycondensate, 1,6-bis(2,2,6,6-tetramethyl-4-piperidyl amino)hexane/2,4-dichloro-6-tert-octyl amino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraaza dodecane, 1,5,8,12-tetrakis[2,4-bis(N-butyl-N-(1,2,2,6,6-pentamethyl-4-piperidyl)amino)-s-triazine-6-yl]-1,5,8-12-tetraaza dodecane, 1,6,11-tris[2,4-bis(N-butyl-N-(2,2,6,6-tetramethyl-4-piperidyl)amino)-s-triazine-6-yl]amino undecane, 1,6,11-tris[2,4-bis(N-butyl-N-(1,2,2,6,6-pentamethyl-4-piperidyl)amino)-s-triazine-6-yl]amino undecane, bis{4-(1-octyl oxy-2,2,6,6-tetramethyl)piperidyl} decane dionate, and bis{4-(2,2,6,6-tetramethyl-1-undecyl oxy)piperidyl)carbonate. These may be used singly, or in combination of two or more thereof. When the hindered amine compound is blended, the blending amount thereof is, based on 100 parts by mass of the thermoplastic resin, 0.001 to 10 parts by mass, more preferably, 0.01 to 0.5 parts by mass.

Examples of the nucleating agent different from the phosphoric acid ester compound (A) represented by the general formula (1) include a metal salt of a carboxylic acid such as sodium benzoate, aluminum 4-tert-butylbenzoate, sodium adipate, or disodium bicyclo[2.2.1]heptane-2,3-dicarboxylate, a polyhydric alcohol derivative such as dibenzylidenesorbitol, bis(methylbenzylidene)sorbitol, bis(3,4-dimethylbenzylidene)sorbitol, bis(p-ethylbenzylidene) sorbitol, or bis(dimethylbenzylidene)sorbitol, and an amide compound such as N,N',N''-tris[2-methylcyclohexyl]-1,2,3-propane tricarboxamide, N,N',N''-tricyclohexyl-1,3,5-benzenetricarboxamide, N,N'-dicyclohexylnaphthalenedicarboxamide, or 1,3,5-tri(dimethylisopropoylamino)benzene. These may be used singly, or in combination of two or more kinds thereof. Regarding the blending amount in the case of incorporating the nucleating agent, the total amount of the phosphate compound (A) represented by the general formula (1) is 0.001 to 10 parts by mass, and more preferably 0.006 to 5 parts by mass, based on 100 parts by mass of the thermoplastic resin.

Examples of the filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fiber, clay, dolomite, silica, alumina, potassium titanate whisker, wollastonite, and fibrous magnesium oxysulfate. The particle size (fiber diameter, fiber length and aspect ratio in the case of fiber form) can be appropriately selected and used. These may be used singly, or in combination of two or more kinds thereof. As the filler, a surface-treated filler can be used if necessary. When blending a filler, the blending amount thereof is, based on 100 parts by mass of the thermoplastic resin, 1 to 80 parts by mass, more preferably 3 to 50 parts by mass, and further preferably 5 to 40 parts by mass.

Examples of flame retardants include a phosphonate ester such as triphenyl phosphate, tricresyl phosphate, trixylenyl phosphate, cresyl diphenyl phosphate, cresyl-2,6-dixylenyl phosphate, resorcinol bis(diphenyl phosphate), (1-methylethylidene)-4,1-phenylene tetraphenyl diphosphate, 1,3-phenylene tetrakis(2,6-dimethyl phenyl)phosphate, aromatic phosphate esters, trade names "ADK STAB FP-500", "ADK STAB FP-600", and "ADK STAB FP-800" manufactured by ADEKA Corporation, a phosphonic ester such as divinyl phenylphosphonate, diallyl phenylphosphonate, or phenylphosphonic acid (1-butenyl), a phosphinic ester such as phenyl diphenylphosphinate, methyl diphenylphosphinate, or 9,10-dihydro-9-oxa-10-phosphaphenanthrene-10-oxide derivative, a phosphazene compound such as bis(2-allylphenoxy)phosphazene, or dicresyl phosphazene, a phosphorus flame retardant such as melamine phosphate, melamine pyrophosphate, melamine polyphosphate, melam polyphosphate, ammonium polyphosphate, piperazine phosphate, piperazine pyrophosphate, piperazine pyrophosphate, piperazine polyphosphate, a phosphorus-containing vinylbenzyl compound, or red phosphorus, a metal hydroxide such as magnesium hydroxide and aluminum hydroxide, and brominated flame retardant such as a brominated bisphenol A type epoxy resin, a brominated phenol novolak type epoxy resin, hexabromobenzene, pentabromotoluene, ethylene bis (pentabromophenyl), ethylene bistetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene and 2,4,6-tris(tribromophenoxy)-1,3,5-triazine, tribromophenyl maleimide, tribromophenyl acrylate, tribromophenyl methacrylate, tetrabromobisphenol A type dimethacrylate, pentabromobenzyl acrylate, or brominated styrene. These may be used singly, or in combination of two or more kinds thereof. These flame retardants are preferably used in combination with an anti-drip agent such as a fluorocarbon resin or a flame retardant aid such as polyhydric alcohol or hydrotalcite. When a flame retardant is blended, the blending amount thereof is, based on 100 parts by mass of the thermoplastic resin, 1 to 100 parts by mass, and more preferably 10 to 70 parts by mass.

A lubricant is added for the purpose of imparting lubricity to the surface of a molded article and enhancing the scratch prevention effect. Examples of the lubricant include an unsaturated fatty acid amide such as oleic acid amide or erucic acid amide; a saturated fatty acid amide such as behenic acid amide or stearic acid amide, butyl stearate, stearyl alcohol, stearic acid monoglyceride, sorbitan monopalmititate, sorbitan monostearate, mannitol, stearic acid, hardened castor oil, stearin sun amide, oleic acid amide, and ethylene bis stearic acid amide. These may be used singly, or in combination of two or more kinds thereof. When a lubricant is blended, the blending amount thereof is, based on 100 parts by mass of the thermoplastic resin, 0.01 to 2 parts by mass, and more preferably 0.03 to 0.5 parts by mass.

Examples of the hydrotalcites include a complex salt compound composed of magnesium, aluminum, a hydroxyl group, a carbonic acid group, and arbitrary crystal water known as a natural product or a synthetic product in which a part of magnesium or aluminum is substituted with another metal such as alkali metal or zinc, or hydroxyl group or carbonate group is substituted with another anion group. Specific examples thereof include one obtained by substituting a metal of the hydrotalcite represented by the general formula (4) below with an alkali metal. As an Al—Li based hydrotalcite, a compound represented by general formula (5) below can also be used.

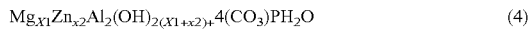

$$Mg_{x1}Zn_{x2}Al_2(OH)_{2(x1+x2)+4}(CO_3)PH_2O \quad (4)$$

Here, in the general formula (4), where x1 and x2 represent numbers both satisfying conditions represented by the following formulae, 0≤x2/x1<10 and 2≤1l+x2≤20, and p represents 0 or a positive number.

$$[Li_{1/3}Al_{2/3}(OH)_2],[A^{q-}_{1/3q}\cdot pH_2O] \quad (5)$$

Here, in the general formula (5), where $A^{q-}$ represents a q-valent anion, and p represents 0 or a positive number. The carbonate anion in these hydrotalcites may be one in which a part thereof is substituted with another anion.

The hydrotalcite may be one obtained by dehydrating the water of crystallization, or may be one covered with a higher fatty acid such as stearic acid, a high fatty acid metal salt such as alkali metal oleate, an organic sulfonic acid metal salt such as an alkali metal salt of dodecylbenzenesulfonic acid, a higher fatty acid amide, a higher fatty acid ester, a wax or the like.

The hydrotalcite may be a natural product or may be a synthetic product. Examples of a method for synthesizing a hydrotalcite include known methods described in Japanese Examined Patent Application Publication No. S46-2280, Japanese Examined Patent Application Publication No. S50-30039, Japanese Examined Patent Application Publication No. S51-29129, Japanese Examined Patent Application Publication No. H03-36839, Japanese Unexamined Patent Application Publication No. S61-174270, and Japanese Unexamined Patent Application Publication No. H05-179052. A hydrotalcite can be used without being restricted to its crystal structure, crystal grain, or the like. These may be used singly, or in combination of two or more kinds thereof. When a hydrotalcite is blended, the blending amount thereof is, based on 100 parts by mass of the thermoplastic resin, 0.001 to 5 parts by mass, and more preferably 0.01 to 3 parts by mass.

Examples of the antistatic agent include a cationic antistatic agent such as a fatty acid quaternary ammonium ion salt or a polyamine quaternary salt; an anionic antistatic agent such as a higher alcohol phosphate ester salt, a higher alcohol EO adduct, a polyethylene glycol fatty acid ester, an anionic alkyl sulfonate, a higher alcohol sulfuric acid ester salt, a higher alcohol ethylene oxide adduct sulfuric acid ester salt, or a higher alcohol ethylene oxide adduct phosphate ester salt; a nonionic antistatic agent such as a polyhydric alcohol fatty acid ester, a polyglycol phosphate ester, or a polyoxyethylene alkyl allyl ether; an amphoteric alkylbetaine such as alkyldimethylaminoacetic acid betaine, and an amphoteric antistatic agent such as imidazoline amphoteric surfactant. These may be used singly, or in combination of two or more kinds thereof. When blending an antistatic agent, the blending amount thereof is, based on 100 parts by mass of the thermoplastic resin, 0.03 to 2 parts by mass, and more preferably 0.1 to 0.8 parts by mass.

A commercially available pigment can also be used as the pigment, and examples thereof include Pigment Red 1, 2, 3, 9, 10, 17, 22, 23, 31, 38, 41, 48, 49, 88, 90, 97, 112, 119, 122, 123, 144,149, 166,168,169, 170,171,177,179, 180, 184, 185, 192,200,202,209,215, 216, 217, 220, 223, 224, 226, 227, 228, 240, 254; Pigment Orange 13, 31, 34, 36, 38, 43, 46, 48, 49, 51, 52, 55, 59, 60, 61, 62, 64, 65, 71; Pigment Yellow 1, 3, 12, 13, 14, 16, 17, 20, 24, 55,60,73,81,83,86,93,95,97, 98,100, 109, 110, 113, 114, 117, 120, 125, 126, 127, 129, 137, 138, 139, 147, 148, 150, 151, 152, 153, 154, 166, 168, 175, 180, 185; Pigment Green 7, 10, 36; Pigment Blue 15, 15: 1, 15: 2, 15: 3, 15: 4, 15: 5, 15: 6, 22, 24, 29, 56, 60, 61, 62, 64; and Pigment Violet 1, 15, 19, 23, 27, 29, 30, 32, 37, 40, 50. These may be used singly, or in combination of two or more kinds thereof.

Examples of the dye include a dye such as an azo dye, an anthraquinone dye, an indigoid dye, a triarylmethane dye, a xanthene dye, an alizarin dye, an acridine dye, a stilbene dye, a thiazole dye, a naphthol dye, a quinoline dye, a nitro dye, an indamine dye, an oxazine dye, a phthalocyanine dye, or a cyanine dye. These may be used singly, or in combination of two or more kinds thereof.

A fluorescent brightener is a compound that promotes the whiteness and blueness of a molded article by fluorescence action of absorbing ultraviolet rays of sunlight or artificial light and converting the light into violet to blue visible light and radiating the converted light. Examples of the fluorescent brightener include a benzoxazole compound, C. I. Fluorescent Brightner 184; a coumarin compound, C. I. Fluorescent Brightner 52; a diaminostilbene disulfonic acid compound, C. I. Fluorescent Brightner 24, 85, 71. These may be used singly, or in combination of two or more kinds thereof. When a fluorescent brightener is used, the blending amount thereof is, based on 100 parts by mass of the thermoplastic resin, 0.00001 to 0.1 parts by mass, and more preferably 0.00005 to 0.05 parts by mass.

When the resin composition of the present invention is molded, a known molding method can be used. For example, a molded article can be obtained by injection molding, extrusion molding, blow molding, vacuum molding, inflation molding, calender molding, slush molding, dip molding, foam molding, or the like.

Examples of applications of the resin composition of the present invention include a molded article such as an automobile material such as a bumper, a dashboard, or an instrument panel, a housing application such as a refrigerator, a washing machine, or a vacuum cleaner, a household good such as a dish, a bucket, or a bath product, a miscellaneous good such as a toy, or a reserve/storage container such as a tank; a film; and a fiber.

Next, a resin composition in another preferred embodiment of the present invention will be described.

The resin composition in another preferred embodiment of the present invention is a resin composition containing, based on 100 parts by mass of a thermoplastic resin, 0.001 to 10 parts by mass of the phosphoric acid ester compound (A) represented by the above general formula (1), a fatty acid sodium (B) represented by the above general formula (2), 1 to 80 parts by mass of a thermoplastic elastomer (C), and 1 to 80 parts by mass of a filler (D). In the resin composition of the present embodiment, the mass ratio of the component (B) to the component (A) is in the range of (B)/(A)=0.55 to 2.0. By satisfying such requirements, a resin composition which can obtain a molded article having both high impact resistance and high rigidity can be obtained. In the present embodiment, the resin additive composition of the present invention may be used. Also as for a thermoplastic resin, the above-described materials can be used.

<(C) Thermoplastic Elastomer>

The thermoplastic elastomer (C) in the resin composition according to another preferred embodiment of the present invention is not limited as long as the elastomer is a known thermoplastic elastomer, and a copolymer of ethylene and another monomer is preferred since such a copolymer is excellent in compatibility with polyolefin resins.

Examples of the other monomer include a linear or branched α-olefin having 3 to 20 carbon atoms, an aromatic vinyl compound having 8 to 20 carbon atoms, another vinyl compound, a conjugated diene, an alkyl methacrylate ester, and an alkyl acrylate ester. These other monomers may be used singly, or in combination of two or more kinds thereof.

Examples of the α-olefin having 3 to 20 carbon atoms include propylene, 1-butene, 3-methyl-1-butene, 3-ethyl-1-butene, 1-pentene, 3-methyl-1-pentene, 3-ethyl-1-pentene, 4,4-dimethyl-1-pentene, 1-hexene, 4-methyl-1-hexene, 4,4-dimethyl-1-hexene, 4-ethyl-1-hexene, 3-ethyl-1-hexene, 1-octene, 1-decene, 1-undecene, 1-dodecene, 1-tetradecene, 1-hexadecene, 1-octadecene, and 1-eicosene, and preferred examples include propylene, 1-butene, 1-pentene, 1-hexene, and 1-octene.

Examples of the aromatic vinyl compound having 8 to 20 carbon atoms include styrene, o-methylstyrene, p-methylstyrene, m-methylstyrene, o-ethylstyrene, m-ethylstyrene, p-ethylstyrene, p-tert-butylstyrene, and chloromethylstyrene, vinyltoluene, and preferable examples thereof include mono or polyalkyl styrene.

Examples of the other vinyl compound include a halogenated olefin, an unsaturated amine, an unsaturated carboxylic acid, a vinyl ester, an unsaturated epoxy compound, and an ethylenically unsaturated silane compound.

Here, the halogenated olefin refers to a product obtained by adding a halogen atom such as chlorine, bromine, or iodine to the α-olefin.

Examples of the unsaturated amine include allylamine, 5-hexeneamine, and 6-heptenamine.

Examples of the unsaturated carboxylic acid include propionic acid, 3-butenoic acid, 4-pentenoic acid, 5-hexenoic acid, 6-heptenoic acid, 7-octenoic acid, 8-nonenoic acid, 9-decenoic acid, and 10-undecenoic acid, and the unsaturated carboxylic acid may be substituted with a halogen atom.

Examples of vinyl esters include vinyl formate, vinyl acetate, vinyl propionate, vinyl butyrate, vinyl isobutyrate, trimethyl vinyl acetate, vinyl pentanoate, vinyl decanoate, vinyl undecylate, vinyl laurate, vinyl myristate, vinyl pentadecylate, vinyl palmitate, vinyl stearate, an aliphatic vinyl ester such as vinyl versatate (a carboxylic acid mixture having 9 to 11 carbon atoms), and an aromatic vinyl ester such as vinyl benzoate. Preferable examples of the vinyl ester include a vinyl ester having 3 to 20 carbon atoms, more preferably having 4 to 10 carbon atoms, and still more preferably vinyl acetate.

Examples of the unsaturated epoxy compound include 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene, and 11-epoxy-1-undecene.

Examples of the ethylenically unsaturated silane compound include vinyl triethoxysilane, vinyl trimethoxysilane, 3-acryloxypropyltrimethoxysilane, γ-glycidoxypropyltrimethoxysilane, 7-aminopropyltriethoxysilane, and γ-methacryloxypropyltrimethoxysilane.

Examples of the conjugated diene include 1,3-butadiene, isoprene, 1,3-pentadiene, 2-ethyl-1,3-butadiene, 2,3-dimethylbutadiene, 2-methylpentadiene, 4-methylpentadiene, 2,4-hexadiene, and 1,3-octadiene.

Examples of the methacrylic acid alkyl ester include methyl(meth)acrylate, ethyl(meth)acrylate, n-propyl(meth)acrylate, n-butyl(meth)acrylate, isobutyl(meth)acrylate, n-pentyl(meth)acrylate, isoamyl(meth)acrylate, n-hexyl(meth)acrylate, 2-methylpentyl(meth)acrylate, n-octyl(meth)acrylate, 2-ethylhexyl(meth)acrylate, n-decyl(meth)acrylate, n-dodecyl(meth)acrylate, and n-octadecyl(meth)acrylate.

Examples of acrylic acid alkyl esters include 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, and 2-(n-butoxy)propyl acrylate.

In the resin composition according to another preferred embodiment of the present invention, the thermoplastic elastomer (C) may be one obtained by singly copolymerizing these monomers with ethylene, or may be one obtained by copolymerizing two or more kinds of these monomers with ethylene.

In the resin composition according to another preferred embodiment of the present invention, specific examples of the thermoplastic elastomer (C) include ethylene-propylene copolymer, ethylene-butene copolymer, a block or random copolymer such as ethylene-octene copolymer, ethylene-methyl methacrylate copolymer, ethylene-methyl acrylate copolymer, ethylene-ethyl acrylate copolymer, ethylene-butyl acrylate copolymer, styrene-ethylene-butylene copolymer, styrene-ethylene-butylene-styrene copolymer, and ethylene-vinyl acetate copolymer.

Examples of a thermoplastic elastomer other than a combination of ethylene and another monomer include thermoplastic polyester and thermoplastic polyurethane.

In the resin composition according to another preferred embodiment of the present invention, an ethylene-α-olefin copolymer is preferable since the copolymer is excellent in compatibility with an olefin resin. A copolymer of ethylene and a vinyl ester is also preferred.

In the resin composition according to another preferred embodiment of the present invention, these thermoplastic resins and thermoplastic elastomers (C) may be used singly or in combination of two or more kinds thereof, or may also be alloyed. These thermoplastic resins and thermoplastic elastomers (C) can be used regardless of the molecular weight, the degree of polymerization, the density, the softening point, the ratio of the insoluble matter in the solvent, the degree of the stereoregularity, the presence or absence of the catalyst residue, the kind and blending ratio of a monomer as a raw material, the type of polymerization catalyst (for example, Ziegler catalyst, metallocene catalyst, or the like), or the like.

In the resin composition according to another preferred embodiment of the present invention, the blending amount of the thermoplastic elastomer (C) is, based on 100 parts by mass of the thermoplastic resin, 1 to 80 parts by mass, preferably 3 to 50 parts by mass, and more preferably 5 to 40 parts by mass. When the blending ratio is less than 1 part by mass, a blending effect may not be obtained, and when the blending ratio exceeds 80 parts by mass, the impact strength in a low temperature environment may be insufficient.

When the resin composition according to another preferred embodiment of the present invention is used for a housing material for automotive interior and exterior materials and electric/electronic parts, it is preferable that the content of the thermoplastic elastomer (C) in the resin composition is 1 to 30% by mass. When the content is less than 1% by mass, an effect of adding the thermoplastic elastomer may not be obtained, and when the content exceeds 30% by mass, the physical properties of a molded article may be deteriorated.

<(D) Filler>

In the resin composition according to another preferred embodiment of the present invention, as the filler (D), known fillers used for thermoplastic resin compositions can be used without limitation. Examples of the filler include talc, calcium carbonate, magnesium sulfate fiber, silica, clay, kaolin, alumina, carbon black, and glass fiber, and talc is particularly preferable from the viewpoint of the mechanical properties of a molded article. The talc may be subjected to a treatment such as pulverization or micronization. These may be used singly, or in combination of two or more kinds thereof.

The blending amount of the filler (D) is, based on 100 parts by mass of the thermoplastic resin, 1 to 80 parts by mass, more preferably 3 to 50 parts by mass, and still more preferably 5 to 40 parts by mass. When the amount is less than 1 part by mass, the effect of adding the filler (D) may not be obtained, and when the amount exceeds 80 parts by mass, an effect of the present invention may not be obtained.

When the resin composition according to another preferred embodiment of the present invention is used for a housing material for automotive interior and exterior materials and electric/electronic parts, it is preferable that 1 to 30% by mass of the filler (D) in the resin composition is contained. When the amount is less than 1% by mass, an effect of adding the filler (D) may be unobtainable, and when the amount exceeds 30% by mass, the physical properties of a molded article may be deteriorated.

In the resin composition according to another preferred embodiment of the present invention, the method of blending the components (A), (B) and (D) in the thermoplastic resin is not particularly limited, and examples thereof include a commonly used method such as a method of dry blending the respective components with a powder or a pellet of a thermoplastic resin, a method in which a master batch containing any of the respective components in a high concentration is prepared and added to a thermoplastic resin, or a method in which the resin composition of the present invention is processed into a pellet form and added to a thermoplastic resin. The respective components may be simultaneously added to an olefin resin or may be added separately.

The thermoplastic resin can be produced in pellet form by the following processing method, for example, by heating a mixture obtained by mixing a binder and an optional additive contained as necessary, and mixing a component (A), a component (B), and a component (D) in the presence of the binder in a molten state. As the binder, a compound having a lower melting point than the components (A), (B), and (D) and used as a usual resin additive is preferred. Examples of the binder include a phenolic antioxidant. Processing conditions, processing machine, and the like are not limited in any way, and well-known general processing methods and processing equipment can be used. Specific manufacturing methods thereof include a disk pelleter method and an extrusion method.

Also in the resin composition according to another preferred embodiment of the present invention, any known resin additive (such as a phenolic antioxidant, a phosphorus antioxidant, a thioether antioxidant, an ultraviolet absorber, a hindered amine compound, a nucleating agent different from the component (A), a flame retardant, a flame retardant aid, a lubricant, a hydrotalcite, a fatty acid metal salt, an antistatic agent, a pigment, a fluorescent brightener, or a dye) may be contained as long as an effect of the present invention is not considerably impaired.

Examples of the nucleating agent different from the phosphoric acid ester compound (A) represented by the general formula (1) include a metal carboxylate such as sodium benzoate, 4-tert-butylbenzoic acid aluminum salt, sodium adipate, disodium bicyclo[2.2.1]heptane-2,3-dicarboxylate, a polyvalent alcohol derivative such as dibenzylidenesorbitol, bis(methylbenzylidene)sorbitol, bis(3,4-dimethylbenzylidene)sorbitol, bis(p-ethylbenzylidene)sorbitol, or bis(dimethylbenzylidene)sorbitol, and an amide compound such as N,N',N"-tris [2-methylcyclohexyl]-1,2,3-propane tricarboxamide, N,N',N"-tricyclohexyl-1,3,5-benzenetricarboxamide, N,N'-dicyclohexylnaphthalenedicarboxamide, or 1,3,5-tri(dimethylisopropoylamino) benzene. These may be used singly, or in combination of two or more kinds thereof. When a nucleating agent is blended, the blending amount thereof with a phosphoric acid ester compound (A) represented by the general formula (1) in total is, based on 100 parts by mass of the thermoplastic resin, 0.001 to 10 parts by mass, and more preferably 0.006 to 0.5 parts by mass.

When molding the resin composition according to another preferred embodiment of the present invention, molding can be carried out using a known molding method. For example, a molded article can be obtained by injection molding, extrusion molding, blow molding, vacuum molding, inflation molding, calender molding, slush molding, dip molding, foam molding, or the like.

Examples of applications of the resin composition in another preferred embodiment of the present invention include a molded article such as an automobile material such as a bumper, a dashboard, or an instrument panel, a housing application such as a refrigerator, a washing machine, or a vacuum cleaner, a household good such as a dish, a bucket, or a bath product, a miscellaneous good such as a toy, or a reserve/storage container such as a tank; a film; and a fiber.

Next, a resin composition in still another preferred embodiment of the present invention will be described.

The resin composition in still another preferred embodiment of the present invention is a resin composition containing, based on 100 parts by mass of a thermoplastic resin, 0.001 to 10 parts by mass of the phosphoric acid ester compound (A) represented by the above general formula (1), a fatty acid sodium (B) represented by the above general formula (2), and 0.01 to 10 parts by mass of the phosphite compound (E) represented by the general formula (3), in which the mass ratio of (B)/(A) is in the range of 0.55 to 2.0. By satisfying such requirements, a resin composition which can obtain a molded article having both an excellent crystallization action and an excellent effect of preventing discoloration due to thermal history can be obtained. Also in the present embodiment, the resin additive composition of the present invention may be used. Also as for a thermoplastic resin, the above-described materials can be used.

<(E) Phosphite Compound Represented by General Formula (3)>

The phosphite compound according to the resin composition of the present invention is represented by the following formula (3):

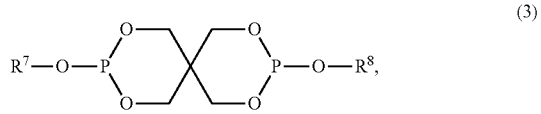

in the formula (3), $R^7$ and $R^8$ each independently represent an alkyl group having 1 to 40 carbon atoms or an aryl group having 6 to 40 carbon atoms.

Examples of the alkyl group having 1 to 40 carbon atoms represented by $R^7$ and $R^8$ in the general formula (3) include methyl, ethyl, propyl, iso-propyl, cyclopropyl, butyl, sec-butyl, tert-butyl, iso-butyl, pentyl, iso-pentyl, tert-pentyl, cyclopentyl, 4-ethyl-2-methylheptyl, hexyl, 2-methylhexyl, 3-methylhexyl, cyclohexyl, 4-methylcyclohexyl, 2,4-dimethylhexyl, cyclohexyl, 1,2,4-trimethylcyclohexyl, heptyl, 2-heptyl, 3-heptyl, iso-heptyl, tert-heptyl, 1-octyl, iso-octyl, tert-octyl, nonyl, isononyl, decyl, undecyl, dodecyl, tridecyl, isotridecyl, tetradecyl, pentadecyl, hexadecyl, heptadecyl, octadecyl, icosyl, adamantyl, and norbornyl.

Examples of the aryl group having 6 to 40 carbon atoms include phenyl, naphthyl, anthracenyl, phenanthryl, fluorenyl, indenyl, 2-methylphenyl, 3-methylphenyl, 4-methylphenyl, 4-vinylphenyl, 3-iso-propylphenyl, 4-iso-propylphenyl, 4-butylphenyl, 4-iso-butylphenyl, 4-tert-butylphenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,5-di-tert-octylphenyl, 2,4-dicumylphenyl, 4-cyclohexylphenyl, (1,1'-biphenyl)-4-yl, 2,4,5-trimethylphenyl, and ferrocenyl.

Specific examples of the phosphite compound represented by the general formula (3) include bis(diisodecyl)pentaerythritol diphosphite, bis(tridecyl) pentaerythritol diphosphite, bis(octadecyl) pentaerythritol diphosphite, bis(nonylphenyl) pentaerythritol diphosphite, bis(2,4-di-tert-butylphenyl) pentaerythritol diphosphite, bis(2,4,6-tri-tert-butylphenyl) pentaerythritol diphosphite, bis(2,6-di-tert-butyl-4-methylphenyl) pentaerythritol diphosphite, bis(2,4-dicumylphenyl) pentaerythritol diphosphite.

In the resin composition according to still another preferred embodiment of the present invention, bis(2,4-di-tert-butylphenyl) pentaerythritol diphosphite, bis(2,6-di-tert-butyl-4-methylphenyl) pentaerythritol diphosphite, or bis(2,4-dicumylphenyl) pentaerythritol diphosphite is preferable because such a compound is particularly excellent in thermal stabilization effect.

In the resin composition according to still another preferred embodiment of the present invention, the phosphite compound is preferably a compound having a molecular weight of 300 to 1,000, and more preferably 400 to 700. When the molecular weight is less than 300, the phosphite compound tends to be volatilized from the resin, which may impair the appearance of a molded article, and when the molecular weight exceeds 1,000, the thermal stabilization effect may be poor.

In the resin composition according to still another preferred embodiment of the present invention, the blending amount of a phosphite compound (E) represented by the general formula (3) to the thermoplastic resin is, based on 100 parts by mass of the thermoplastic resin, preferably 0.01 to 10 parts by mass, and more preferably 0.01 to 0.5 parts by mass. When the blending amount is less than 0.01 parts by mass, an effect of the present invention may not be obtained, and when the amount exceeds 10 parts by mass, it becomes difficult for the compound to be dispersed in a thermoplastic resin, which adversely affects the physical properties and appearance of a molded article.

In the resin composition according to still another preferred embodiment of the present invention, the method of blending the components (A), (B) and (E) in the thermoplastic resin is not particularly limited, and examples thereof include a commonly used method such as a method of dry blending the respective components with a powder or a pellet of a thermoplastic resin, a method in which a master batch containing any of the respective components in a high concentration is prepared and added to a thermoplastic resin, or a method in which the resin composition of the present invention is processed into a pellet form and added to a thermoplastic resin. The respective components may be simultaneously added to an olefin resin or may be added separately.

The thermoplastic resin can be produced in pellet form by the following processing method, for example, by heating a mixture obtained by mixing a binder and an optional additive contained as necessary, and mixing components (A), (B), and (E) in the presence of the binder in a molten state. As the binder, a compound having a lower melting point than the components (A), (B), and (E) and used as a usual resin additive is preferred. Examples of the binder include a phenolic antioxidant. Processing conditions, processing machines, and the like are not limited in any way, and well-known general processing methods and processing equipment can be used. Specific manufacturing methods thereof include a disk pelleter method and an extrusion method.

Also in the resin composition according to still another preferred embodiment of the present invention, any known resin additive (such as a phenolic antioxidant, a phosphite compound different from a phosphite compound (E) represented by the general formula (3), a thioether antioxidant, an ultraviolet absorber, a hindered amine compound, a nucleating agent different from the phosphoric acid ester compound (A) represented by the general formula (1), a flame retardant, a flame retardant aid, a lubricant, a filler, a hydrotalcite, an antistatic agent, a pigment, or a dye) may be contained as long as an effect of the present invention is not considerably impaired.

Examples of the phosphite compound different from the component (E) include triphenyl phosphite, diisooctyl phosphite, heptakis (dipropylene glycol) triphosphite, triisodecyl phosphite, diphenyl isooctyl phosphite, diisooctylphenyl phosphite, diphenyl tridecyl phosphite, triisooctyl phosphite, trilauryl phosphite, diphenyl phosphite, tris(dipropylene glycol) phosphite, dioleyl hydrogen phosphite, trilauryl trithiophosphite, bis(tridecyl) phosphite, tris(isodecyl) phosphite, tris(tridecyl) phosphite, diphenyldecyl phosphite, dinonylphenylbis(nonylphenyl) phosphite, poly(dipropylene glycol)phenyl phosphite, tetraphenyl dipropyl glycol diphosphite, tris nonylphenyl phosphite, tris (2,4-di-tert-butylphenyl) phosphite, tris (2,4-di-tert-butyl-5-methylphenyl) phosphite, tris[2-tert-butyl-4-(3-tert-butyl-4-hydroxy-5-methylphenylthio)-5-methylphenyl]phosphite, tri(decyl) phosphite, octyl diphenyl phosphite, di(decyl)monophenyl phosphite, a mixture of distearyl pentaerythritol and calcium stearate, alkyl (C10) bisphenol A phosphite, tetraphenyltetra(tridecyl)pentaerythritol tetraphosphite, bis(2,4-di-tert-butyl-6-methylphenyl)ethyl phosphite, tetra(tridecyl)isopropylidene diphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, (1-methyl-1-propenyl-3-ylidene) tris (1,1-dimethylethyl)-5-methyl-4,1-phenylene) hexatridecyl phosphite, 2,2'-methylenebis (4,6-di-tert-butylphenyl)-2-ethylhexyl phosphite, 2,2'-methylenebis (4,6-di-tert-butylphenyl)-octadecyl phosphite, 2,2'-ethylidenebis (4,6-di-tert-butylphenyl) fluorophosphite, 4,4'-butylidenebis (3-methyl-6-tert-butylphenyl ditridecyl) phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphespiro[5.5]undecane, 2,4,6-tri-tert-butylphenyl-2-butyl-2-ethyl-1,3-propanediol phosphite, and poly 4,4'-isopropylidenediphenol C12-15 alcohol phosphite. When a phosphite compound different from the component (E) is blended, the blending amount thereof with a phosphite compound (E) represented by the general formula (3) in total is preferably, based on 100 parts by mass of the thermoplastic resin, 0.001 to 10 parts by mass, and more preferably 0.01 to 0.5 parts by mass.

When molding the resin composition according to still another preferred embodiment of the present invention, molding can be carried out using a known molding method. For example, a molded article can be obtained by injection molding, extrusion molding, blow molding, vacuum molding, inflation molding, calender molding, slush molding, dip molding, foam molding, or the like.

Examples of applications of the resin composition in still another preferred embodiment of the present invention include a molded article such as an automobile material such as a bumper, a dashboard, or an instrument panel, a housing application such as a refrigerator, a washing machine, or a vacuum cleaner, a household good such as a dish, a bucket, or a bath product, a miscellaneous good such as a toy, or a reserve/storage container such as a tank; a film; and a fiber.

Next, a resin composition in still another preferred embodiment of the present invention will be described.

The resin composition in still another preferred embodiment of the present invention is a thermoplastic resin composition containing, based on 100 parts by mass of a thermoplastic resin, 0.001 to 10 parts by mass of the phosphoric acid ester compound (A) represented by the above general formula (1), a fatty acid sodium (B) represented by the above general formula (2), and 1 to 100 parts by mass of a flame retardant (F), in which the mass ratio of the component (B) to the component (A), (B)/(A) 0.55 to 2.0. By satisfying such requirements, a thermoplastic resin composition which can obtain a molded article which is highly flame-retardant and excellent in physical properties can be obtained. Also in the present embodiment, the resin additive composition of the present invention may be used.

Also as for a thermoplastic resin, the above-described materials can be used.

<(F) Flame Retardant>

In the resin composition according to still another preferred embodiment of the present invention, the flame retardant (F) is not particularly limited, and a known flame retardant can be used. Examples of the flame retardant (F) include a phosphate ester compound. In the resin composition of the present invention, it is preferable to use a phosphate ester flame retardant represented by general formula (6) below:

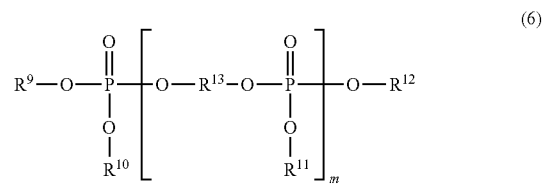

(6)

(In the formula (6), $R^9$, $R^{10}$, $R^{11}$ and $R^{12}$ each independently represent an alkyl group having 1 to 10 carbon atoms or an aromatic group represented by general formula (7) below, $R^{13}$ represents a divalent aromatic group represented by general formula (8), (9), or (10) below, and m represents a number of 0 to 30.)

(7)

(In the formula (7), $H^1$ and $H^2$ each independently represent a hydrogen atom, a hydroxyl group or an alkyl group having 1 to 10 carbon atoms.)

(8)

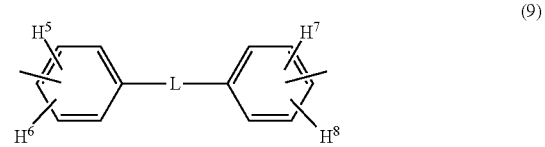

(9)

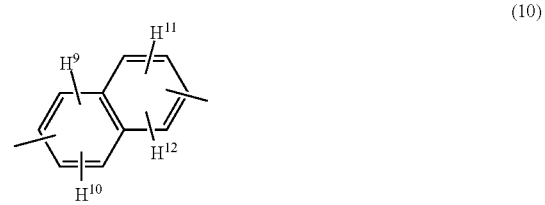

(10)

(In the formulae (8), (9), and (10), $H^3$, $H^4$, $H^5$, $H^6$, $H^7$, $H^8$, $H9$, $H^{10}$, $H^{11}$, and $H^{12}$ each independently represent a hydrogen atom, an alkyl group having 1 to 10 carbon atoms, a cycloalkyl group, an aryl group, an alkoxy group, a nitro group, a halogen atom, or a cyano group. L represents a direct bond, a divalent sulfur atom, a sulfonyl group, or an alkylidene group or an alkylene group having 1 to 5 carbon atoms).

Examples of the alkyl group having 1 to 10 carbon atoms represented by $R^9$, $R^{10}$, $R^{11}$ and $R^{12}$ in the formula (6) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl, octadecyl, nonyl, and decyl.

Examples of the aromatic group represented by the general formula (7) in $R^9$, $R^{10}$, $R^{1"}$, and $R^2$ in the general formula (6) include phenyl, 2,6-dimethylphenyl, cresyl, xylenyl, isopropylphenyl, and tert-butylphenyl.

Examples of the alkyl group having 1 to 10 carbon atoms represented by $H^1$ and $H^2$ in the general formula (7) include the same as those described above.

$R^{11}$ in the general formula (6) represents a divalent aromatic group selected from the above general formulae (8), (9), and (10).

Examples of the alkyl group having 1 to 10 carbon atoms represented by $H^3$, $H^4$, $H^5$, $H^6$, $H^7$, $H^8$, $H^9$, $H^{10}$, $H^{11}$ and $H^{12}$ in the formulae (8), (9), and (10) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl, octadecyl, nonyl, decyl, and the alkyl group is preferably an alkyl group having 1 to 8 carbon atoms, and particularly preferably methyl or tert-butyl.

Examples of the cycloalkyl group represented by $H^3$, $H^4$, $H^5$, $H^6$, $H^7$, $H^8$, $H^9$, $H^{10}$, $H^{11}$, and $H^{12}$ in the general formulae (8), (9), and (10) include cyclobutyl, cyclopentyl, cyclohexyl, cycloheptyl, and cyclooctyl. It is preferably a cycloalkyl group having 3 to 7 carbon atoms, and particularly preferably cyclohexyl.

Examples of the aryl group represented by $H^3$, $H^4$, $H^5$, $H^6$, $H^7$, $H^8$, $H^9$, $H^{10}$, $H^{11}$, and $H^{12}$ in the general formulae (8), (9), and (10) include phenyl, cresyl, xylyl, 2,6-xylyl, 2,4,6-trimethylphenyl, butylphenyl, and nonylphenyl.

Examples of the alkoxy group represented by $H^3$, $H^4$, $H^5$, $H^6$, Hf, $H^8$, H9, $H^{11}$, $H^{11}$, and $H^{12}$ in the general formulae (8), (9), and (10) include methoxy, ethoxy, propoxy, and butoxy.

Examples of the halogen atom represented by $H^3$, $H^4$, $H^5$, $H^6$, $H^7$, $H^4$, $H^9$, $H^{10}$, $H^{11}$, and $H^{12}$ in the general formulae (8), (9), and (10) include a fluorine atom, a chlorine atom, and a bromine atom.

L in the general formula (9) represents a direct bond, a divalent sulfur atom, a sulfonyl group, or an alkylidene group or an alkylene group having 1 to 5 carbon atoms.

Examples of the alkylidene group having 1 to 5 carbon atoms represented by L in the general formula (9) include ethylidene, isopropylidene, butylidene, and isobutylidene, and examples of the alkylene group having 1 to 5 carbon atoms include methylene, ethylene, propylene, butylene, isobutylene, and heptylene.

Specific examples of the divalent aromatic group represented by the general formula (8) include 1,4-phenylene and 1,3-phenylene.

Specific examples of the divalent aromatic group represented by the general formula (9) include 1,4'-biphenylene, (1-methylethylidene)-di-4,1-phenylene, 4,4'-thiodiphenylene, and 4,4'-sulfonyldiphenylene.

Specific examples of the divalent aromatic group represented by the general formula (10) include 1,5-naphthylene and 2,6-naphthylene.

In the general formula (6), r represents a number of 0 to 30, and a phosphate ester compound which is a condensate has higher flame retardancy. In a resin composition according to still another preferred embodiment of the present invention, r is preferably 1 to 10, and more preferably 1 to 5.

In the resin composition according to still another preferred embodiment of the present invention, specific examples of the phosphate ester flame retardant represented by the general formula (6) include trimethyl phosphate, triethyl phosphate, tributyl phosphate, triphenyl phosphate, tricresyl phosphate, cresyl diphenyl phosphate, trixylenyl phosphate, octyl diphenyl phosphate, xylenyl diphenyl phosphate, tris(isopropyl phenyl) phosphate, 2-ethylhexyl diphenyl phosphate, t-butyl phenyl diphenyl phosphate, bis (t-butyl phenyl)phenyl phosphate, tris(t-butyl phenyl) phosphate, isopropyl phenyl diphenyl phosphate, and the compounds below, however, the resin composition of the present invention is not limited by these exemplified compounds.

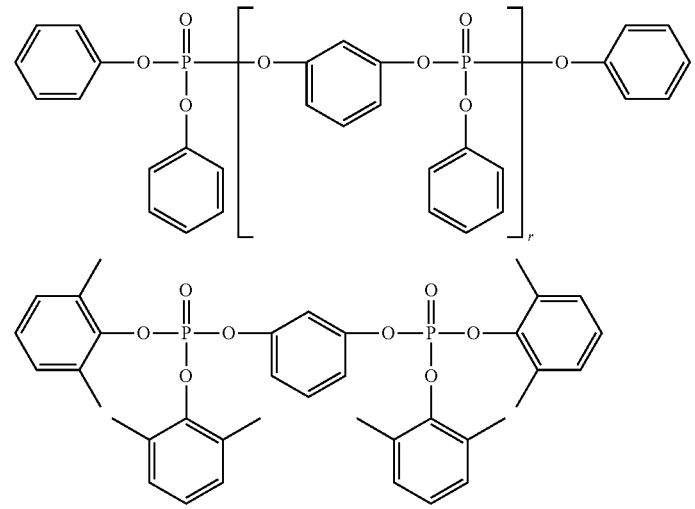

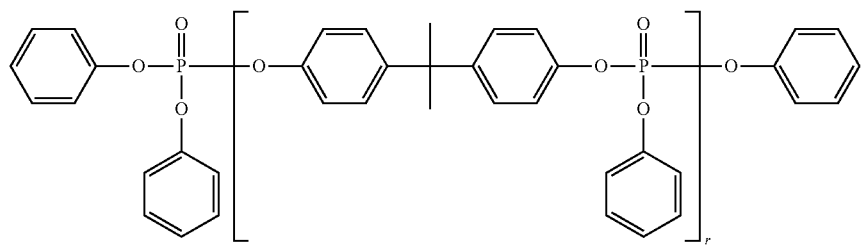
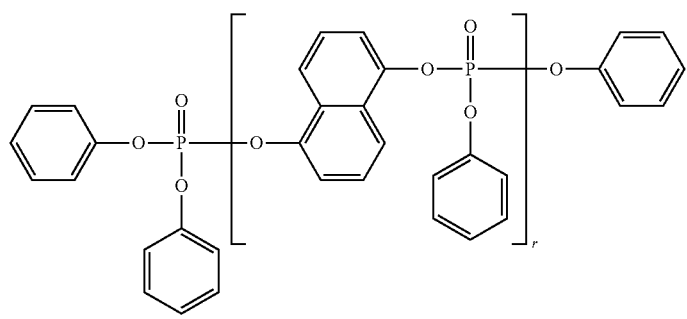
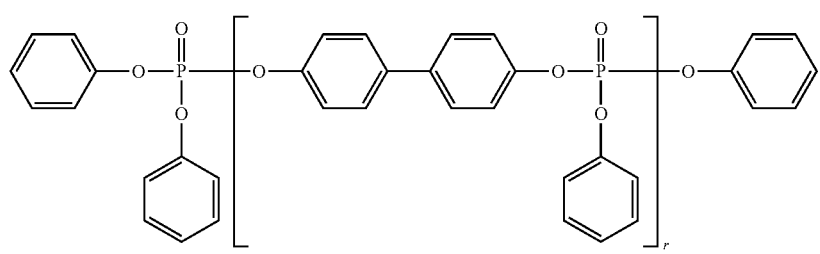
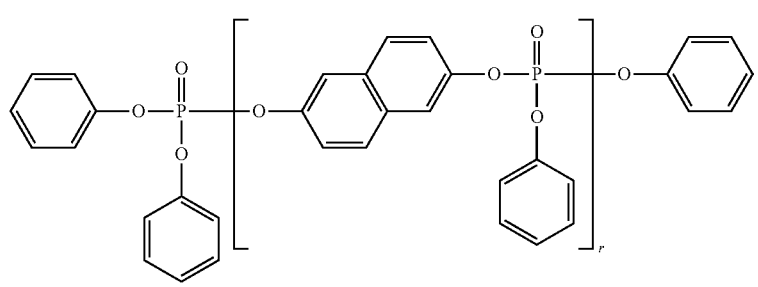
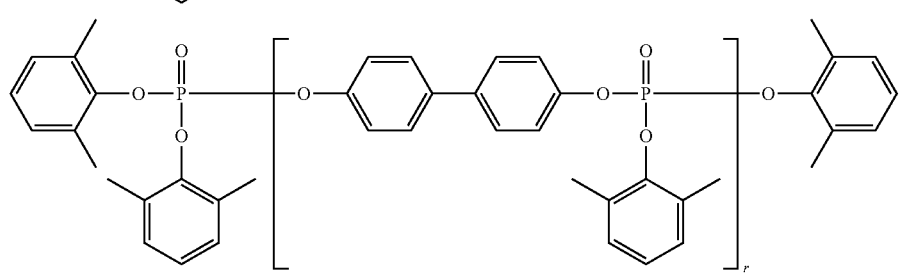
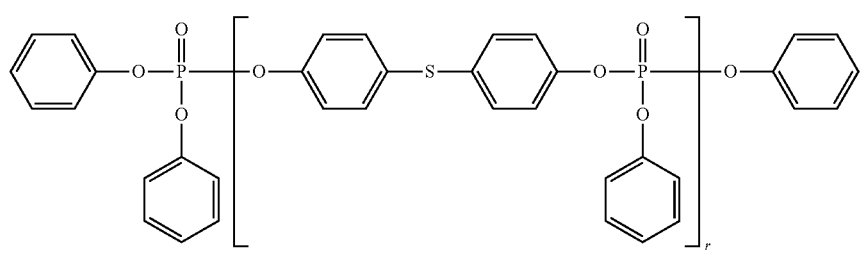

-continued

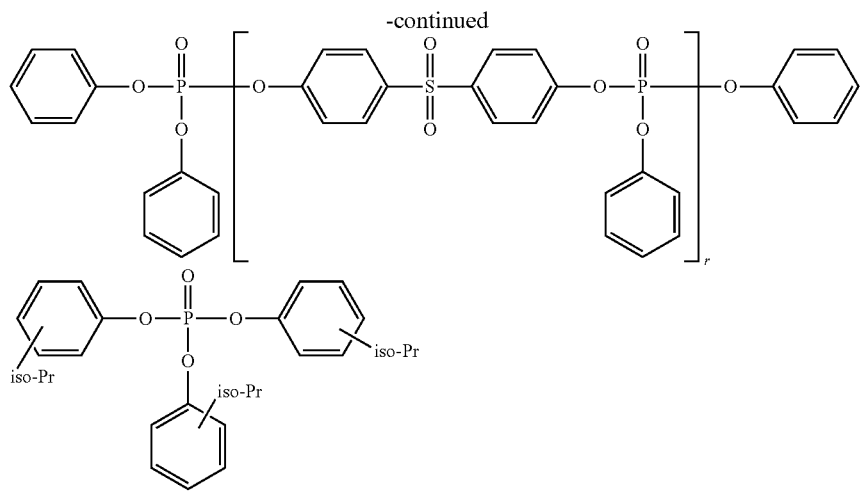

Examples of products of phosphate ester flame retardants include "ADK STAB PFR", "ADK STAB FP-500", "ADK STAB FP-600", "ADK STAB FP-700", "ADK STAB FP-800", "ADK STAB FP-900" manufactured by ADEKA CORPORATION, "CR-504L" and "CR-570" manufactured by DAIHACHI CHEMICAL INDUSTRY CO., LTD., "Clonitex TXP", "Durad TXP", "ReoFos 35", "ReoFos 50", "ReoFos 65", "ReoFos 95", and "ReoFos 110" manufactured by Ajinomoto Fine-Techno Co., Inc.

Next, a brominated flame retardant may be used in the resin composition according to still another preferred embodiment of the present invention. In the resin composition of the present invention, a known brominated flame retardant can be used without particular limitation. From the viewpoint of flame retardancy and ease of availability, a flame retardant containing at least one selected from the group consisting of a brominated diphenyl compound, a brominated bisphenol compound, a brominated bisphenol-bis(alkyl ether) compound, a brominated phthalimide compound, a brominated triazine compound, and a brominated thermoplastic resin is preferred.

Examples of the brominated diphenyl compound include a brominated diphenyl ether compound, a brominated diphenyl alkane compound, and a brominated diphenyl ketone compound. Among them, a brominated diphenyl ether compound such as a decabromodiphenyl ether or an octabromodiphenyl ether, or a halogenated diphenyl alkane compound such as decabromodiphenyl ethane is preferable.

Examples of the brominated bisphenol compound include a brominated bisphenyl alkane, a brominated bisphenyl ether, a brominated bisphenyl thioether, a brominated bisphenyl sulfone, a brominated bisphenol A epoxy resin, a modified product obtained by sealing a part or all of glycidyl groups at molecular chain terminals of a brominated bisphenol A epoxy resin, and a polycarbonate oligomer synthesized from a brominated bisphenol A. Among them, a brominated bisphenyl alkane such as tetrabromobisphenol A or a halogenated bisphenyl thioether such as bis(3,5-dibromo-4-hydroxyphenyl)sulfone is preferable.

Examples of the brominated bisphenol-bis(alkyl ether) compound include a brominated bisphenol A-bis(alkyl ether), a brominated bisphenol S-bis(alkyl ether), and a brominated bisphenol F bis(alkyl ether). Among them, a brominated bisphenol A (brominated aliphatic ether) such as 2,2-bis (3,5-dibromo-4-2,3-dibromopropoxyphenyl) propane and a brominated bisphenol S (brominated aliphatic ether) such as (3,5-dibromo-4-2,3-dibromopropoxyphenyl)-(3-bromo-4-(2,3-dibromopropoxyphenyl))sulfone and bis(3, 5-dibromo-4-2,3-dibromopropoxyphenyl)sulfone are preferable.

Examples of the brominated phthalimide compound include ethylene bis(tetrabromophthalimide).

Examples of the brominated triazine compound include tris(brominated phenoxy)-1,3,5-triazine such as 2,4,6-tris(2, 4,6-tribromophenoxy)-1,3,5-triazine.

Examples of the brominated thermoplastic resin include brominated polystyrene, brominated polyacrylate, and a brominated polyphenylene ether. Among them, a brominated polystyrene such as poly(tribromostyrene) and a brominated polyphenylene ether such as poly(dibromophenylene oxide) are preferable.

In the resin composition according to still another preferred embodiment of the present invention, the content of the flame retardant (F) is, based on 100 parts by mass of the thermoplastic resin, 1 to 100 parts by mass, and more preferably 10 to 70 parts by mass.

When the amount is less than 1 part by mass, a sufficient flame retardancy effect is unobtainable, and when the amount exceeds 100 parts by mass, the resin physical properties may decrease.

<(G) Flame Retardant Aid>

In the resin composition according to still another preferred embodiment of the present invention, a flame retardant aid (G) can be used. In the resin composition according to still another preferred embodiment of the present invention, the flame retardant aid (G) is not particularly limited, and a known flame retardant aid can be used. Among them, an antimony-based compound, a boron-based compound, a metal oxide, or an anti-drip agent is preferred from the viewpoints of the performance of the flame retardant aid (G) and ease of availability.

Examples of the antimony-based compound include antimony oxide, an alkali metal salt of antimonic acid, an alkaline earth metal salt of antimonic acid, metal antimony, antimony chloride, and antimony sulfide. Among these, antimony oxide such as antimony trioxide or antimony pentoxide, or an alkali metal salt of antimonic acid such as sodium antimonate is preferable.

Preferred examples of the boron-based compound include boric acid, orthoboric acid-containing boric acid, metaboric acid, perboric acid, boric acid, boron, borinic acid, and tetraboric acid.

Examples of the metal oxide include zinc oxide, titanium oxide, magnesium oxide, and silicon oxide. Among these, zinc oxide is preferable. The metal oxide may be surface-treated.

Examples of the anti-drip agent include a fluorine-containing anti-drip agent, a silicone rubber, and a layered silicate.

Examples of the layered silicate include a smectite clay mineral such as montmorillonite, saponite, hectorite, beidellite, stevensite, or nontronite, vermiculite, halloysite, swellable mica, and talc, and the layered silicate may be one in which an organic cation, a quaternary ammonium cation, and a phosphonium cation are intercalated between the layers.

Among drip inhibitors, a fluoride-containing anti-drip agent is particularly preferred.

Specific examples of the fluorine-containing anti-drip agent include a fluororesin such as polytetrafluoroethylene, polyvinylidene fluoride, or polyhexafluoropropylene and an alkali metal salt compound of perfluoroalkanesulfonic acid or an alkaline earth metal salt of perfluoroalkanesulfonic acid such as a perfluoromethanesulfonic acid sodium salt, a perfluoro-n-butanesulfonic acid potassium salt, a perfluoro-t-butanesulfonic acid potassium salt, a perfluorooctanesulfonic acid sodium salt, or a calcium salt of perfluoro-2-ethylhexanesulfonic acid. Among the above fluoride-containing anti-drip agents, polytetrafluoroethylene is particularly preferable, from the viewpoint of anti-drip properties.

In the resin composition according to still another preferred embodiment of the present invention, the content of the flame retardant aid (G) is, based on 100 parts by mass of the thermoplastic resin, 1 to 30 parts by mass, and more preferably 3 to 30 parts by mass. When the content is less than 1 part by mass, a sufficient flame retardant aid effect is unobtainable, and when the content exceeds 30 parts by mass, the properties of a resin may be deteriorated.

The method of blending the component (A), the component (B), and the component (F) in a resin composition according to still another preferred embodiment of the present invention into a thermoplastic resin is not particularly limited, and examples of commonly used methods include a method of dry-blending each component with thermoplastic resin powder or pellet, a method in which a master batch containing any of the respective components in a high concentration is prepared and added to a thermoplastic resin, and a method in which the resin composition of the present invention is processed into a pellet form and added to a thermoplastic resin. The components may be simultaneously added to an olefin resin or may be added separately.

The thermoplastic resin can be produced in pellet form by the following processing method, for example, by heating a mixture obtained by mixing a binder and an optional additive contained as necessary, and mixing a component (A), a component (B), and a component (F) in the presence of the binder in a molten state. As the binder, a compound having a lower melting point than the components (A), (B), and (F) and used as a usual resin additive is preferred. Examples of the binder include a phenolic antioxidant. Processing conditions, processing machines, and the like are not limited in any way, and well-known general processing methods and processing equipment can be used. Specific manufacturing methods thereof include a disk pelleter method and an extrusion method.

Also in the resin composition according to still another preferred embodiment of the present invention, any known resin additive (such as a phenolic antioxidant, a phosphorus antioxidant, a thioether antioxidant, an ultraviolet absorber, a hindered amine compound, a nucleating agent different from the phosphoric acid ester compound (A) represented by the general formula (1), a lubricant, a filler, a hydrotalcite, an antistatic agent, a pigment, an fluorescent brightener, or a dye) may be contained as long as an effect of the present invention is not considerably impaired.

When molding the resin composition according to still another preferred embodiment of the present invention, molding can be carried out using a known molding method. For example, a molded article can be obtained by injection molding, extrusion molding, blow molding, vacuum molding, inflation molding, calender molding, slush molding, dip molding, foam molding, or the like.

Examples of applications of the resin composition in still another preferred embodiment of the present invention include a molded article such as an automobile material such as a bumper, a dashboard, or an instrument panel, a housing application such as a refrigerator, a washing machine, or a vacuum cleaner, a household good such as a dish, a bucket, or a bath product, a miscellaneous good such as a toy, or a reserve/storage container such as a tank; a film; and a fiber.

Next, a resin composition in still another preferred embodiment of the present invention will be described.

The resin composition in still another preferred embodiment of the present invention is a thermoplastic resin composition containing, based on 100 parts by mass of a thermoplastic resin, 0.001 to 10 parts by mass of the phosphoric acid ester compound (A) represented by the above general formula (1), a fatty acid sodium (B) represented by the above general formula (2), and 0.001 to 10 parts by mass of a light stabilizer (H), wherein the mass ratio of the component (B) to the component (A), (B)/(A) is 0.55 to 2.0. The resin composition satisfying such requirements is a resin composition which can obtain a thermoplastic resin composition containing a light stabilizer, while exhibiting an excellent nucleating agent effect and a molded article thereof. Also in the present embodiment, the resin additive composition of the present invention may be used. Also as for a thermoplastic resin, the above-described materials can be used.

<(H) Light Stabilizer>

Next, the light stabilizer (H) used in the resin composition according to still another embodiment of the present invention will be described. In the resin composition according to still another embodiment of the present invention, it is preferable that the light stabilizer (H) contains a hindered amine compound (I) and/or an ultraviolet absorber (J).

Examples of the hindered amine compound (I) usable in the resin composition according to still another preferred embodiment of the present invention include a compound having a structure of 2,2,6,6-tetramethylpiperidyl, and examples thereof include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl) sebacate, bis(2,2,6,6-tetramethyl-1-(octyl oxy)piperidyl-4-yl)sebacate, methyl (1,2,2,6,6-pentamethyl-4-piperidyl) sebacate, butane-1,2,3,4-tetracarboxylic acid tetrakis(2,2,6, 6-tetramethyl-4-piperidinyl), butane-1,2,3,4-tetracarboxylic acid tetrakis(1,2,2,6,6-pentamethyl-4-piperidinyl), bis(2,2,6, 6-tetramethyl-4-piperidyl).di(tridecyl)-1,2,3,4-butane tetracarboxylate, bis(1,2,2,6,6-pentamethyl-4-piperidyl)-di(tridecyl)-1,2,3,4-butane tetracarboxylate, bis(1,2,2,4,4-pentamethyl-4-piperidyl)-2-butyl-2-(3,5-di-tert-butyl-4-hydroxy benzyl)malonate, 1-(2-hydroxyethyl)-2,2,6,6-tetramethyl-4-piperidinol/succinic acid diethyl polycondensate, 1,6-bis(2,2,6,6-tetramethyl-4-piperidyl amino)hexane/2,4-dichloro-6-morpholino-s-triazine polycondensate, 1,6-bis(2,2,6,6-tetramethyl-4-piperidyl amino) hexane/2,4-dichloro-6-tert-octyl amino-s-triazine polycondensate, a polycondensate of sebacic acid 1-methyl-10-(1, 2,2,6,6-pentamethyl-4-piperidyl) and bis(2,2,6,6-tetramethyl-4-piperidyl)sebacate, butane tetracarboxylic acid tetramethyl ester, and ester of spiroglycol and N-methyl piperidinol, butane tetracarboxylic acid, a polycondensate of esters of 3-hydroxy-2,2-dimethyl pentanal and N-methyl piperidinol, 1,2,3,4-butane tetracarboxylic acid tetramethyl ester, a polycondensate of 2,2,6,6-tetramethyl-4-piperidinol and β,β, β', β',-tetramethyl-2,4,8,10-tetraoxaspiro[5.5]undecane-3,9-diethanol, 2,4-dichloro-6-(1,1,3,3-tetramethylbutyl amino)-1,3,5-triazine-N,N'-bis(2,2,6,6-tetramethyl-4-piperidyl)hexamethylene diamine polycondensate, 2,4-dichloro-6-(1,1,3,3-tetramethylbutyl amino)-1,3,5-triazine, 1,5,8,12-tetrakis[2,4-bis(N-butyl-N-(2,2,6,6-tetramethyl-4-piperidyl)amino)-s-triazine-6-yl]-1,5,8,12-tetraaza dodecane, 1,5,8,12-tetrakis[2,4-bis(N-butyl-N-(1,2,2,6,6-pentamethyl-4-piperidyl)amino)-s-triazine-6-yl]-1,5,8-12-tetraaza dodecane, 1,6,11-tris[2,4-bis(N-butyl-N-(2,2,6,6-tetramethyl-4-piperidyl)amino)-s-triazine-6-yl]amino undecane, 1,6,11-tris[2,4-bis(N-butyl-N-(1,2,2,6,6-pentamethyl-4-piperidyl)amino)-s-triazine-6-yl]amino undecane, bis{4-(1-octyl oxy-2,2,6,6-tetramethyl)piperidyl}decane dionate, bis{4-(2,2,6,6-tetramethyl-1-undecyl oxy)piperidyl)carbonate, trade name "CHIMASSORB 119" manufactured by BASF SE, trade name "CHIMASSORB 944" manufactured by BASF SE, trade name "CHIMASSORB 2020" manufactured by BASF SE, trade name "TINUVIN® XT 850" manufactured by BASF SE, TINUVIN® NOR 371 manufactured by BASF SE, trade names "ADK STAB LA-77", "ADK STAB LA-94", "ADK STAB LA-402XP", "ADK STAB LA-402AF", "ADK STAB LA-40MP", and "ADK STAB LA-502XP" manufactured by ADEKA CORPORATION.

In the resin composition according to still another preferred embodiment of the present invention, the hindered amine compound (I) may be a mixture of two or more kinds thereof, or a master batch containing them. The hindered amine compound (I) which is in a liquid state at room temperature, or which is in a fluid state due to non-heating or heating may be impregnated in a carrier described below.

In the resin composition according to still another preferred embodiment of the present invention, as a hindered amine compound (I) preferably used, a compound represented by the following general formula (11) will be described:

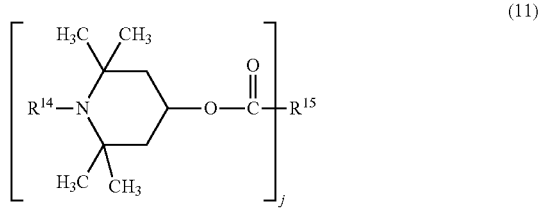

(11)

In the formula (11), $R^{14}$ represents a hydrogen atom, a hydroxy group, a linear or branched alkyl group having 1 to 30 carbon atoms, a hydroxyalkyl group, an alkoxy group, a hydroxyalkoxy group, or an oxy radical, $R^{15}$ represents a linear or branched aliphatic hydrocarbon group having 1 to 31 carbon atoms or a substituent represented by general formula (12) below, j represents an integer of 1 to 4, and when $R^5$ is a substituent represented by the general formula (12), j represents 1.

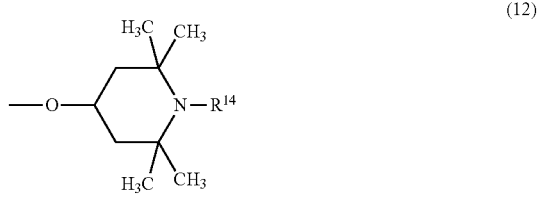

(12)

In the formula (12), $R^{14}$ represents the same as in the formula (11).

Examples of the linear or branched alkyl group having 1 to 30 carbon atoms represented by $R^{14}$ in the general formula (11) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl, octadecyl, and triacontyl.

Examples of the hydroxyalkyl group having 1 to 30 carbon atoms represented by $R^{14}$ in the general formula (11) include a hydroxyl group-substituted product of the above alkyl groups such as hydroxyethyl, 2-hydroxypropyl, or 3-hydroxypropyl.

Examples of the alkoxy group having 1 to 30 carbon atoms represented by $R^{14}$ in the formula (11) include methoxy, ethoxy, propoxy, isopropoxy, butoxy, octoxy, 2-ethylhexyloxy, undecyloxy, and triacontadecyloxy corresponding to the above alkyl groups.

Examples of the hydroxyalkoxy group having 1 to 30 carbon atoms represented by $R^{14}$ in the general formula (11) include a hydroxy substituted derivative of the above alkoxy group such as hydroxyethyloxy, 2-hydroxypropyloxy, 3-hydroxypropyloxy, 4-hydroxybutyloxy, 2-hydroxy-2-methylpropyloxy, or 6-hydroxyhexyloxy.

A linear or branched aliphatic hydrocarbon group having 1 to 31 carbon atoms represented by $R^{15}$ in the general formula (11) is one containing a monovalent, divalent, trivalent, or tetravalent aliphatic hydrocarbon group. Examples of the linear or branched monovalent aliphatic hydrocarbon group having 1 to 31 carbon atoms include an alkyl group such as methyl, ethyl, propyl, isopropyl, cyclopropyl, butyl, sec-butyl, tert-butyl, isobutyl, amyl, isoamyl, tert-amyl, cyclopentyl, hexyl, 2-hexyl, 3-hexyl, cyclohexyl, bicyclohexyl, 1-methylcyclohexyl, heptyl, 2-heptyl, 3-heptyl, isoheptyl, tert-heptyl, n-octyl, isooctyl, tert-octyl, 2-ethylhexyl, nonyl, isononyl, decylundecyl, dodecyl, or triacontyl; and an alkenyl group such as vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, bicyclohexenyl, heptenyl, octenyl, decenyl, pentadecenyl, heptadecenyl, eicosenyl, or triacontanyl (the position of a double bond may be at the α-position, at the internal position, or at the co-position).

Examples of the linear or branched divalent aliphatic hydrocarbon group having 1 to 31 carbon atoms include an alkylene such as methylene, ethylene, propylene, butylene, or butyldiyl; those in which a methylene chain of the above alkylene is replaced by —O—, —S—, —CO—O—, or —O—CO—; a residue of a diol such as ethanediol, propanediol, butanediol, pentanediol, or hexanediol; and a residue of a dithiol such as ethanedithiol, propanedithiol, butanedithiol, pentanedithiol, or hexanedithiol.

Examples of the linear or branched trivalent aliphatic hydrocarbon group having 1 to 31 carbon atoms include an alkanetriyl group such as propanetriyl, butanetriyl, or heptanetriyl, an alkenetriyl group such as butenetriyl or heptenetriyl, and an alkylidyne such as propylidyne or 1,1,3-butylidine.

Examples of the linear or branched tetravalent aliphatic hydrocarbon group having 1 to 31 carbon atoms include an alkane tetrayl group such as butanetetrayl, pentanetetrayl, or octane tetrayl and an alkenetetrayl group such as pentenetetrayl, heptenetetrayl, or octenetetrayl.

Specific examples of the structure of the hindered amine compound represented by the general formula (11) include compounds below. However, the resin composition according to still another preferred embodiment of the present invention is not subject to any restriction by the compounds below. The compound in which $R^5$ in the general formula (11) is RA represents a mixture of hindered amine compounds in which $R^{15}$ is an alkyl group having 15 to 17 carbon atoms, and the compound in which $R^{15}$ in the general formula (11) is RB represents a mixture of hindered amine compounds in which $R^{15}$ is an alkyl group having 13 to 19 carbon atoms.

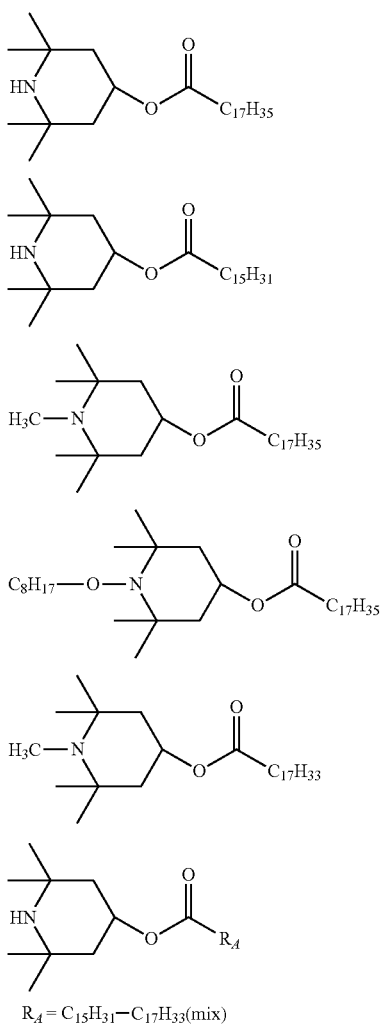

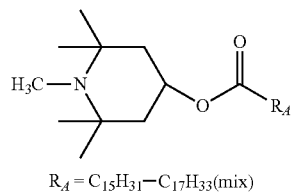

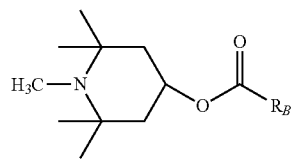

Examples of a product using the compound represented by the general formula (11) include "Cyasorb® UV-3808PP5" and "Cyasorb® Cynergy V-703" manufactured by Cytec Industries, Inc., and "ADK STAB LA-77", "ADK STAB LA-81", "ADK STAB LA-402AF" (master batch), and "ADK STAB LA-402XP" (master batch) manufactured by ADEKA CORPORATION.

In the resin composition according to still another preferred embodiment of the present invention, examples of the hindered amine compound (I) preferably used include the compounds represented by the following general formulae (13) to (16).

(13)

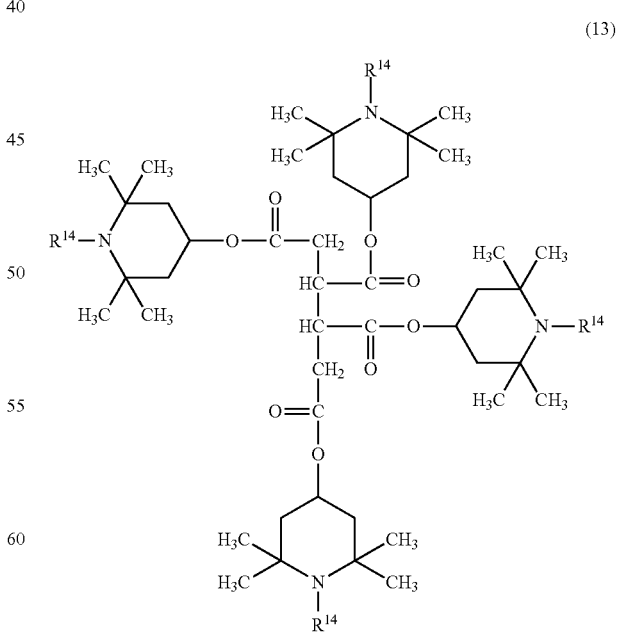

In the formula (13), $R^{14}$ represents the same as in the formula (11).

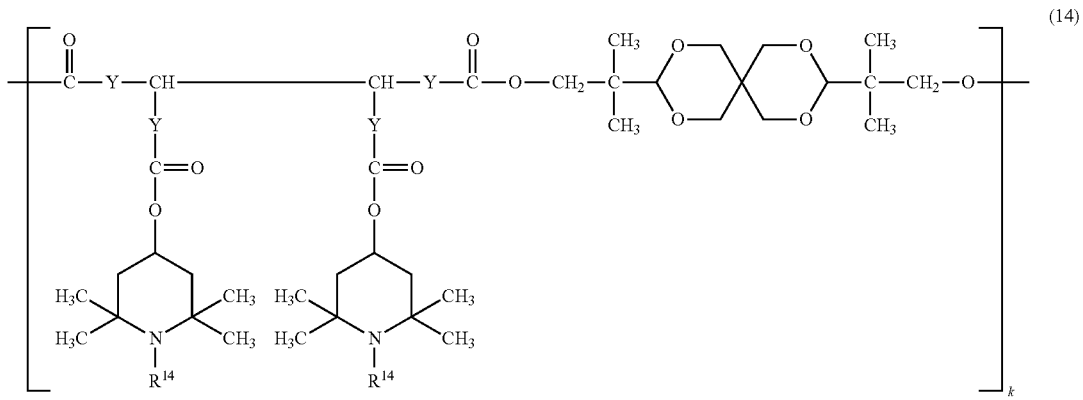

(14)

In the formula (14), a plurality of $R^4$s are the same as in the formula (11), Y is a direct bond or a methylene group, and k is an integer of 1 to 20.

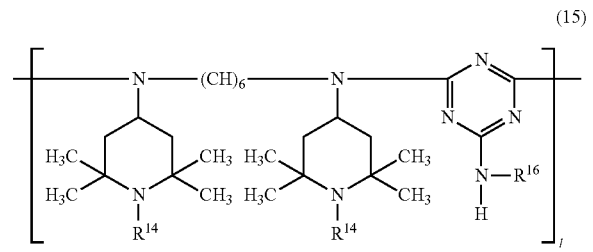

(15)

In the formula (15), $R^{14}$ represents the same as in the formula (11), $R^{16}$ represents a linear or branched alkyl group having 1 to 31 carbon atoms, a linear or branched alkenyl group having 2 to 31 carbon atoms, a 2,2,6,6-tetramethylpiperidyl group, or a 1,2,2,6,6-pentamethylpiperidyl group, and l represents an integer of 2 to 20.

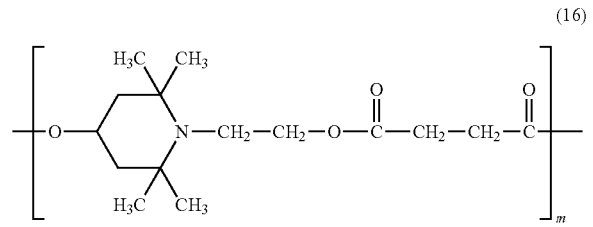

(16)

In the formula (16), m represents an integer of 2 to 20.

Examples of a product using the compound represented by the general formula (13) include "ADK STAB LA-52", "ADK STAB LA-57", and "ADK STAB LA-502XP" (master batch) manufactured by ADEKA CORPORATION.

Examples of a product using the compound represented by the general formula (14) include "ADK STAB LA-63P" and "ADK STAB LA-68" manufactured by ADEKA CORPORATION.

Examples of a product using the compound represented by the general formula (15) include "ADK STAB LA-94" manufactured by ADEKA CORPORATION and "Chimassorb® 944", "Tinuvin® 783", "Tinuvin® 791", "Irgastab® FS-210", and "Irgastab® FS-410" manufactured by BASF SE.

Examples of a product using the compound represented by the general formula (16) include "Tinuvin® 622", "Tinuvin® 111", and "Tinuvin® 783" manufactured by BASF SE.

In the resin composition according to still another preferred embodiment of the present invention, the blending amount of the hindered amine compound (I) is, based on 100 parts by mass of the thermoplastic resin, preferably 0.001 to 10 parts by mass, and more preferably 0.01 to 0.5 parts by mass.

Next, an ultraviolet absorber (J) used in the resin composition according to still another preferred embodiment of the present invention will be described. In the present invention, the UV absorber (J) can be used without particular limitation as long as the absorber is a known compound. Specific examples of the compound include a 2-(2-hydroxy phenyl)benzotriazole such as 2-(2-hydroxy-5-methyl phenyl)benzotriazole, 2-(2-hydroxy-5-tert-octyl phenyl)benzotriazole, 2-(2-hydroxy-3,5-di-tert-butyl phenyl)-5-chloro benzotriazole, 2-(2-hydroxy-3-tert-butyl-5-methyl phenyl)-5-chloro benzotriazole, 2-(2-hydroxy-3,5-dicumylphenyl) benzotriazole, 2,2'-methylene bis(4-tert-octyl-6-benzo triazolyl phenol), 2,2'-methylene bis(4-ethyl hydroxy-6-benzo triazolyl phenol), 2,2'-methylene bis(4-methyl-6-benzo triazolyl phenol), a poly ethylene glycol ester of 2-(2-hydroxy-3-tert-butyl-5-carboxy phenyl)benzotriazole, 2-[2-hydroxy-3-(2-acryloyloxy ethyl)-5-methyl phenyl]benzotriazole, 2-[2-hydroxy-3-(2-methacryloyloxy ethyl)-5-tert-butyl phenyl]benzotriazole, 2-[2-hydroxy-3-(2-methacryloyloxy ethyl)-5-tert-octyl phenyl]benzotriazole, 2-[2-hydroxy-3-(2-methacryloyloxy ethyl)-5-tert-butyl phenyl]-5-chloro benzotriazole, 2-[2-hydroxy-5-(2-methacryloyloxy ethyl)phenyl]benzotriazole, 2-[2-hydroxy-3-tert-butyl-5-(2-methacryloyloxy ethyl)phenyl]benzotriazole, 2-[2-hydroxy-3-tert-amyl-5-(2-methacryloyloxy ethyl)phenyl] benzotriazole, 2-[2-hydroxy-3-tert-butyl-5-(3-methacryloyloxy propyl)phenyl]-5-chloro benzotriazole, 2-[2-hydroxy-4-(2-methacryloyloxy methyl)phenyl]benzotriazole, 2-[2-hydroxy-4-(3-methacryloyloxy-2-hydroxy propyl)phenyl]benzotriazole, or 2-[2-hydroxy-4-(3-methacryloyloxy propyl)phenyl]benzotriazole; a phenol-containing triazine such as 2-(4,6-diphenyl-1,3,5-triazine-2-yl)-5-(hexyl oxy)phenol, 2-(4,6-diphenyl-1,3,5-triazine-2-yl)-5-(octyl oxy)phenol, 2-(4,6-bis(4-butoxy-2-methyl phenyl)-1,3,5-triazine-2-yl)-3,5-dibutoxy phenol, 2-(4,6-bis(2,4-dimethyl phenyl)-1,3,5-triazine-2-yl)-5-(3-(2-ethyl hexyl oxy)-2-hydroxy propoxy)phenol, 2-(4,6-di([1,1'-biphenyl]-4-yl)-1,3,5-triazine-2-yl)-5-hexyl oxy phenol, or 2-methyl hexyl-2-(4,(4,6-di([1,1'-biphenyl]-4-yl)-1,3,5-triazine-2-yl)-

3-hydroxy phenoxy)propanoate; a 2-hydroxy benzophenone such as 2,2'-dihydroxy-4, 4'-dimethoxy benzophenone, 2,4-dihydroxy benzophenone, 5, 5'-methylene bis(2-hydroxy-4-methoxy benzophenone), or 1,4-bis(4-benzoyl-3-hydroxy phenoxy)-butane; a benzoate such as resorcinol monobenzoate, 2,4-di-tert-butyl phenyl-3,5-di-tert-butyl-4-hydroxy benzoate, octyl (3,5-di-tert-butyl-4-hydroxy)benzoate, dodecyl (3,5-di-tert-butyl-4-hydroxy)benzoate, tetradecyl (3,5-di-tert-butyl-4-hydroxy)benzoate, hexadecyl (3,5-di-tert-butyl-4-hydroxy)benzoate, octadecyl(3,5-di-tert-butyl-4-hydroxy)benzoate, or behenyl(3,5-di-tert-butyl-4-hydroxy)benzoate; a substituted oxanilide such as 2-ethyl-2'-ethoxy oxanilide or 2-ethoxy-4'-dodecyl oxanilide; a cyanoacrylate such as ethyl-2-cyano-3, 3-diphenyl acrylate, 2'-ethyl hexyl-2-cyano-3,3-diphenyl acrylate, ethyl-α-cyano-β,β-diphenyl acrylate, methyl-2-cyano-3-methyl-3-(p-methoxy phenyl)acrylate, 4-(2-cyano-3-(4-ethyl phenoxy)-3-oxo propenyl)phenyl-4-propyl cyclohexane-1-carboxylate, 4-(2-cyano-3-(4-ethyl phenoxy)-3-oxo propenyl)phenyl-4-propyl benzoate, 4-butyl phenyl-4-(2-cyano-3-oxo-3-(4-propyl phenoxy)propenyl)benzoate, 4-(2-cyano-3-(4-cyano phenoxy)-3-oxo propenyl)phenyl-4-pentyl benzoate, 4-(2-cyano-3-(4-fluoro phenoxy)-3-oxo propenyl)phenyl-4-methyl cyclohexane-1-carboxylate, 4-(2-cyano-3-(4-methoxy phenoxy)-3-oxo propenyl)phenyl-4-hexyl cyclohexane-1-carboxylate, 4-(2-cyano-3-(4-ethoxy phenoxy)-3-oxo propenyl)phenyl-4-octyl cyclohexane-1-carboxylate, 4-(2-cyano-3-oxo-3-(4-propoxy phenoxy)propenyl)phenyl-4-propyl cyclohexane-1-carboxylate, 4-(2-cyano-3-oxo-3-(4-pentyl phenoxy)propenyl)phenyl-4-propyl cyclohexane-1-carboxylate, 4-(2-cyano-3-(4-octyl phenoxy)-3-oxo propenyl)-4-propyl cyclohexane-1-carboxylate, or 1,3-bis-[(2'-cyano-3',3'-diphenyl acryloyl)oxy]-2,2-bis-[[(2'-cyano-3',3'-diphenyl acryloyl)oxy]methyl]propane; a salicylic acid such as 4-tert-butylphenyl salicylate, amyl salicylate, menthyl salicylate, homomenthyl salicylate, octyl salicylate, phenyl salicylate, benzyl salicylate, or μ-isopropanolphenyl salicylate, and a variety of metal salts or metal chelates thereof, in particular, a salt or chelate of nickel or chromium.

In the resin composition according to still another preferred embodiment of the present invention, the ultraviolet absorber (J) may be a mixture of two or more kinds, or a master batch containing them. Those in which the ultraviolet absorber is in a liquid state at ordinary temperature or those in which the ultraviolet absorber is in a fluid state due to non-heating or heating may be impregnated in a carrier described below.

In the present invention, compounds represented by general formulae (17) to (21) below are preferably used as the ultraviolet absorber (J).

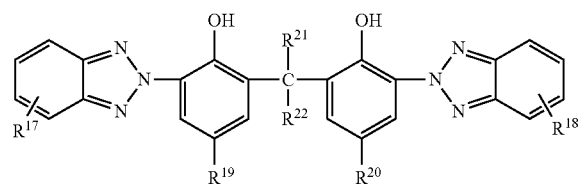

(17)

Here, $R^{17}$ and $R^{18}$ each independently represent a hydrogen atom, a chlorine atom, or a linear or branched alkyl group having 1 to 4 carbon atoms, $R^{19}$ and $R^{20}$ each independently represent a hydrogen atom or a linear or branched alkyl group having 1 to 18 carbon atoms, a hydroxyalkyl group having 1 to 18 carbon atoms, an alkoxy group having 1 to 18 carbon atoms, a hydroxyalkoxy group having 1 to 18 carbon atoms, or an alkylaryl group having 7 to carbon atoms, and $R^{21}$ and $R^{22}$ each independently represent a hydrogen atom or a linear or branched alkyl group having 1 to 4 carbon atoms.

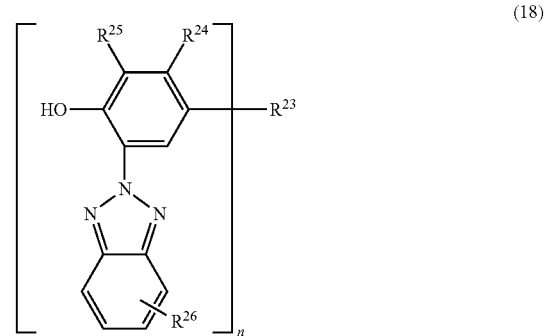

(18)

Here, $R^{26}$ represents a hydrogen atom, a chlorine atom or a linear or branched alkyl group having 1 to 4 carbon atoms, $R^{24}$ and $R^{25}$ each independently represent a hydrogen atom, a linear or branched alkyl group having 1 to 18 carbon atoms, a hydroxyalkyl group having 1 to 18 carbon atoms, an alkoxy group having 1 to 18 carbon atoms, a hydroxyalkoxy group having 1 to 18 carbon atoms, or an alkylaryl group having 7 to 30 carbon atoms, and n represents 1 or 2, when n is 1, $R^{23}$ represents a hydrogen atom, a linear or branched alkyl group having 1 to 18 carbon atoms, a hydroxyalkyl group having 1 to 18 carbon atoms, an alkoxy group having 1 to 18 carbon atoms, a hydroxyalkoxy group having 1 to 18 carbon atoms, or an alkylaryl group having 7 to 30 carbon atoms, and when n is 2, $R^{23}$ represents an alkanediyl group having 1 to 20 carbon atoms, and an alkyl group, a hydroxyalkyl group, an alkoxy group, a hydroxyalkoxy group, an alkylaryl group, and a methylene group in the alkanediyl group represented by $R^{24}$, $R^{25}$, or $R^{26}$ is optionally substituted with ethylene glycol, propylene glycol, —O—, —CO—, —OCO—, or —COO—.

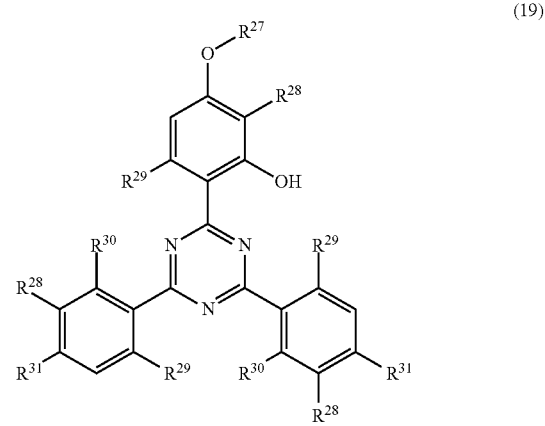

(19)

Here, $R^{27}$ represents a linear or branched alkyl group having 1 to 20 carbon atoms, a cycloalkyl group having 3 to 8 carbon atoms, an alkenyl group having 3 to 20 carbon atoms, an aryl group having 6 to 20 carbon atoms, an alkylaryl group having 7 to 30 carbon atoms, or an arylalkyl group having 7 to 30 carbon atoms, $R^{28}$ represents a hydrogen atom, a linear or branched alkyl group having 1 to 8 carbon atoms or an alkenyl group having 3 to 8 carbon atoms, $R^{29}$ and $R^{30}$ each represent a hydrogen atom, a hydroxyl group, or a linear or branched alkyl group having 1 to 8 carbon atoms, $R^{31}$ represents a hydrogen atom, an alkyl group having 1 to 8 carbon atoms, an aryl group having 6 to 20 carbon atoms, or —O-$R^{27}$, a carbon atom forming a cyclic structure of a methylene group and a cycloalkyl group in an alkyl group, an alkenyl group, an alkylaryl group, and an arylalkyl group of $R^{27}$ to $R^{31}$ may be replaced by —O—, —S—, —CO—, —O—CO—, —CO—O—, or —NR'—, an alkyl group, a cycloalkyl group, an alkenyl group, an aryl group, an alkylaryl group, and an arylalkyl group may be substituted with a hydroxy group, a halogen atom, an alkyl group having 1 to 12 carbon atoms, or an alkoxy group having 1 to 12 carbon atoms, $R^1$ represents a hydrogen atom or an alkyl group having 1 to 18 carbon atoms, and a plurality of $R^{27}$, $R^{28}$, $R^{29}$, $R^{30}$, and $R^{11}$ may be the same or different.

to 15 carbon atoms, or a methacryloyloxyalkoxy group having 5 to 15 carbon atoms, and $R^{35}$ and $R^{36}$ each independently represent a hydrogen atom, a hydroxy group, a sulfonyl group, a sodium sulfonyl group, or a hydroxysulfonyl group.

Examples of the linear or branched alkyl group having 1 to 4 carbon atoms represented by $R^{17}$, $R^{18}$, $R^{21}$, and $R^{22}$ in the general formula (17) include methyl, ethyl, propyl, isopropyl, butyl, isobutyl, sec-butyl, and tert-butyl.

Examples of the linear or branched alkyl group having 1 to 18 carbon atoms represented by $R^{19}$ and $R^{20}$ in the general formula (17) include, in addition to the above alkyl groups, pentyl, sec-pentyl, tert-pentyl, hexyl, heptyl, octyl, isooctyl, 2-ethyihexyl, tert-octyl, nonyl, isononyl, decyl, undecyl, dodecyl, tridecyl, tetradecyl, pentadecyl, hexadecyl, heptadecyl, and octadecyl.

Examples of the hydroxyalkyl group having 1 to 18 carbon atoms represented by $R^{19}$ and $R^{20}$ in the general formula (17) include a hydroxyl group substituted group of the above alkyl groups such as hydroxyethyl, 2-hydroxypropyl, or 3-hydroxypropyl.

Examples of the alkoxy group having 1 to 18 carbon atoms represented by $R^{19}$ and $R^{20}$ in the general formula (11) include methoxy, ethoxy, propoxy, isopropoxy, butoxy,

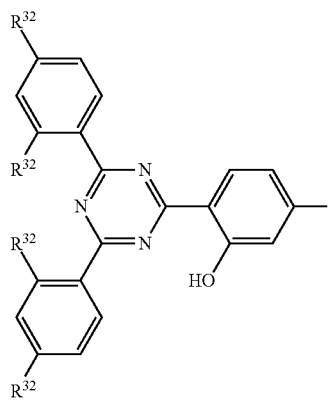

(20)

Here, R represents a hydrogen atom, a hydroxy group, or a linear or branched alkyl group having 1 to 8 carbon atoms, the plurality of $R^{32}$s may be the same or different, and t is a number of 2 to 14.

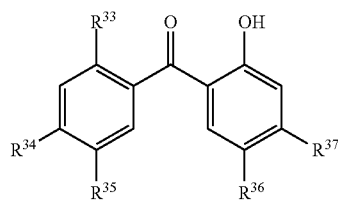

(21)

Here, $R^{33}$, $R^{34}$, and $R^{37}$ each independently represent a hydrogen atom, a hydroxy group, a carboxyl group, a linear or branched alkyl group having 1 to 18 carbon atoms, a hydroxyalkyl group having 1 to 18 carbon atoms, an alkoxy group having 1 to 18 carbon atoms, a hydroxyalkoxy group having 1 to 18 carbon atoms, an alkylaryl group having 7 to 30 carbon atoms, an alkoxyaryl group having 7 to 30 carbon atoms, acetophenone, an acryloyloxyalkoxy group having 4 octoxy, 2-ethylhexyloxy, undecyloxy, and octadecyloxy corresponding to the above alkyl groups.

Examples of the hydroxyalkoxy group having 1 to 18 carbon atoms represented by $R^{19}$ and $R^{20}$ in the general formula (17) include a hydroxy substituted product of the alkoxy group such as hydroxyethyloxy, 2-hydroxypropyloxy, 3-hydroxypropyloxy, 4-hydroxybutyloxy, 2-hydroxy-2-methylpropyloxy, or 6-hydroxyhexyloxy.

Examples of the alkylaryl group having 7 to 30 carbon atoms represented by $R^{19}$ and $R^{20}$ in the general formula (17) include a group in which one hydrogen atom of the alkyl group is substituted with an aryl group, and examples of the aryl group include phenyl, cresyl, xylyl, 2,6-xylyl, 2,4,6-trimethylphenyl, butylphenyl, nonylphenyl, biphenyl, naphthyl, and anthracenyl.

Specific examples of the structure of the compound represented by the general formula (17) include compounds below, however, the present invention is not limited by these compounds.

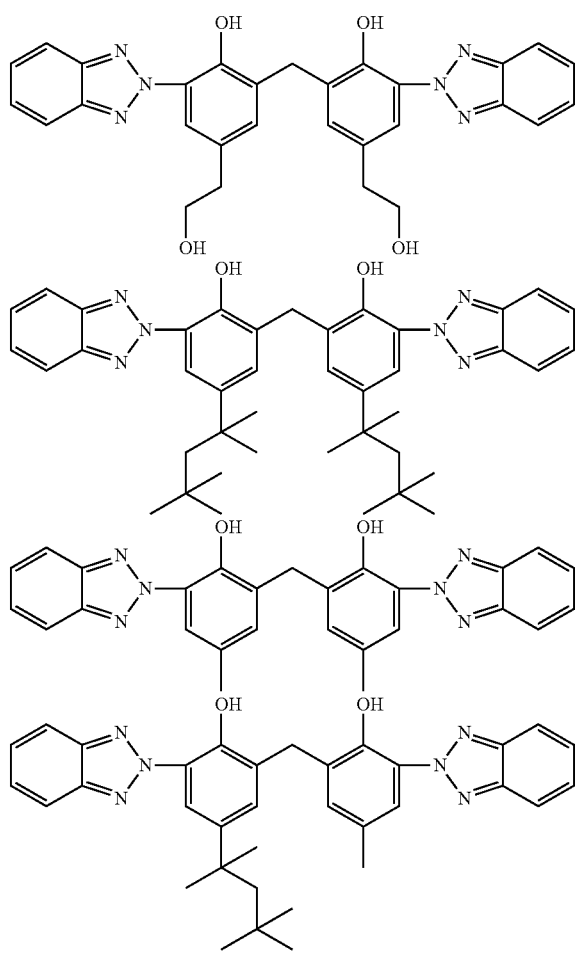

Examples of a commercially available product containing the compound represented by the general formula (17) include trade name "ADK STAB LA-31", "ADK STAB LA-31G", and "ADK STAB LA-31RG" manufactured by ADEKA Corporation, "RUVA-100" manufactured by Otsuka Chemical Co., Ltd., and trade names "Mixxim BB/150" and "Mixxim BB/200" manufactured by Fairmount Chemical Co. Inc.

In the general formula (18), an alkyl group having 1 to 18 carbon atoms, a hydroxyalkyl group having 1 to 18 carbon atoms, an alkoxy group having 1 to 18 carbon atoms, a hydroxyalkoxy group having 1 to 18 carbon atoms, and an alkylaryl group having 7 to 30 carbon atoms represented by $R^{23}$, $R^{24}$, or $R^{25}$ represent the same as defined above, and may be one in which a methylene group of an alkyl group, a hydroxyalkyl group, an alkoxy group, a hydroxyalkoxy group, or an alkylaryl group is substituted with ethylene glycol, propylene glycol, —O—, —CO—, —OCO—, or —COO—.

Examples of the arylalkyl group having 7 to 30 carbon atoms represented by $R^{21}$, $R^{24}$, and $R^{25}$ in the general formula (18) include a group in which one hydrogen atom of an aryl group is substituted with the above alkyl group.

Examples of the alkenyl group having 3 to 20 carbon atoms represented by $R^{23}$, $R^{24}$, and $R^{25}$ in the general formula (18) include vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, bicyclohexenyl, heptenyl, octenyl, decenyl, pentadecenyl, and eicosenyl.

Examples of the alkanediyl group having 1 to 20 carbon atoms represented by $R^{21}$ in the general formula (18) include methanediyl, ethanediyl, hexanediyl, and octanediyl, and also include those in which a methylene group of an alkanediyl group is substituted with ethylene glycol, propylene glycol, —O—, —CO—, —OCO—, or —COO—. Specific examples thereof include 1,6-hexanediyl-dibutyrate.

Examples of the alkanediyl group having 1 to 20 carbon atoms represented by $R^{23}$ in the general formula (18) include methanediyl, ethanediyl, hexanediyl, and octanediyl, and also include those in which a methylene group of an alkanediyl group is substituted with ethylene glycol, propylene glycol, —O—, —CO—, —OCO—, or —COO—. Specific examples thereof include 1,6-hexanediyl-dibutyrate.

Specific examples of the structure of the compound represented by the general formula (18) include compounds below, however, the present invention is not limited by these compounds.

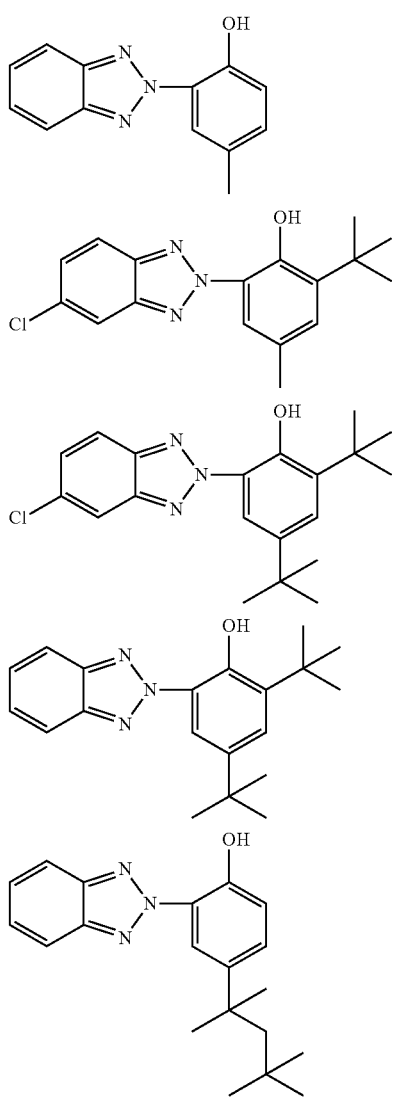

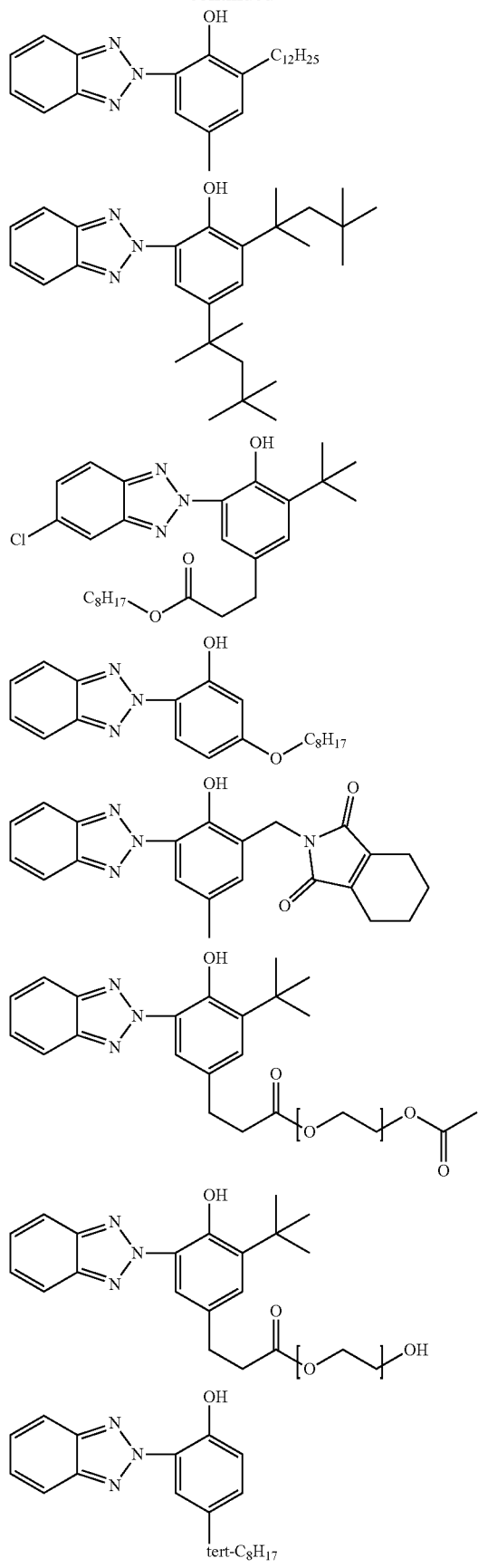
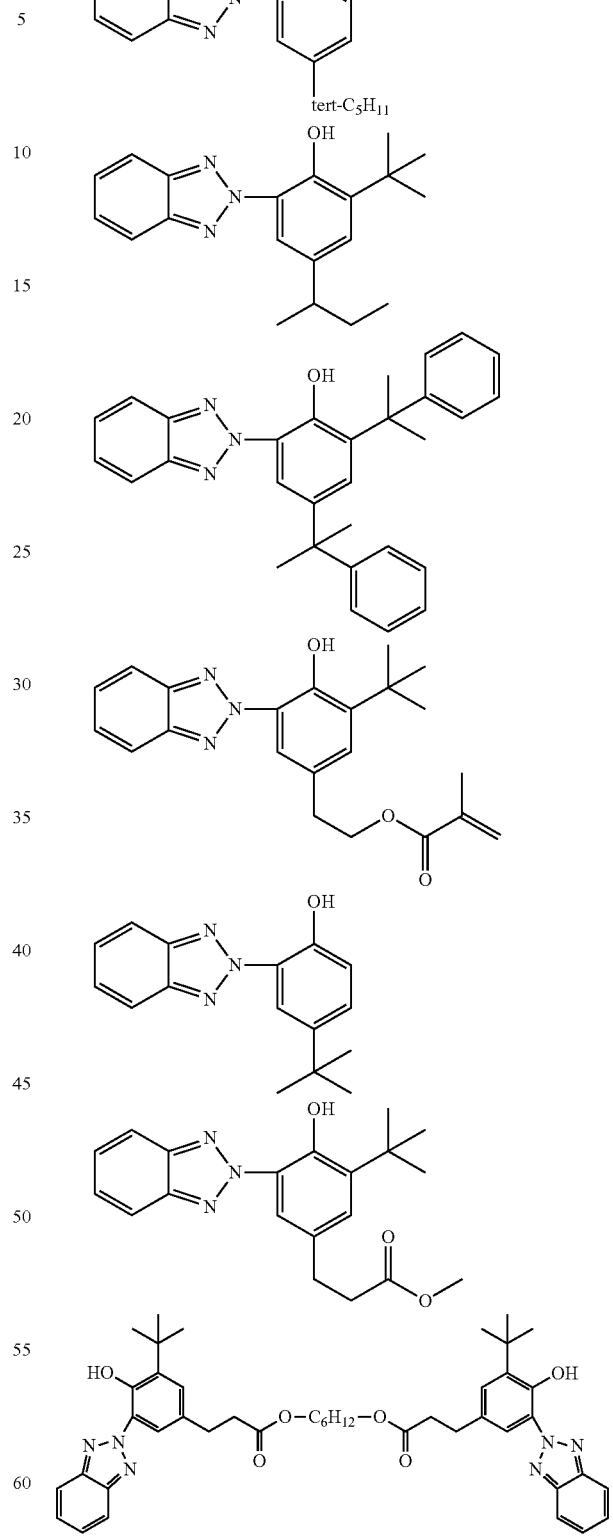
Examples of a product containing the compound represented by the general formula (18) include trade names "ADK STAB LA-29", "ADK STAB LA-32", "ADK STAB LA-36", and "ADK STAB LA-36RG" manufactured by ADEKA CORPORATION, trade names "Seesorb 704", "Seesorb 705", "Seesorb 706", "Seesorb 707", "Seesorb 708", and "Seesorb 709" manufactured by SHIPRO KASEI KAISHA, LTD., trade name "RUVA 93" manufactured by Otsuka Chemical Co., Ltd., trade name "Sumisorb™"250" manufactured by Sumitomo Chemical Company, Limited, and trade names "Tinuvin® 109", "Tinuvin® 213", "Tinuvin® 234", "Tinuvin® 327", "Tinuvin® 328", "Tinuvin® 350", "Tinuvin® 384", "Tinuvin® 571", and "Tinuvin® 1130" manufactured by BASF SE.

Examples of the linear or branched alkyl group having 1 to 20 carbon atoms represented by $R^{27}$ in the general formula (19) include nonadecyl and eicodecyl in addition to the above alkyl group.

Examples of the cycloalkyl group having 3 to 8 carbon atoms represented by $R^{27}$ in the general formula (19) include cyclopropyl, cyclobutyl, cyclopentyl, cyclohexyl, cycloheptyl, and cyclooctyl.

Examples of the alkenyl group having 3 to 20 carbon atoms represented by $R^{27}$ in the general formula (19) include vinyl, 1-methylethenyl, 2-methylethenyl, 2-propenyl, 1-methyl-3-propenyl, 3-butenyl, 1-methyl-3-butenyl, Isobutenyl, 3-pentenyl, 4-hexenyl, cyclohexenyl, bicyclohexenyl, heptenyl, octenyl, decenyl, pentadecenyl, and eicosenyl.

Examples of the aryl group having 6 to 20 carbon atoms represented by $R^{27}$ and $R^{31}$ in the general formula (19) include phenyl, cresyl, xylyl, 2,4-dimethylphenyl, 2,6-dimethylphenyl, 2,4,6-trimethylphenyl, butylphenyl, nonylphenyl, biphenyl, indenyl, naphthyl, dimethylnaphthyl, anthryl, and phenanthryl.

Examples of the alkylaryl group having 7 to 30 carbon atoms represented by $R^{27}$ in the general formula (19) include a group in which one hydrogen atom of the above alkyl group is substituted with the above aryl group.

Examples of the arylalkyl group having 7 to 30 carbon atoms represented by $R^{27}$ in the general formula (19) include a group in which one hydrogen atom of the above aryl group is substituted with the above alkyl group.

Examples of the alkyl group having 1 to 8 carbon atoms represented by $R^{28}$, $R^{29}$, $R^3$, and $R^{31}$ in the general formula (19) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl, and tert-octyl.

Examples of the alkenyl group having 3 to 8 carbon atoms represented by $R^{28}$ in the general formula (19) include 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, heptenyl, and octenyl.

The compound represented by the general formula (19) may have a structure in which a methylene group in the above alkyl group, alkenyl group, alkylaryl group, and arylalkyl group and a carbon atom forming a cyclic structure of a cycloalkyl group are replaced by —O—, —S—, —CO—, —O—CO—, —CO—O—, or —NR'—.

In the compound represented by the general formula (19), a hydrogen atom of the above alkyl group, cycloalkyl group, alkenyl group, alkylaryl group, and arylalkyl group may be substituted with a hydroxy group, a halogen atom, a linear or branched alkyl group having 1 to 12 carbon atoms, or an alkoxy group having 1 to 12 carbon atoms.

Specific examples of the structure of the compound represented by the general formula (19) include compounds below, however, the present invention is not limited by these compounds.

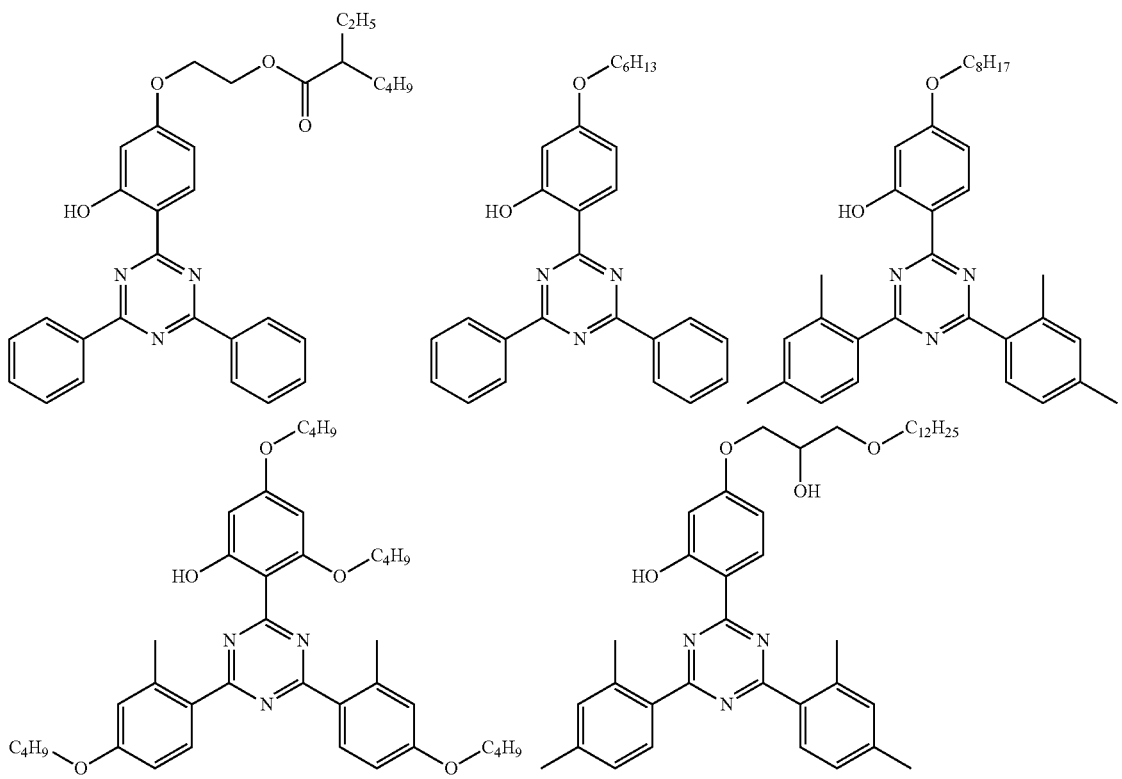

49 50
-continued
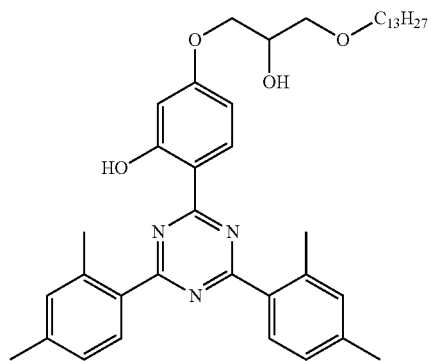
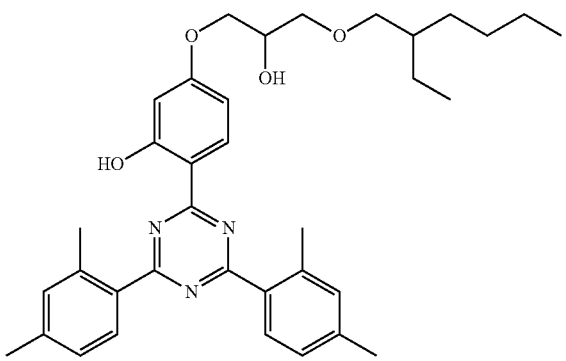
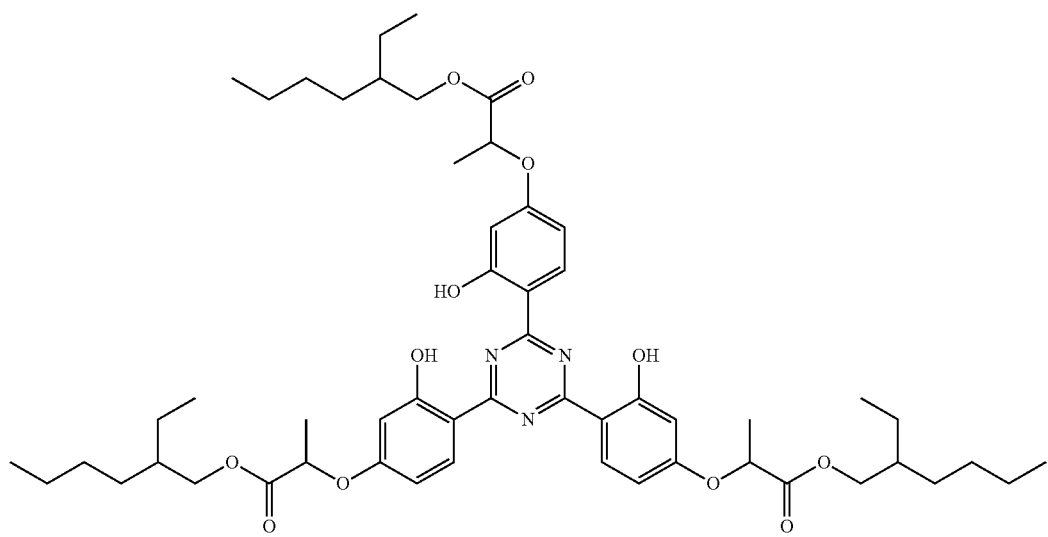
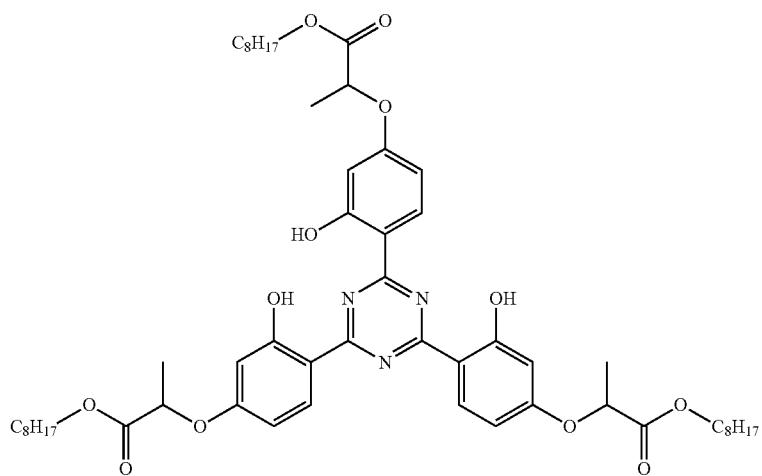

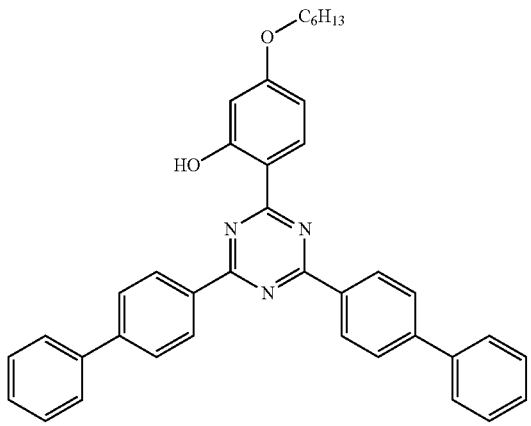
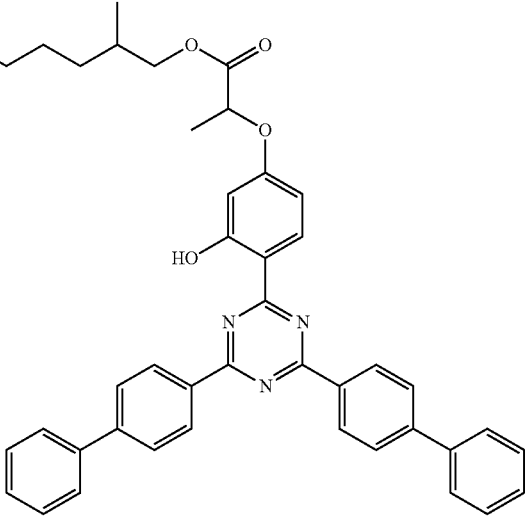

Examples of a product containing the compound represented by the general formula (19) include "ADK STAB LA-46", "ADK STAB LA-F70" manufactured by ADEKA CORPORATION, trade name "Cyasorb@ 1164" manufactured by Cytec Industries, Inc., "Tinuvin® 400", "Tinuvin® 405", "Tinuvin® 460", "Tinuvin® 477", "Tinuvin® 479", "Tinuvin® 1577", and "Tinuvin® 1600" manufactured by BASF SE.

Examples of the alkyl group having 1 to 8 carbon atoms represented by $R^{32}$ in the general formula (20) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl, and tert-octyl.

Specific examples of the structure of the compound represented by the general formula (20) include compounds below, however, the present invention is not limited by these compounds.

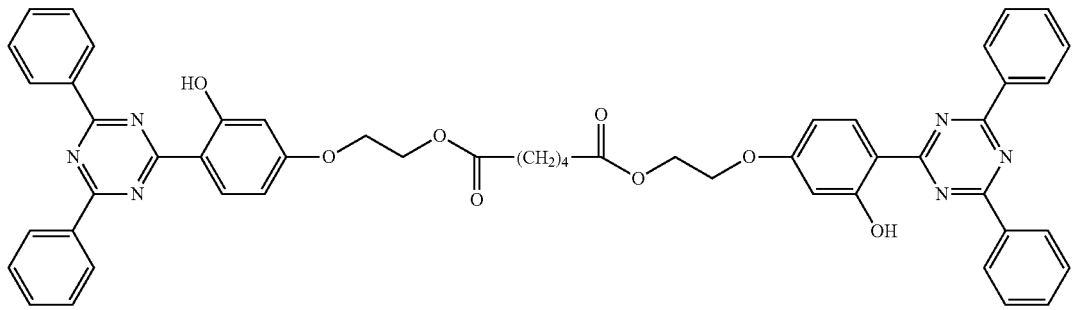

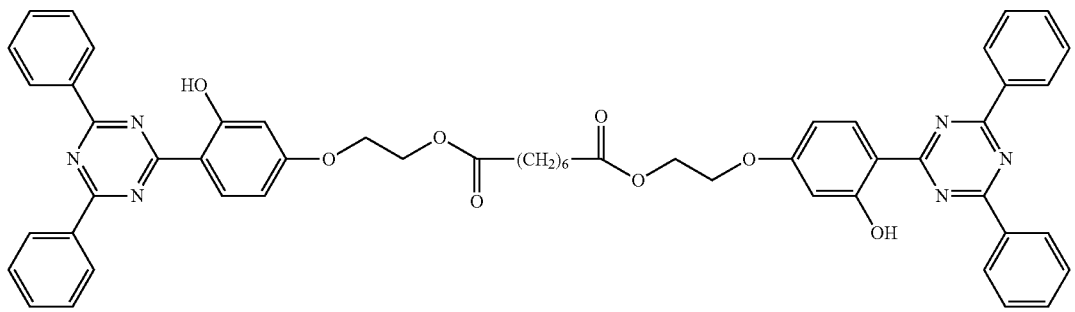

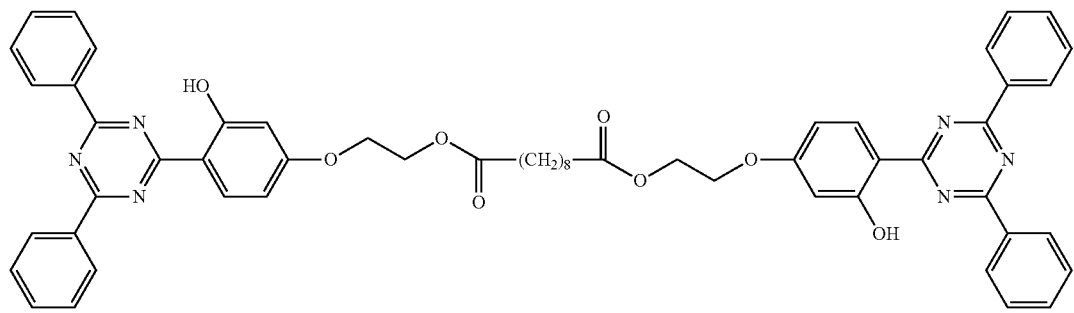
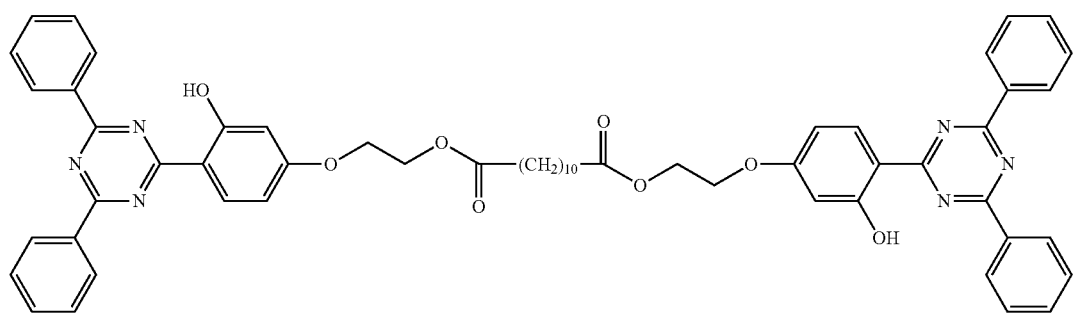
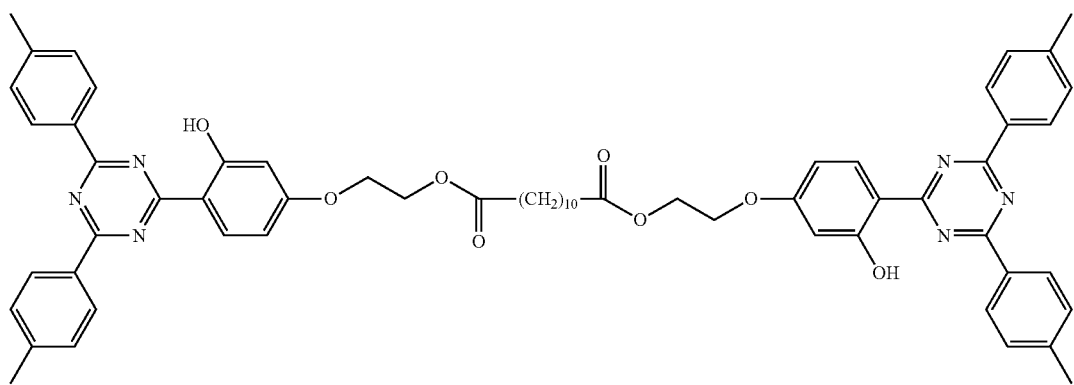
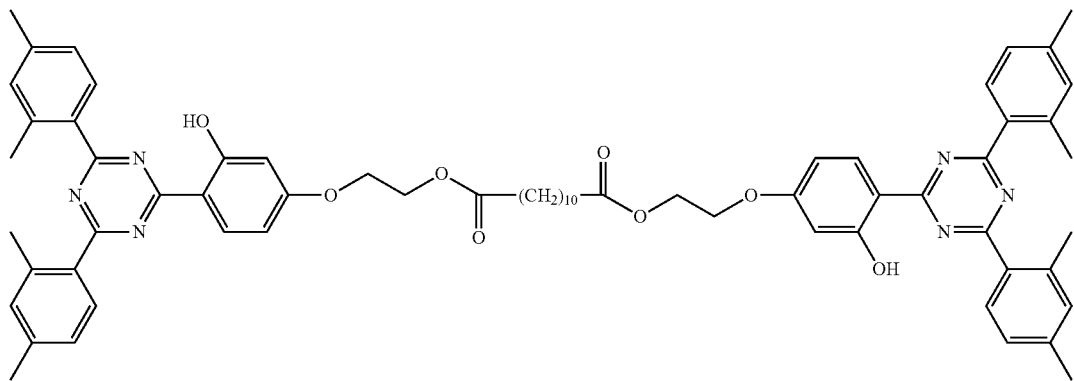

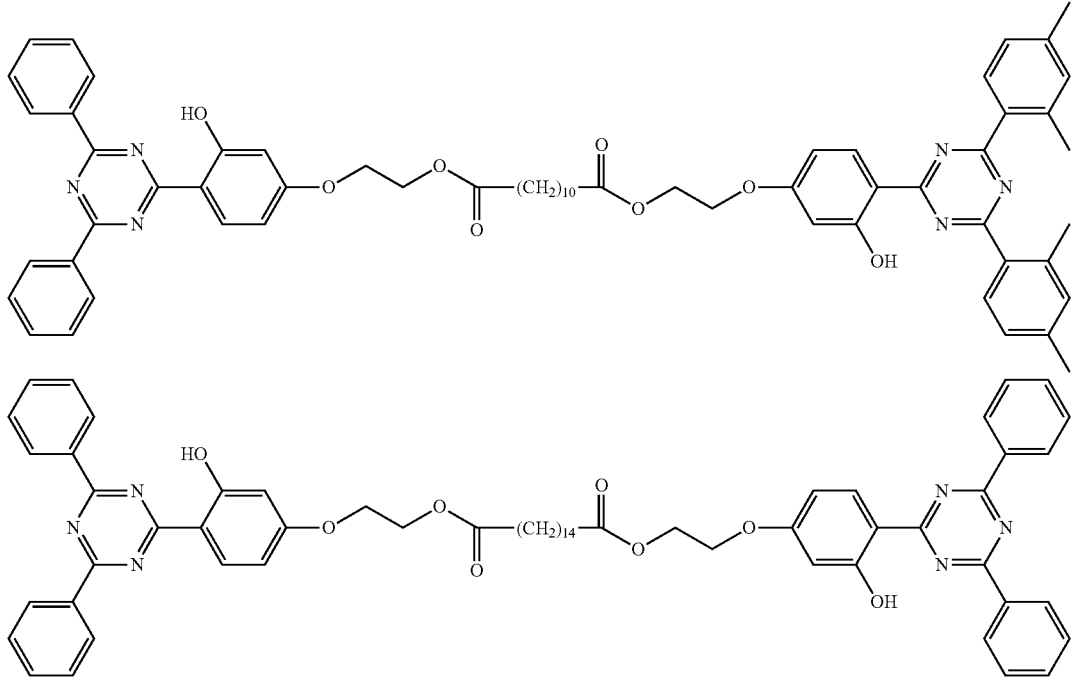

Examples of an alkyl group having 1 to 18 carbon atoms, a hydroxyalkyl group having 1 to 18 carbon atoms, an alkoxy group having 1 to 18 carbon atoms, a hydroxyalkoxy group having 1 to 18 carbon atoms, and an alkylaryl group having 7 to 30 carbon atoms represented by $R^{33}$, $R^{34}$ and $R^{37}$ in the general formula (21) include the same ones as described above.

Examples of an alkoxyaryl group having 7 to 30 carbon atoms represented by $R^{33}$, $R^{34}$, and $R^{37}$ in the general formula (21) include a group in which one hydrogen atom of the above alkoxy group having 1 to 18 carbon atoms is substituted with an aryl group, and examples thereof include benzyloxy.

Examples of an acryloyloxyalkoxy group having 4 to 15 carbon atoms or a methacryloyloxyalkoxy group having 5 to 15 carbon atoms represented by $R^{33}$, $R^{34}$, and $R^{37}$ in the general formula (21) include a (meth)acryloyloxymethoxy group, a (meth)acryloyloxyethoxy group, and a (meth)acryloyl(2-hydroxy)propoxy group.

Specific examples of the structure of the compound represented by the general formula (21) include compounds below, however, the present invention is not limited by these compounds.

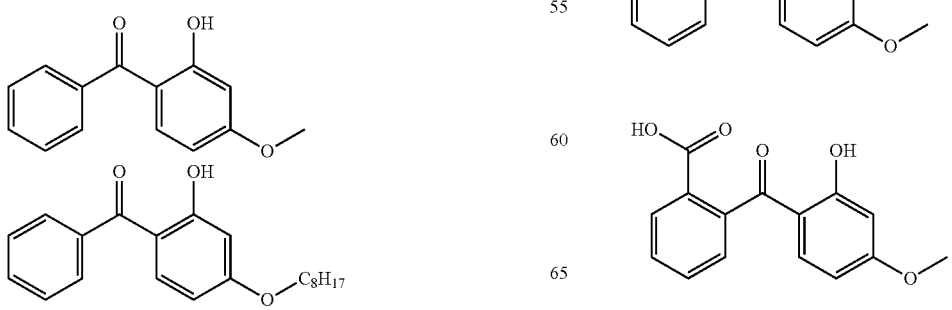

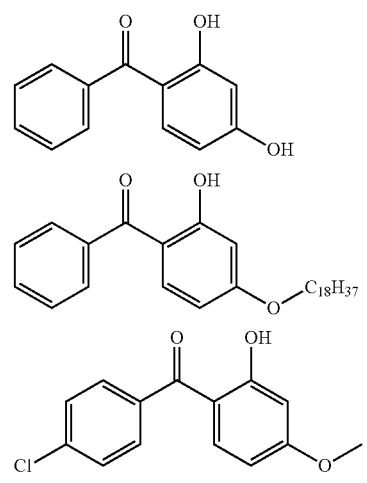

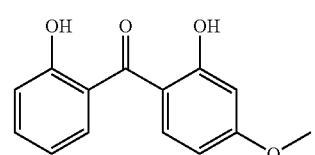

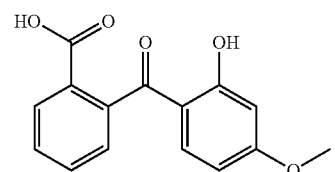

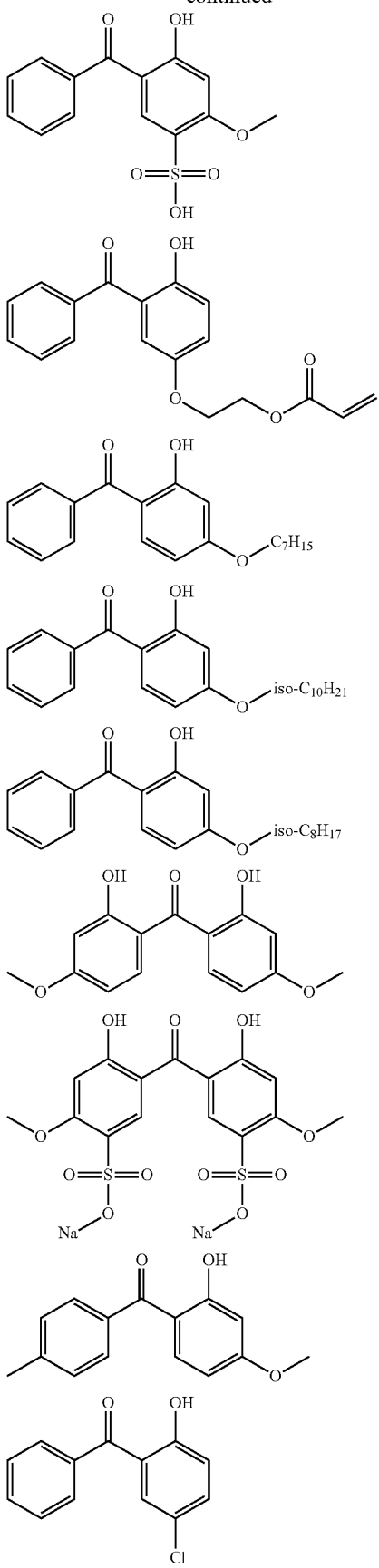

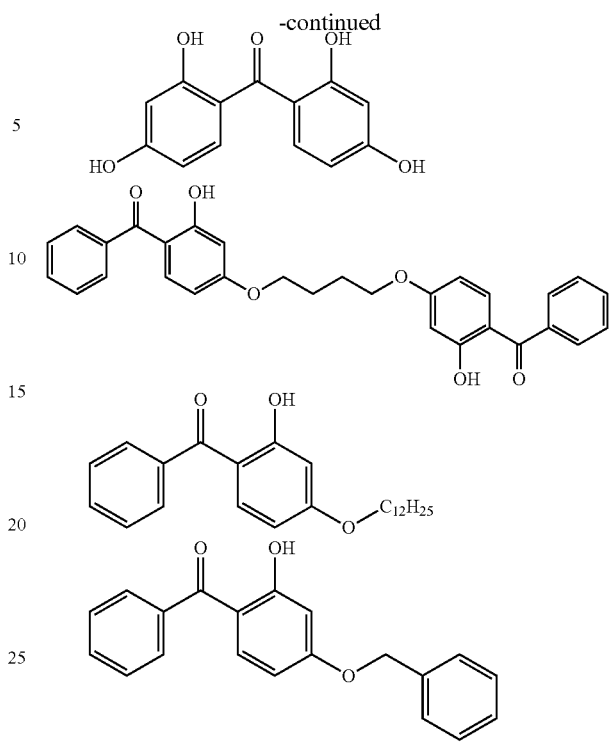

Examples of a commercially available product containing the compound represented by the general formula (21) include trade names "ADK STAB 1413", "ADK STAB LA-51" manufactured by ADEKA CORPORATION, "Seesorb 100", "Seesorb 101", "Seesorb 104", "Seesorb 106", "Seesorb 107", and "Seesorb 151" manufactured by SHIPRO KASEI KAISHA, LTD., trade names "Cyasorb® UV-21", "Cyasorb® UV-24", "Cyasorb® UV-207", "Cyasorb® UV-284", and "Cyasorb® UV-2126" manufactured by Cytec Industries, Inc., and trade names "Uvinul® 3030" and "Uvinul® 3048" manufactured by BASF SE.

In the resin composition according to still another preferred embodiment of the present invention, the blending amount of the ultraviolet absorber (J) is, based on 100 parts by mass of the thermoplastic resin, 0.001 to 10 parts by mass, and more preferably 0.01 to 0.5 parts by mass.

In the resin composition according to still another preferred embodiment of the present invention, the blending amount of the light stabilizer (H) is, based on 100 parts by mass of the thermoplastic resin, preferably 0.001 to 10 parts by mass, and more preferably 0.01 to 0.5 parts by mass. When the amount of the light stabilizer is less than 0.001 parts by mass, weather resistance may not be imparted, and when the amount exceeds 10 parts by mass, the addition amount effect is unobtainable, or bleeding out to the surface of a molded article may deteriorate the appearance thereof. The light stabilizer (H1) may be one in which the hindered amine compound (I) or the ultraviolet absorber (J) is incorporated singly, or two or more of these compounds may be blended.

In the resin composition according to still another preferred embodiment of the present invention, the light stabilizer (H) may be impregnated into the carrier, if necessary, and then added to a thermoplastic resin. In order to impregnate the carrier, the stabilizer may be heated and mixed as it is, or, if necessary, diluted with an organic solvent, impregnated into a carrier, and then the solvent may be removed. As such carriers, those known as fillers and fillers for synthetic resins or flame retardants and light stabilizers solid at room temperature can be used, and examples thereof include calcium silicate powder, silica powder, talc powder, alumina powder, titanium oxide powder, these carriers chemically modified on the surface, solids among the flame retardants and antioxidants listed below. Among these carriers, those obtained by chemically modifying the surface of the carrier are preferable, and those in which the surface of the silica powder is chemically modified are more preferable.

These carriers preferably have an average particle size of 0.1 to 100 μm, and more preferably 0.5 to 50 μm.

The method of blending the component (A), component (B), and component (H) (component (I) and/or component (J)) in a resin composition according to still another preferred embodiment of the present invention into a thermoplastic resin is not particularly limited, and examples of commonly used methods include a method of dry-blending each component with thermoplastic resin powder or pellet, a method in which a master batch containing any of the respective components in a high concentration is prepared and added to a thermoplastic resin, and a method in which the component (A), component (B), and component (H) (component (I) and/or component (J)) is processed into a pellet form and added to a thermoplastic resin. The components may be simultaneously added to an olefin resin or may be added separately.

The thermoplastic resin can be produced in pellet form by the following processing method, for example, by heating a mixture obtained by mixing a phenolic antioxidant and an optional another additive contained as necessary, and mixing any of the component (A), component (B), and component (H) (component (I) and/or component (J)) in the presence of the phenolic antioxidant in a molten state. Processing conditions, processing machines, and the like are not limited in any way, and well-known general processing methods and processing equipment can be used. Specific manufacturing methods thereof include a disk pelleter method and an extrusion method.

Also in the resin composition according to still another preferred embodiment of the present invention, any known resin additive (such as a phenolic antioxidant, a phosphorus antioxidant, a thioether antioxidant, a nucleating agent different from the phosphoric acid ester compound (A) represented by the general formula (1), a flame retardant, a flame retardant aid, a lubricant, a filler, a hydrotalcite, an antistatic agent, a pigment, an fluorescent brightener, or a dye) may be contained as long as an effect of the present invention is not considerably impaired.

Examples of the nucleating agent different from the phosphate ester compound (A) represented by the above formula (1) include a metal carboxylate such as sodium benzoate, aluminum 4-tert-butylbenzoate, sodium adipate, and disodium bicyclo[2.2.1]heptane-2,3-dicarboxylate, a polyvalent alcohol derivative such as dibenzylidenesorbitol, bis(methylbenzylidene)sorbitol, bis(3,4-dimethylbenzylidene)sorbitol, bis(μ-ethylbenzylidene)sorbitol, and bis(dimethylbenzylidene)sorbitol, and an amide compound such as N,N',N''-tris[2-methylcyclohexyl]-1,2,3-propane tricarboxamide, N,N',N''-tricyclohexyl-1,3,5-benzenetricarboxamide, N,N'-dicyclohexylnaphthalenedicarboxamide, and 1,3,5-tri(dimethylisopropoylamino)benzene. These may be used singly, or in combination of two or more thereof. When blending a nucleating agent, the blending amount thereof with the phosphoric acid ester compound (A) represented by the formula (1) in total is, based on 100 parts by mass of the thermoplastic resin (A), 0.001 to 10 parts by mass, and more preferably 0.006 to 0.5 parts by mass.

When molding the resin composition according to still another preferred embodiment of the present invention, molding can be carried out using a known molding method. For example, a molded article can be obtained by injection molding, extrusion molding, blow molding, vacuum molding, inflation molding, calender molding, slush molding, dip molding, foam molding, or the like.

Examples of applications of the resin composition in still another preferred embodiment of the present invention include a molded article such as an automobile material such as a bumper, a dashboard, or an instrument panel, a housing application such as a refrigerator, a washing machine, or a vacuum cleaner, a household good such as a dish, a bucket, or a bath product, a miscellaneous good such as a toy, or a reserve/storage container such as a tank; a film; and a fiber.

EXAMPLES

Hereinafter, the present invention will be described more specifically with reference to Examples, but the present invention is not limited to the following Examples and the like in any way.

Preparation of Resin Additive Composition

Examples 1-1 to 1-6 and Comparative Examples 1-1 to 1-3

A resin additive composition of a phosphoric acid ester compound (A) represented by the general formula (1) and a fatty acid sodium (B) represented by the general formula (2) was prepared at the ratios shown in Table 1. The unit of the blending amount in the Table is parts by mass. For each of the obtained compositions, measurement of angle of repose and evaluation of adhesion were carried out according to the following procedure.

(1) Angle of Repose

The resin additive composition described in Table 1 was placed in a cylindrical container (500 mL) so as to have a volume of half of that of the cylindrical container, a lid was closed, and the fluidity of a sample was evaluated by rotating at a constant speed of 2.0 rpm using a repose angle measuring instrument (Revolving Cylinder Test) manufactured by TSUTSUI SCIENTIFIC INSTRUMENTS CO., LTD. As the cylindrical container rotates, the sample is lifted along the rotating container, and the sample collapses from a high position. When the slope formed by this collapsing sample became constant, the angle made by the slope of the sample and the horizontal plane was measured as the angle of repose. The obtained results are shown in Table 1. In Comparative Example 1-1, since the collapse of the sample was intermittent and the slope was not flat, the angle of repose was not measured.

(2) Adhesion 2.5 kg of the resin additive composition of the formulation shown in Table 1 was blended using a Henschel mixer under conditions of 1000 rpm×1 min, and then, the state of the resin additive composition adhering to the inner wall inside a stirring tank of the Henschel mixer was evaluated. When the resin additive composition adhered to 50% or more of the inner wall inside the stirring tank of the Henschel mixer, the state was evaluated as "x", when the resin additive composition adhered in less than 50% of the wall surface, the state was evaluated as "A", and when the resin additive composition adhered to the inner wall was slight, the state was evaluated as "o". The obtained results are shown in Table 1.

TABLE 1

| | Example 1-1 | Example 1-2 | Example 1-3 | Example 1-4 | Example 1-5 | Example 1-6 | Comparative Example 1-1 | Comparative Example 1-2 | Comparative Example 1-3 |
|---|---|---|---|---|---|---|---|---|---|
| (A)-1 | 33.3 | 40.0 | 50.0 | 60.0 | 62.5 | 64.5 | 100 | 66.7 | 75.0 |
| (B)-1 | 66.6 | 60.0 | 50.0 | 40.0 | 37.5 | 35.5 | — | 33.3 | 25.0 |
| (B)/(A) mass ratio | 2.00 | 1.50 | 1.00 | 0.67 | 0.60 | 0.55 | — | 0.50 | 0.33 |
| Angle of repose (°) | 42.9 | 44.0 | 45.8 | 48.2 | 48.6 | 49.4 | — | 50.2 | 50.4 |
| adhesion | ○ | ○ | ○ | ○ | ○ | ○ | X | Δ | X |

(A)-1: Sodium-2,2'-methylene bis(4,6-di-tert-butyl phenyl)phosphate
(B)-1: Sodium stearate From Comparative Example 1-1 in Table 1, in the case of the resin additive composition consisting only of the phosphate ester compound (A) represented by the general formula (1), the fluidity was poor. From Comparative Examples 1-2 and 1-3, the resin additive composition having the mass ratio (B)/(A) of less than 0.55 has poor fluidity, and it was confirmed that a lot of resin additive composition adhered to the wall surface of the Henschel mixer. On the other hand, it was confirmed that the resin additive compositions of Examples 1-1 to 1-6 had small angle of repose and excellent fluidity. [Examples 2-1 to 2-4 and Comparative Examples 2-1 to 2-5]
(Evaluation of Resin Composition)

0.05 parts by mass of a phenolic antioxidant (tetrakis[methylene-3-(3',5'-di-tert-butyl-4'-hydroxyphenyl)propionate]methane), 0.1 parts by mass of a phosphorus antioxidant (tris(2,4-di-tert-butylphenyl)phosphite), 0.05 parts by mass of calcium stearate, and the resin additive composition shown in Tables 2 and 3 were blended with 100 parts by mass of homopolypropylene (product name "H700" manufactured by Prime Polymer Co., Ltd., melt flow rate=8.0 g/10 min (2.16 kg×230° C. according to ISO standard 1133)), mixed with 1,000 rpm×1 minute by a Henschel mixer, and then, using a twin-screw extruder, the mixture was kneaded under conditions of extrusion temperature=230° C., screw rotation speed=150 rpm, and feed rate=7.2 kg/h to prepare a pellet. The unit of the blending amount in the Table is parts by mass. The obtained resin composition was evaluated by the following method. The obtained results are shown in Tables 2 and 3.
(3) Crystallization Temperature A small amount of the obtained pellet was cut off and the crystallization temperature was measured using a differential scanning calorimeter (Diamond, manufactured by PerkinElmer Co., Ltd.). As a measurement method, in a chart obtained by raising the temperature from room temperature to 230° C. at a rate of 50° C./min, holding the pellet for 10 minutes, and then cooling the pellet to 50° C. at a rate of 10° C./min, and the temperature at which the endothermic reaction becomes the peak top was taken as the crystallization temperature.
(4) Flexural Modulus The obtained pellet was injection-molded with an injection molding machine (EC100-2A; manufactured by TOSHIBA MACHINE CO., LTD.) under conditions of an injection temperature of 200° C. and a mold temperature of 50° C. to prepare a test piece of dimensions 80 mm×10 mm×4 mm, and immediately after molding, the test piece was placed in a thermostat at 23° C. and allowed to stand for 48 hours, the test piece was then taken out, and the flexural modulus (MPa) of the test piece was measured according to ISO 178.

(5) HAZE

The obtained pellet was injection-molded with an injection molding machine (EC100-2A; manufactured by TOSHIBA MACHINE CO., LTD.) under conditions of an injection temperature of 200° C. and a mold temperature of 50° C. to prepare a test piece of dimensions 60 mm×60 mm×1 mm, and immediately after molding, the test piece was placed in a thermostat at 23° C. and allowed to stand for 48 hours, the test piece was then taken out, and the HAZE of the test piece was measured according to ISO 14782.

TABLE 2

| | Example 2-1 | Example 2-2 | Example 2-3 | Example 2-4 |
|---|---|---|---|---|
| (A)-1 | 0.015 | 0.015 | 0.015 | 0.015 |
| (B)-1 | 0.015 | — | — | — |
| (B)-2 | — | 0.015 | — | — |
| (B)-3 | — | — | 0.015 | — |
| (B)-4 | — | — | — | 0.015 |
| (B)'-1 | — | — | — | — |
| (B)'-2 | — | — | — | — |
| (B)'-3 | — | — | — | — |
| (B)'-4 | — | — | — | — |
| (B)/(A) mass ratio | 1.00 | 1.00 | 1.00 | 1.00 |
| (A) + (B) | 0.03 | 0.03 | 0.03 | 0.03 |
| Crystallization temperature (° C.) | 131.0 | 131.0 | 131.1 | 131.0 |
| Flexural modulus (MPa) | 1980 | 1980 | 1980 | 1980 |
| HAZE (%) | 27.9 | 28.0 | 27.8 | 28.1 |

TABLE 3

| | Comparative Example 2-1 | Comparative Example 2-2 | Comparative Example 2-3 | Comparative Example 2-4 | Comparative Example 2-5 |
|---|---|---|---|---|---|
| (A)-1 | 0.015 | 0.015 | 0.015 | 0.015 | 0.015 |
| (B)-1 | — | — | — | — | — |
| (B)-2 | — | — | — | — | — |
| (B)-3 | — | — | — | — | — |
| (B)-4 | — | — | — | — | — |
| (B)'-1 | — | — | — | — | — |
| (B)'-2 | — | 0.015 | — | — | — |
| (B)'-3 | — | — | 0.015 | — | — |
| (B)'-4 | — | — | — | 0.015 | — |
| (B)/(A) mass ratio | — | — | — | — | — |
| (A) + (B) | 0.015 | 0.015 | 0.015 | 0.015 | 0.015 |
| Crystallization temperature (° C.) | 129.3 | 127.3 | 127.7 | 128.1 | 128.6 |

TABLE 3-continued

|  | Comparative Example 2-1 | Comparative Example 2-2 | Comparative Example 2-3 | Comparative Example 2-4 | Comparative Example 2-5 |
|---|---|---|---|---|---|
| Flexural modulus (MPa) | 1980 | 1830 | 1850 | 1880 | 1910 |
| HAZE (%) | 29.1 | 40.0 | 39.1 | 34.1 | 32.1 |

(A)-1: Sodium-2,2'-methylene bis(4,6-di-tert-butyl phenyl)phosphate
(B)-1: Sodium stearate
(B)-2: Sodium laurate
(B)-3: Sodium myristate
(B)-4: Sodium palmitate
(B)'-1: Lithium stearate
(B)'-2: Magnesium stearate
(B)'-3: Zinc stearate
(B)'-4: Aluminum stearate By comparing Comparative Examples 2-1 to 2-4 with Comparative Example 2-5 in Tables 2 and 3, physical properties when a fatty acid metal salt different from the fatty acid sodium salt was blended was lower than physical properties when a resin additive composition consisting only of a phosphoric acid ester compound (A) represented by the general formula (1) was added. On the other hand, it was confirmed Examples 2-1 to 2-4 that the resin composition of the present invention has better physical properties than the resin composition of Comparative Example 2-5.

Examples 3-1 to 3-8 and Comparative Examples 3-1 to 3-7

0.05 parts by mass of a phenolic antioxidant (tetrakis[methylene-3-(3',5'-di-tert-butyl-4'-hydroxyphenyl)propionate]methane), 0.1 parts by mass of a phosphorus antioxidant (tris(2,4-di-tert-butylphenyl)phosphite), 0.05 parts by mass of calcium stearate, and the resin additive composition shown in Tables 4 and 5 were blended with 100 parts by mass of a polyolefin resin prepared by adding a peroxide (2,5-dimethyl-2,5-di(tert-butylperoxy)hexane) to an impact copolymer of polypropylene (product name "J705P" manufactured by Prime Polymer Co., Ltd., melt flow rate=11.5 g/10 min (2.16 kg×230° C. according to ISO Standard 1133)) in such a manner that the melt flow rate was 40 g/10 min, mixed with 1,000 rpm×1 minute by a Henschel mixer, and then, using a twin-screw extruder, the mixture was kneaded under conditions of extrusion temperature=230° C., screw rotation speed=150 rpm, and feed rate=7.2 kg/h to prepare a pellet. In Comparative Example 3-1, however, pellets were obtained by kneading without adding a resin additive composition.

TABLE 4

|  | Example 3-1 | Example 3-2 | Example 3-3 | Example 3-4 | Example 3-5 | Example 3-6 | Example 3-7 | Example 3-8 |
|---|---|---|---|---|---|---|---|---|
| (A)-1 | 0.020 | 0.025 | 0.030 | 0.040 | 0.050 | 0.060 | 0.0625 | 0.645 |
| Comparative nucleating agent 1 | — | — | — | — | — | — | — | — |
| (B)-1 | 0.030 | 0.025 | 0.020 | 0.060 | 0.050 | 0.040 | 0.0375 | 0.355 |
| (B)/(A) mass ratio | 1.50 | 1.00 | 0.67 | 1.50 | 1.00 | 0.67 | 0.60 | 0.55 |
| (A) + (B) | 0.05 | 0.05 | 0.05 | 0.10 | 0.10 | 0.10 | 0.10 | 1.0 |
| Crystallization temperature (° C.) | 129.8 | 129.8 | 130.0 | 130.7 | 131.0 | 131.3 | 131.3 | 131.3 |
| Flexural modulus (MPa) | 1320 | 1340 | 1340 | 1350 | 1380 | 1370 | 1380 | 1380 |

TABLE 5

|  | Comparative Example 3-1 | Comparative Example 3-2 | Comparative Example 3-3 | Comparative Example 3-4 | Comparative Example 3-5 | Comparative Example 3-6 | Comparative Example 3-7 |
|---|---|---|---|---|---|---|---|
| (A)-1 | — | 0.05 | 0.10 | — | — | — | — |
| Comparative nucleating agent 1 | — | — | — | — | 0.05 | 0.05 | 0.10 |
| (B)-1 | — | — | — | 0.05 | — | 0.05 | — |
| (B)/(A) mass ratio | — | — | — | — | — | — | — |
| (A)+(B) | — | 0.05 | 0.10 | 0.05 | 0.05 | 0.10 | 0.10 |
| Crystallization temperature (°C) | 111.3 | 127.8 | 129.8 | 117.1 | 128.1 | 128.6 | 128.7 |
| Flexural modulus (MPa) | 920 | 1220 | 1290 | 1000 | 1200 | 1220 | 1220 |

(A)-1: Sodium-2,2'-methylene bis(4,6-di-tert-butyl phenyl)phosphate
Comparative nucleating agent 1: Tradename "HPN-20E" (dicyclohexane-1,2-dicarboxylic acid calcium compound) manufactured by Milliken Chemical
(B)-1: Sodium stearate In comparison between Comparative Example 3-1 and Comparative Example 3-4 in Table 5, a nucleating agent effect of sodium stearate was small. Comparison between Comparative Example 3-6 and Comparative Example 3-7 confirmed that an effect of the present invention was unobtainable when a nucleating agent different from a phosphoric acid ester compound (A) represented by the general formula (1) was used. On the other hand, from Examples 3-1 to 3-8, it was confirmed that the resin additive composition of the present invention can impart excellent physical properties to a thermoplastic resin by blending a phosphoric acid ester compound (A) represented by the general formula (1) and a fatty acid sodium (B) represented by the general formula (2) at a specific ratio.

Examples 4-1 to 4-4 and Comparative Examples 4-1 to 4-4

0.05 parts by mass of a phenolic antioxidant (tetrakis[methylene-3-(3',5'-di-tert-butyl-4'-hydroxyphenyl)propionate]methane), 0.1 parts by mass of a phosphorus antioxidant (tris(2,4-di-tert-butylphenyl)phosphite), 0.05 parts by mass of calcium stearate, and the resin additive composition shown in Tables 6 and 7 were blended with 100 parts by mass of homopolypropylene (melt flow rate=8.0 g/10 min (2.16 kg×230° C. according to ISO standard 1133)), mixed with 1000 rpm×1 minute by a Henschel mixer, and then, using a twin-screw extruder, the mixture was kneaded under conditions of extrusion temperature=230° C., screw rotation speed=150 rpm, and feed rate=7.2 kg/h to prepare a pellet. Y. I. (yellowness index) was evaluated by the following procedure.

(6) Y. I.

The obtained pellet was molded into a test piece of dimensions 60 mm×60 mm×2 mm under conditions of an injection temperature of 200° C. and a mold temperature of 50° C. using an injection molding machine (EC100-2A; manufactured by TOSHIBA MACHINE CO., LTD.). Immediately after molding, the test piece was left for 48 hours under a standard condition of room temperature 23° C., and the Y. I. of the test piece was then measured using a spectrophotometer (SC-T; manufactured by Suga Test Instruments Co., Ltd.).

TABLE 6

| | Example 4-1 | Example 4-2 | Example 4-3 | Example 4-4 |
|---|---|---|---|---|
| (A)-1 | 0.025 | 0.025 | 0.025 | 0.025 |
| Comparative nucleating agent 2 | — | — | — | — |
| Comparative nucleating agent 3 | — | — | — | — |
| (B)-1 | 0.025 | 0.025 | 0.025 | 0.025 |
| Blue Outremer 32 | 5 | — | — | — |
| Violet Outremer 11 | — | 5 | — | — |
| Fluorescent brightener [ppm] | — | — | 2 | 5 |
| (B)/(A) mass ratio | 1 | 1 | 1 | 1 |
| Crystallization temperature (° C.) | 131.2 | 131.0 | 131.2 | 131.2 |
| Flexural modulus (MPa) | 2040 | 2040 | 2040 | 2040 |
| HAZE (%) | 61.4 | 61.6 | 61.3 | 61.2 |
| Y.I. | 7.0 | 7.5 | 3.0 | 0.1 |

TABLE 7

| | Comparative Example 4-1 | Comparative Example 4-2 | Comparative Example 4-3 | Comparative Example 4-4 |
|---|---|---|---|---|
| (A)-1 | 0.0125 | 0.05 | — | — |
| Comparative nucleating agent 2 | — | — | 0.025 | — |
| Comparative nucleating agent 3 | — | — | — | 0.025 |
| (B)-1 | 0.0375 | — | 0.025 | 0.025 |
| Blue Outremer 32 [ppm] | 5 | 5 | 5 | 5 |
| Violet Outremer 11 [ppm] | — | — | — | — |
| Fluorescent brightener [ppm] | — | — | — | — |
| (B)/(A) mass ratio | 3 | — | — | — |
| Crystallization temperature (° C.) | 130.1 | 130.0 | 125.0 | 120.2 |
| Flexural modulus (MPa) | 2000 | 2020 | 1900 | 1650 |
| HAZE (%) | 65.0 | 61.4 | 61.2 | 80.1 |
| Y.I | 7.3 | 7.0 | 7.0 | 7.9 |

(A)-1: Sodium-2,2'-methylene bis(4,6-di-tert-butyl phenyl)phosphate
Comparative nucleating agent 2: Product name "Hyperform (R) HPN-20E" manufactured by Milliken Chemical
Comparative nucleating agent 3: Sodium benzoate
(B)-1: Sodium stearate
Blue Outremer 32: manufactured by Holliday Pigments SAS (Colour Index: Pigment blue 29)
Violet Outremer 11: manufactured by Holliday Pigments SAS (Colour Index: Pigment violet 15)
Fluorescent brightener: 2,5-thiophenediyl bis(5-tert-butyl-1,3-benzoxazole)

By comparing Comparative Example 4-1 with Comparative Example 4-2, when the mass ratio of (B)/(A) exceeds the range of 0.55 to 2.0, it was confirmed that an effect of the present invention is not obtained. From Comparative Example 4-3 and Comparative Example 4-4, it was confirmed that when a nucleating agent different from a phosphoric acid ester compound was used, a physical property improving effect was poor. On the other hand, by comparing Example 4-1 with Comparative Example 4-2, it was confirmed that a resin composition blended with the resin additive composition of the present invention improved a nucleating agent effect more than a resin composition containing only a phosphoric acid ester compound.

Examples 5-1 to 5-6 and Comparative Examples 5-1 to 5-6

0.083 parts by mass of a phenolic antioxidant; tetrakis[methylene-3-(3',5'-di-tert-butyl-4'-hydroxyphenyl)propionate]methane, 0.167 parts by mass of a phosphorus antioxidant: tris(2,4-di-tert-butylphenyl)phosphite, 0.083 parts by mass of calcium stearate, and the components (A) and (B) shown in Tables 8 and 9 were blended with 100 parts by mass of an impact copolymer of polypropylene {Prime Polymer Co., Ltd., product name "J708P", melt flow rate=45 g/10 min (2.16 kg×230° C. according to ISO standard 1133)}, and after mixing at 1000 rpm×1 minute with a Henschel mixer (FM200; manufactured by Mitsui Mining Co., Ltd.), the components (C) and (D) were further blended, mixed for 30 minutes with a rocking mixer (manufactured by AICHI ELECTRIC Co., Ltd.), and then granulated at an extrusion temperature of 230° C. under reduced pressure using a twin-screw extruder (TEX-28V; NIKKO-YPK SHOJI CO., LTD.) to produce a pellet. After drying the pellets at 60° C. for 8 hours, the following evaluations (7) to (9) were carried out. The unit of the blending amount in Tables 8 and 9 is parts by mass.

(7) Crystallization Temperature and Semicrystallization Time

The obtained pellet was broken into small pieces, weighed 5 mg, filled in an aluminum pan, and the crystallization temperature and semicrystallization time were measured with a differential scanning calorimeter (apparatus: Diamond manufactured by PerkinElmer Co., Ltd.). The measurement was carried out by raising the temperature to 230° C. at a rate of 50° C./min, holding the pieces for 5 minutes, and cooling the pieces to 50° C. at 10° C./min, the temperature of the measured exothermic peak was obtained as the crystallization temperature. The semicrystallization time was determined from the 50% point of the total exothermic peak area measured when the temperature was raised to 230° C. at a rate of 50° C./min, held for 5 minutes and then cooled to 135° C. at 100° C./min.

(8) Izod impact strength

The obtained pellet was injection-molded using an injection molding machine (apparatus: EC100-2A manufactured by TOSHIBA MACHINE CO., LTD.) at an injection temperature of 200° C. and a mold temperature of 40° C. to form a notched test piece of 80 mm×10 mm×4 mm. Immediately after molding, the notched test piece was allowed to stand in a constant temperature oven at 23° C. for 48 hours, and after removing the test piece, the Izod impact strength (J/m) was measured according to ISO-180.

(9) Y. I. (yellowness index)

The obtained pellet was molded into a test piece of dimensions 60 mm×60 mm×2 mm under conditions of an injection temperature of 200° C. and a mold temperature of 50° C. using an injection molding machine (EC100-2A; manufactured by TOSHIBA MACHINE CO., LTD.). Immediately after molding, the test piece was left for 48 hours under a standard condition of room temperature 23° C., and the Y. I. of the test piece was measured using a spectrophotometer (SC-T; manufactured by Suga Test Instruments Co., Ltd.).

TABLE 8

|  | Example 5-1 | Example 5-2 | Example 5-3 | Example 5-4 | Example 5-5 | Example 5-6 |
| --- | --- | --- | --- | --- | --- | --- |
| (A)-1 | 0.056 | 0.067 | 0.084 | 0.10 | 0.105 | 0.108 |
| Comparative nucleating agent 1 | — | — | — | — | — | — |
| Comparative nucleating agent 2 | — | — | — | — | — | — |
| (B)-1 | 0.112 | 0.101 | 0.084 | 0.068 | 0.063 | 0.060 |
| (C)-1 | 33.3 | 33.3 | 33.3 | 33.3 | 33.3 | 33.3 |
| (D)-1 | 33.3 | 33.3 | 33.3 | 33.3 | 33.3 | 33.3 |
| (B)/(A) mass ratio | 2.00 | 1.50 | 1.00 | 0.67 | 0.60 | 0.55 |
| Crystallization temperature (° C.) | 131.9 | 132.0 | 132.0 | 132.1 | 132.1 | 132.1 |
| Semicrystallization time (s) | 51 | 51 | 51 | 50 | 50 | 50 |
| Izod impact strength (j/m) | 295 | 294 | 296 | 298 | 301 | 306 |
| Y.I. | 6.3 | 6.7 | 6.4 | 6.8 | 6.8 | 6.8 |

(A)-1: Sodium-2,2'-methylene bis(4,6-di-tert-butyl phenyl)phosphate
(B)-1: Sodium stearate
(C)-1: Product name polyolefin elastomer "Engage8200" manufactured by The Dow Chemical Company
(D)-1: Product name "Crown Talc PP" manufactured by matsumura sangyo Co., Ltd. Comparative nucleating agent 1: Trade name "Hyperform HPN20E" manufactured by Milliken Chemical
Comparative nucleating agent 2: Sodium benzoate

TABLE 9

|  | Comparative Example 5-1 | Comparative Example 5-2 | Comparative Example 5-3 | Comparative Example 5-4 | Comparative Example 5-5 | Comparative Example 5-6 |
| --- | --- | --- | --- | --- | --- | --- |
| (A)-1 | — | 0.042 | 0.168 | — | — | — |
| Comparative nucleating agent 1 | — | — | — | 0.084 | 0.168 | — |
| Comparative nucleating agent 2 | — | — | — | — | — | 0.168 |
| (B)-1 | — | 0.126 | — | 0.084 | — | — |
| (C)-1 | 33.3 | 33.3 | 33.3 | 33.3 | 33.3 | 33.3 |
| (D)-1 | 33.3 | 33.3 | 33.3 | 33.3 | 33.3 | 33.3 |
| (B)/(A) mass ratio | — | 3.00 | — | — | — | — |
| Crystallization temperature (° C.) | 127.0 | 131.5 | 130.3 | 128.8 | 128.9 | 127.1 |
| Semicrystallization time (s) | 124 | 55 | 83 | 85 | 84 | 122 |
| Izod impact strength (J/m) | 275 | 270 | 279 | 286 | 306 | 277 |
| Y.I. | 10.1 | 7.1 | 7.8 | 6.8 | 8.7 | 9.1 |

From comparison results of Comparative Example 5-4 and Comparative Example 5-5, even when a fatty acid sodium was blended with a nucleating agent which is not a phosphoric acid ester compound, a nucleating agent effect was hardly affected, and on the other hand, from the comparison results of Examples 5-1 to 5-6 and Comparative Example 5-3, it was confirmed that in a resin composition containing a phosphoric acid ester compound and a sodium fatty acid in a specific ratio, a nucleating agent effect was remarkably improved as compared with a case in which a phosphate ester compound was singly added. It was confirmed that a molded article using the resin composition of the present invention can obtain a molded article that is superior in impact resistance strength and can suppress the degree of yellowing as compared with a case in which a phosphoric acid ester compound is singly added.

As described above, the resin composition of the present invention can be suitably used for automobile materials and the like, particularly, in applications requiring impact resistance.

Examples 6-1 to 6-5 and Comparative Examples 6-1 to 6-13

0.05 parts by mass of a phenolic antioxidant (tetrakis [methylene-3-(3',5'-di-tert-butyl-4'-hydroxyphenyl)propionate]methane), 0.05 parts by mass of calcium stearate, and the resin additive composition described in Tables 10 to 12 were blended with 100 parts by mass of an impact copolymer {Prime Polymer Co., Ltd. product name "J708P", melt flow rate=45 g/10 min (2.16 kg×230° C. according to ISO standard 1133)}, mixed with 1,000 rpm×1 minute by a Henschel mixer, and then, using a twin screw extruder, granulation was carried out at an extrusion temperature of 230° C. After the granulated pellet was dried at 80° C. for 2 hours, granulation was repeated at an extrusion temperature of 230° C. using the same twin-screw extruder, and an influence on the following (10) -(12) by the thermal history was evaluated. The unit of the blending amount in Tables 10 to 12 is parts by mass.

(10) Y. I. (yellowness index)

Each pellet having a different thermal history was molded into a test piece of dimensions 60 mm×60 mm×2 mm under conditions of an injection temperature of 200° C. and a mold temperature of 50° C. using an injection molding machine (EC100-2A; manufactured by TOSHIBA MACHINE CO., LTD.). Immediately after molding, the test piece was left for 48 hours under a standard condition of room temperature 23° C., and the Y. I. of the test piece was measured using a spectrophotometer (SC-T; manufactured by Suga Test Instruments Co., Ltd.).

(11) Crystallization Temperature

A small amount of the obtained pellet was cut off and the crystallization temperature was measured using a differential scanning calorimeter (Diamond, manufactured by PerkinElmer Co., Ltd.). Regarding the measuring method, in a chart obtained by raising the temperature from room temperature to 230° C. at a rate of 50° C./min, holding the pellet for 10 minutes, and then cooling the pellet to 50° C. at a rate of −10° C./min, the temperature at which the endothermic reaction became the peak top was taken as the crystallization temperature.

(12) Izod Impact Strength

For each pellet having a different thermal history, injection-molding was carried out with an injection molding machine (EC100-2A; manufactured by TOSHIBA MACHINE CO., LTD.) at an injection temperature of 200° C. and a mold temperature of 50° C. to form a notched test piece of dimensions 10 mm×4 mm×100 mm. Immediately after molding, the test piece was placed in a thermostat at 23° C. and allowed to stand for 48 hours, and after removing the test piece, the Izod impact strength ratio (J/m) of the notched piece was measured according to ISO-180.

TABLE 10

|  |  | Example 6-1 | Example 6-2 | Example 6-3 | Example 6-4 | Example 6-5 |
|---|---|---|---|---|---|---|
| (A)-1 |  | 0.0645 | 0.0625 | 0.06 | 0.05 | 0.04 |
| Comparative nucleating agent |  | — | — | — | — | — |
| (B)-1 |  | 0.0355 | 0.0375 | 0.04 | 0.05 | 0.06 |
| (E)-1 |  | 0.10 | 0.10 | 0.10 | 0.10 | 0.10 |
| Comparative phosphite |  | — | — | — | — | — |
| (B)/(A) mass ratio |  | 0.55 | 0.60 | 0.67 | 1.00 | 1.50 |
| Y.I. | 1st granulation | 0.69 | 0.71 | 0.66 | 0.80 | 1.54 |
|  | 3rd granulation | 3.02 | 2.93 | 2.88 | 3.13 | 3.93 |
|  | 5th granulation | 5.15 | 5.06 | 4.97 | 5.18 | 5.98 |
| Crystalization temperature (° C.) |  | 131.2 | 131.2 | 131.2 | 131.2 | 131.1 |
| Izod impact strength (J/m) | 1st granulation | 88.3 | 87.9 | 87.5 | 89.9 | 91.9 |
|  | 3rd granulation | 91.8 | 90.7 | 92.2 | 92.9 | 92.4 |
|  | 5 th granulation | 92.3 | 92.4 | 92.9 | 93.8 | 93.6 |

(A)-1: Sodium-2,2'-methylene bis(4,6-di-tert-butyl phenyl)phosphate
(B)-1: Sodium stearate
(E)-1: PEP-24(3,9-bis(2,4-di-tert-butyl phenoxy)-2,4,8,10-tetraoxa-3,9-diphosphaspiro[5.5]undecane)
Comparative nucleating agent: Sodium benzoate
Comparative phosphite: Tris(2,4-di-tert-butyl phenyl)phosphate

TABLE 11

| | Comparative Example 6-1 | Comparative Example 6-2 | Comparative Example 6-3 | Comparative Example 6-4 | Comparative Example 6-5 | Comparative Example 6-6 | Comparative Example 6-7 |
|---|---|---|---|---|---|---|---|
| (A)-1 | — | 0.10 | 0.025 | — | 0.0645 | 0.0625 | 0.06 |
| Comparative nucleating agent | — | — | — | 0.06 | — | — | — |
| (B)-1 | — | — | 0.075 | 0.04 | 0.0355 | 0.0375 | 0.04 |
| (E)-1 | 0.10 | 0.10 | 0.10 | 0.10 | — | — | — |
| Comparative phosphite | — | — | — | — | 0.10 | 0.10 | 0.10 |
| (B)/(A) mass ratio | — | — | 3.00 | — | 0.55 | 0.60 | 0.67 |
| Y.I. 1st granulation | 1.39 | 1.58 | 3.04 | 2.33 | 2.58 | 2.65 | 2.74 |
| 3rd granulation | 3.37 | 6.36 | 6.12 | 8.00 | 8.31 | 8.55 | 8.65 |
| 5th granulation | 5.25 | 10.48 | 8.86 | 15.41 | 13.02 | 13.39 | 13.57 |
| Crystallization temperature (° C.) | 115.7 | 131.0 | 131.0 | 120.2 | 130.6 | 130.6 | 130.8 |
| Izod impact strength (J/m) 1st granulation | 87.4 | 89.3 | 89.4 | 84.0 | 92.2 | 92.6 | 92.5 |
| 3rd granulation | 77.5 | 88.9 | 89.0 | 84.3 | 86.3 | 86.9 | 87.2 |
| 5th granulation | 69.0 | 86.7 | 88.2 | 77.1 | 81.3 | 80.8 | 81.1 |

TABLE 12

| | Comparative Example 6-8 | Comparative Example 6-9 | Comparative Example 6-10 | Comparative Example 6-11 | Comparative Example 6-12 | Comparative Example 6-13 |
|---|---|---|---|---|---|---|
| (A)-1 | 0.05 | 0.04 | — | 0.10 | 0.025 | — |
| Comparative nucleating agent | — | — | — | — | — | 0.06 |
| (B)-1 | 0.05 | 0.06 | — | — | 0.075 | 0.04 |
| (E)-1 | — | — | — | — | — | — |
| Comparative phosphite | 0.10 | 0.10 | 0.10 | 0.10 | 0.10 | 0.10 |
| mass ratio | 1.00 | 1.50 | — | — | 3.00 | — |
| Y.I. 1st granulation | 3.01 | 3.38 | 2.76 | 2.47 | 4.21 | 3.03 |
| 3rd granulation | 9.40 | 10.45 | 7.45 | 7.73 | 12.52 | 10.30 |
| 5th granulation | 14.88 | 15.97 | 10.07 | 11.05 | 20.21 | 17.23 |
| Crystallization temperature (° C.) | 130.7 | 130.5 | 115.1 | 129.7 | 130.1 | 120.1 |
| Izod impact strength (J/m) 1st granulation | 93.4 | 93.5 | 78.3 | 84.8 | 92.9 | 79.2 |
| 3rd granulation | 88.0 | 88.3 | 74.1 | 84.6 | 85.8 | 75.5 |
| 5th granulation | 82.6 | 82.2 | 68.2 | 81.9 | 79.3 | 70.3 |

From Comparative Example 6-4, when a nucleating agent is different from the component (A) used in the resin composition of the present invention, discoloration due to thermal history is large, and the crystallization temperature was not satisfactory. From Comparative Example 6-2 and Comparative Example 6-3, when the mass ratio (B)/(A) exceeds the range of 0.55 to 2.0, it was confirmed that the degree of yellowing by thermal history became high. From Comparative Example 6-5 to Comparative Example 6-8, when a phosphite compound is different from the component (B) used in the resin composition of the present invention, it was confirmed that the degree of yellowing due to thermal history was high, and the crystallization temperature was slightly lowered. In general, when a thermal history such as granulation processing is repeated, the Izod impact strength of a molded article is lowered, and it was confirmed that the impact strength of a molded article using the resin composition of the present invention was not deteriorated due to thermal history and conversely was improved.

Examples 7-1 to 7-7 and Comparative Examples 7-1 to 7-2

0.05 parts by mass of a phenolic antioxidant (tetrakis[methylene-3-(3',5'-di-tert-butyl-4'-hydroxyphenyl)propionate]methane), 0.05 parts by mass of calcium stearate, and the resin additive composition described in Tables 13 and 14 were blended with 100 parts by mass of an impact copolymer {Prime Polymer Co., Ltd. product name "J708P", melt flow rate=45 g/10 min (2.16 kg×230° C. according to ISO standard 1133)}, mixed with 1,000 rpm×1 minute by a Henschel mixer, and then, using a twin screw extruder, granulation was carried out at an extrusion temperature of 230° C. After the granulated pellet was dried at 80° C. for 2 hours, granulation was repeated at an extrusion temperature of 230° C. using the same twin-screw extruder, and an influence on the melt flow rate (MFR) by the thermal history was evaluated. The unit of the blending amount in the Table is parts by mass. (13) MFR (g/10 min)

According to the ISO1133 standard, the obtained pellet was melted at 230° C., the weight of the molten resin extruded under a load of 2.16 kg was measured, and the discharge amount of the resin in terms of 10 minutes was taken as the melt flow rate (MFR: g/10 min).

TABLE 13

|  |  | Example 7-1 | Example 7-2 | Example 7-3 | Example 7-4 | Example 7-5 |
|---|---|---|---|---|---|---|
| (A)-1 |  | 0.0645 | 0.0625 | 0.06 | 0.06 | 0.06 |
| Comparative nucleating agent |  | — | — | — | — | — |
| (B)-1 |  | 0.0355 | 0.0375 | 0.04 | 0.04 | 0.04 |
| (E)-2 |  | 0.1 | 0.1 | 0.1 | 0.2 | 0.3 |
| (B)/(A) mass ratio |  | 0.55 | 0.6 | 0.67 | 0.67 | 0.67 |
| MFR. (g/10 min) | 1st granulation | 43 | 43 | 43 | 43 | 43 |
|  | 3rd granulation | 49 | 49 | 49 | 49 |  |
|  | 5th granulation | 55 | 55 | 55 | 55 | 55 |

(A)-1: Sodium-2,2'-methylene bis(4,6-di-tert-butyl phenyl)phosphate
Comparative nucleating agent: Sodium benzoate
(B)-1: Sodium stearate(E)-2: PEP-36(3,9-bis(2,6-di-tert-butyl-4-methyl phenoxy)-2,4,8,10-tetraoxa-3,9-diphosphaspiro[5.5]undecane

TABLE 14

|  |  | Example 7-6 | Example 7-7 | Comparative Example 7-1 | Comparative Example 7-2 |
|---|---|---|---|---|---|
| (A)-1 |  | 0.05 | 0.04 | — | — |
| Comparative nucleating agent |  | — | — | — | 0.06 |
| (B)-1 |  | 0.05 | 0.06 | — | 0.04 |
| (E)-2 |  | 0.1 | 0.1 | 0.1 | 0.1 |
| (B)/(A) mass ratio |  | 1.0 | 1.5 | — | — |
| MFR. (g/10 min) | 1st granulation | 43 | 44 | 43 | 45 |
|  | 3rd granulation | 49 | 50 | 48 | 53 |
|  | 5th granulation | 55 | 56 | 61 | 70 |

From the comparison result of Comparative Example 7-1 and Comparative Example 7-2, when the nucleating agent was different from the component (A) of the resin composition of the present invention, it was confirmed that when a thermal history was repeated, the MFR increased more than the resin composition without a nucleating agent, and on the other hand, from Examples 7-1 to 7-7, it was confirmed that when the olefin resin composition of the present invention was used, an increase in MFR value due to thermal history was suppressed.

As described above, the resin composition of the present invention provides an olefin resin composition excellent in discoloration prevention by thermal history and excellent in physical properties.

Examples 8-1 to 8-13 and Comparative Examples 8-1 to 8-11

0.05 parts by mass of a phenolic antioxidant (tetrakis [methylene-3-(3',5'-di-tert-butyl-4'-hydroxyphenyl)propionate]methane), 0.1 parts by mass of a phosphorus antioxidant (tris(2,4-di-tert-butylphenyl)phosphite), 0.05 parts by mass of calcium stearate, and 0.05 parts by mass of the resin composition described in the following Tables 15 to 18 were blended with 1,000 rpm×1 minute with a Henschel mixer, and then, using a twin-screw extruder, the mixture was kneaded under conditions of extrusion temperature=230° C., screw rotation speed=150 rpm, and feed rate=7.2 kg/h to prepare a pellet. Using the pellets, the following evaluations (14) to (16) were carried out. The unit of the blending amount in Tables 15 to 18 is parts by mass.

(14) Crystallization Temperature

A small amount of the obtained pellet was cut off and the crystallization temperature was measured using a differential scanning calorimeter (Diamond, manufactured by PerkinElmer Co., Ltd.). Regarding the measuring method, in a chart obtained by raising the temperature from room temperature to 230° C. at a rate of 50° C./min, holding the pellet for 10 minutes, and then cooling the pellet to 50° C. at a rate of 10° C./min, the temperature at which the endothermic reaction became the peak top was taken as the crystallization temperature.

(15) Flexural Modulus

The obtained pellet was injection-molded with an injection molding machine (EC100-2A; manufactured by TOSHIBA MACHINE CO., LTD.) under conditions of an injection temperature of 200° C. and a mold temperature of 50° C. to prepare a test piece of dimensions 80 mm×10 mm×4 mm, and immediately after molding, the test piece was placed in a thermostat at 23° C. and allowed to stand for 48 hours, the test piece was then taken out, and the flexural modulus (MPa) of the test piece was measured according to ISO 178.

(16) Flame Retardancy UL-94V Test

The obtained test piece for flame retardancy UL-94V test (127 mm×12.7 mm×1.6 mm) was kept vertical and a flame was removed after burning the burner for 10 seconds at the lower end thereof, and the time until which the fire ignited on the test piece disappeared was measured. Next, at the same time as the fire disappeared, a second flame was brought into contact for 10 seconds, and the time until the ignited flame disappeared was measured in the same manner as the first time. At the same time, it was also evaluated whether or not a cotton beneath a test piece was ignited by falling fire species. Based on the first and second burning times, the presence/absence of cotton ignition, or the like, the burning rank was assigned according to the UL-94V standard. Regarding the burning rank, V-0 is the most flame-retardant, flame retardancy decreased in the order of V-1 and V-2, and those not corresponding to any rank of V-0 to V-2 were NR.

TABLE 15

|  | Example 8-1 | Example 8-2 | Example 8-3 | Example 8-4 | Example 8-5 | Example 8-6 |
|---|---|---|---|---|---|---|
| Thermoplastic resin | 100 | 100 | 100 | 100 | 100 | 100 |

TABLE 15-continued

|  | Example 8-1 | Example 8-2 | Example 8-3 | Example 8-4 | Example 8-5 | Example 8-6 |
|---|---|---|---|---|---|---|
| (A)-1 | 0.028 | 0.035 | 0.042 | 0.056 | 0.070 | 0.084 |
| Comparative nucleating agent 1 | — | — | — | — | — | — |
| Comparative nucleating agent 2 | — | — | — | — | — | — |
| (B)-1 | 0.042 | 0.035 | 0.028 | 0.084 | 0.070 | 0.056 |
| (F)-1 | 38.9 | 38.9 | 38.9 | 38.9 | 38.9 | 38.9 |
| (F)-2 | — | — | — | — | — | — |
| (F)-3 | — | — | — | — | — | — |
| (F)-4 | — | — | — | — | — | — |
| (G)-1 | — | — | — | — | — | — |
| (G)-2 | — | — | — | — | — | — |
| (G)-3 | — | — | — | — | — | — |
| (B)/(A) mass ratio | 1.50 | 1.00 | 0.67 | 1.50 | 1.00 | 0.67 |
| Crystallization temperature (° C.) | 129.5 | 129.6 | 129.8 | 131.1 | 131.4 | 131.7 |
| Flexural modulus (MPa) | 1050 | 1050 | 1060 | 1150 | 1150 | 1150 |
| Flame retardancy UL-94V | V-0 | V-0 | V-0 | V-0 | V-0 | V-0 |

Thermoplastic resin: impact copolymer (product name "J705P" manufactured by Prime Polymer Co., Ltd., melt flow rate = 11.5 g/10 min (2.16kg × 230° C. according to ISO Standard 1133))
(A)-1: Sodium-2,2'-methylene bis(4,6-di-tert-butyl phenyl)phosphate
Comparative nucleating agent 1: Dicyclohexane-1, 2-dicarboxylic acid calcium compound
Comparative nucleating agent 2: Sodium benzoate
(B)-1: Sodium stearate(F)-1: Intumescent flame retardant; trade name (ADK STAB FP-2500S) manufactured by ADEKA CORPORATION
(F)-2: Intumescent flame retardant; trade name (ADK STAB FP-2100JC) manufactured by ADEKA CORPORATION
(F)-3: Ammonium polyphosphate
(F)-4: Decabromodiphenyl ethane
(G)-1: THEIC (tris(2-hydroxyethyl)isocyanurate)
(G)-2: Antimony trioxide
(G)-3: Polytetrafluoroethylene

TABLE 16

|  | Example 8-7 | Example 8-8 | Example 8-9 | Example 8-10 | Example 8-11 | Example 8-12 |
|---|---|---|---|---|---|---|
| Thermoplastic resin | 100 | 100 | 100 | 100 | 100 | 100 |
| (A)-1 | 0.087 | 0.089 | 0.063 | 0.071 | 0.071 | 0.063 |
| Comparative nucleating agent 1 | — | — | — | — | — | — |
| Comparative nucleating agent 2 | — | — | — | — | — | — |
| (B)-1 | 0.052 | 0.049 | 0.063 | 0.071 | 0.071 | 0.063 |
| (F)-1 | 38.9 | 38.9 | 25 | — | — | — |
| (F)-2 | — | — | — | 42.9 | — | — |
| (F)-3 | — | — | — | — | 34.3 | — |
| (F)-4 | — | — | — | — | — | 25 |
| (G)-1 | — | — | — | — | 8.6 | — |
| (G)-2 | — | — | — | — | — | — |
| (G)-3 | — | — | 0.25 | — | — | — |
| (B)/(A) mass ratio | 0.60 | 0.055 | 1.00 | 1.00 | 1.00 | 1.00 |
| Crystallization temperature (°C) | 131.4 | 131.3 | 131.5 | 131.3 | 131.2 | 131.5 |
| Flexural modulus (MPa) | 1150 | 1150 | 1170 | 1150 | 1150 | 1170 |
| Flame retardancy UL-94V | V-0 | V-0 | V-0 | V-0 | V-0 | V-0 |

TABLE 17

|  | Example 8-13 | Comparative Example 8-1 | Comparative Example 8-2 | Comparative Example 8-3 | Comparative Example 8-4 | Comparative Example 8-5 |
|---|---|---|---|---|---|---|
| Thermoplastic resin | 100 | 100 | 100 | 100 | 100 | 100 |
| (A)-1 | 0.063 | — | 0.070 | 0.140 | — | — |
| Comparative nucleating agent 1 | — | — | — | — | — | 0.070 |
| Comparative nucleating agent 2 | — | — | — | — | — | — |
| (B)-1 | 0.063 | — | — | — | 0.140 | 0.070 |
| (F)-1 | — | 38.9 | 38.9 | 38.9 | 38.9 | 38.9 |
| (F)-2 | — | — | — | — | — | — |
| (F)-3 | — | — | — | — | — | — |
| (P)-4 | 18.8 | — | — | — | — | — |
| (G)-1 | — | — | — | — | — | — |
| (G)-2 | 6.2 | — | — | — | — | — |
| (G)-3 | — | — | — | — | — | — |
| (B)/(A) mass ratio | 1.00 | — | — | — | — | — |
| Crystallization temperature (° C.) | 131.5 | 116.8 | 128.9 | 130.3 | 116.8 | 117.1 |
| Flexural modulus (MPa) | 1170 | 750 | 940 | 1010 | 750 | 790 |
| Flame retardancy UL-94V | V-0 | V-0 | V-0 | V-0 | V-0 | V-0 |

TABLE 18

|  | Comparative Example 8-6 | Comparative Example 8-7 | Comparative Example 8-8 | Comparative Example 8-9 | Comparative Example 8-10 | Comparative Example 8-11 |
|---|---|---|---|---|---|---|
| Thermoplastic resin | 100 | 100 | 100 | 100 | 100 | 100 |
| (A)-1 | — | 0.039 | 0.035 | — | — | — |
| Comparative nucleating agent 1 | — | — | — | 0.071 | 0.071 | 0.063 |
| Comparative nucleating agent 2 | 0.070 | — | — | — | — | — |
| (B)-1 | 0.070 | 0.100 | 0.104 | 0.071 | 0.071 | 0.063 |
| (F)-1 | 38.9 | 38.9 | 38.9 | — | — | — |
| (F)-2 | — | — | — | 42.9 | — | — |
| (F)-3 | — | — | — | — | 34.3 | — |
| (F)-4 | — | — | — | — | — | 25 |
| (G)-1 | — | — | — | — | 8.6 | — |
| (G)-2 | — | — | — | — | — | — |
| (G)-3 | — | — | — | — | — | — |
| (B)/(A) mass ratio | — | 2.56 | 3.00 | — | — | — |
| Crystallization temperature (° C.) | 127.0 | 130.7 | 130.2 | 127.0 | 127.1 | 127.1 |
| Flexural modulus (MPa) | 940 | 1120 | 1100 | 940 | 940 | 940 |
| Flame retardancy UL-94V | V-0 | V-0 | V-0 | V-0 | V-0 | V-0 |

By comparing Comparative Example 8-3 with Examples 8-7 and 8-8, it was confirmed that the resin additive composition of the present invention containing a blend of a phosphoric acid ester compound (A) represented by the general formula (1) and a fatty acid sodium salt (B) represented by the general formula (2) can impart more excellent physical properties than a resin composition in which the phosphoric acid ester compound (A) represented by the general formula (1) is singly blended.

From the above, it was confirmed that the resin composition of the present invention can obtain an excellent physical property improving effect with a flame retardant blended.

Examples 9-1 to 9-20 and Comparative Examples 9-1 to 9-5

0.05 parts by mass of a phenolic antioxidant (tetrakis[methylene-3-(3',5'-di-tert-butyl-4'-hydroxyphenyl)propionate]methane), 0.05 parts by mass of calcium stearate, and the resin additive composition described in Tables 19 to 23 were blended with 100 parts by mass of an impact copolymer {Prime Polymer Co., Ltd. product name "J705P", melt flow rate=11.5 g/10 min (2.16 kg×230° C. according to ISO standard 1133)}, mixed with 1,000 rpm×1 minute by a Henschel mixer, and then, using a twin screw extruder, granulation was carried out at an extrusion temperature of 230° C. to obtain a pellet. The unit of the blending amount in the Tables 19 to 23 is parts by mass.

(17) Crystallization Temperature [° C.]

The obtained pellet was broken into small pieces, weighed 5 mg, filled in an aluminum pan, and the crystallization temperature was measured with a differential scanning calorimeter (apparatus: Diamond manufactured by PerkinElmer Co., Ltd.). The measurement was carried out by raising the temperature to 230° C. at a rate of 50° C./min, holding the pieces for 5 minutes, and cooling the pieces to 50° C. at 10° C./min, the temperature of the measured exothermic peak was obtained as the crystallization temperature.

(18) Flexural Modulus [MPa]

The obtained pellet was injection-molded with an injection molding machine (EC100-2A; manufactured by TOSHIBA MACHINE CO., LTD.) under conditions of an injection temperature of 200° C. and a mold temperature of 50° C. to prepare a test piece of dimensions 80 mm×10 mm×4 mm, and immediately after molding, the test piece was placed in a thermostat at 23° C. and allowed to stand for 48 hours, the test piece was then taken out, and the flexural modulus (MPa) of the test piece was measured according to ISO 178.

TABLE 19

|  | Example 9-1 | Example 9-2 | Example 9-3 | Example 9-4 | Example 9-5 |
|---|---|---|---|---|---|
| Thermoplastic resin | 100 | 100 | 100 | 100 | 100 |
| (A)-1 | 0.0645 | 0.0625 | 0.06 | 0.05 | 0.04 |
| Comparative nucleating agent 1 | — | — | — | — | — |
| Comparative nucleating agent 2 | — | — | — | — | — |
| (B)-1 | 0.0355 | 0.0375 | 0.04 | 0.05 | 0.06 |
| (I)-1 | 0.15 | 0.15 | 0.15 | 0.15 | 0.15 |
| (I)-2 | — | — | — | — | — |
| (I)-3 | — | — | — | — | — |
| (I)-4 | — | — | — | — | — |
| (I)-5 | — | — | — | — | — |
| (I)-6 | — | — | — | — | — |
| (I)-7 | — | — | — | — | — |
| (I)-8 | — | — | — | — | — |
| (I)-9 | — | — | — | — | — |
| (I)-10 | — | — | — | — | — |
| (I)-11 | — | — | — | — | — |
| (I)-12 | — | — | — | — | — |
| (I)-13 | — | — | — | — | — |
| (I)-14 | — | — | — | — | — |
| (J)-1 | 0.10 | 0.10 | 0.10 | 0.10 | 0.10 |
| (J)-2 | — | — | — | — | — |
| (J)-3 | — | — | — | — | — |
| (B)/(A) mass ratio | 0.55 | 0.60 | 0.67 | 0.10 | 1.5 |
| Crystallization temperature (° C.) | 130.8 | 130.9 | 130.9 | 130.7 | 130.6 |
| Flexural modulus (MPa) | 1590 | 1600 | 1590 | 1590 | 1580 |

TABLE 20

|  | Example 9-6 | Example 9-7 | Example 9-8 | Example 9-9 | Example 9-10 |
|---|---|---|---|---|---|
| Thermoplastic resin | 100 | 100 | 100 | 100 | 100 |
| (A)-1 | 0.05 | 0.05 | 0.05 | 0.05 | 0.05 |
| Comparative nucleating agent 1 | — | — | — | — | — |
| Comparative nucleating agent 2 | — | — | — | — | — |
| (B)-1 | 0.05 | 0.05 | 0.05 | 0.05 | 0.05 |
| (I)-1 | — | — | — | — | — |
| (I)-2 | 0.15 | — | — | — | — |
| (I)-3 | — | 0.15 | — | — | — |
| (I)-4 | — | — | 0.15 | — | — |
| (I)-5 | — | — | — | 0.15 | — |
| (I)-6 | — | — | — | — | 0.15 |
| (I)-7 | — | — | — | — | — |
| (I)-8 | — | — | — | — | — |
| (I)-9 | — | — | — | — | — |
| (I)-10 | — | — | — | — | — |
| (I)-11 | — | — | — | — | — |
| (I)-12 | — | — | — | — | — |
| (I)-13 | — | — | — | — | — |
| (I)-14 | — | — | — | — | — |
| (J)-1 | 0.10 | 0.10 | 0.10 | 0.10 | 0.10 |
| (J)-2 | — | — | — | — | — |
| (J)-3 | — | — | — | — | — |
| (B)/(A) mass ratio | 1.00 | 1.00 | 1.00 | 1.00 | 1.00 |
| Crystallization temperature (° C.) | 130.6 | 130.6 | 130.6 | 130.6 | 130.5 |
| Flexural modulus (MPa) | 1590 | 1590 | 1580 | 1590 | 1580 |

TABLE 21

|  | Example 9-11 | Example 9-12 | Example 9-13 | Example 9-14 | Example 9-15 |
|---|---|---|---|---|---|
| Thermoplastic resin | 100 | 100 | 100 | 100 | 100 |
| (A)-1 | 0.05 | 0.05 | 0.05 | 0.05 | 0.05 |
| Comparative nucleating agent 1 | — | — | — | — | — |
| Comparative nucleating agent 2 | — | — | — | — | — |
| (B)-1 | 0.05 | 0.05 | 0.05 | 0.05 | 0.05 |
| (I)-1 | — | — | — | — | — |
| (I)-2 | — | — | — | — | — |
| (I)-3 | — | — | — | — | — |
| (I)-4 | — | — | — | — | — |
| (I)-5 | — | — | — | — | — |
| (I)-6 | — | — | — | — | — |
| (I)-7 | 0.15 | — | — | — | — |
| (I)-8 | — | 0.15 | — | — | — |
| (I)-9 | — | — | 0.15 | — | — |
| (I)-10 | — | — | — | 0.15 | — |
| (I)-11 | — | — | — | — | 0.15 |
| (I)-12 | — | — | — | — | — |

TABLE 21-continued

|  | Example 9-11 | Example 9-12 | Example 9-13 | Example 9-14 | Example 9-15 |
|---|---|---|---|---|---|
| (I)-13 | — | — | — | — | — |
| (I)-14 | — | — | — | — | — |
| (J)-1 | 0.10 | 0.10 | 0.10 | 0.10 | 0.10 |
| (J)-2 | — | — | — | — | — |
| (J)-3 | — | — | — | — | — |
| (B)/(A) mass ratio | 1.00 | 1.00 | 1.00 | 1.00 | 1.00 |
| Crystallization temperature (° C.) | 130.6 | 130.6 | 130.4 | 130.5 | 130.6 |
| Flexural modulus (MPa) | 1580 | 1580 | 1580 | 1580 | 1580 |

TABLE 22

|  | Example 9-16 | Example 9-17 | Example 9-18 | Example 9-19 | Example 9-20 |
|---|---|---|---|---|---|
| Thermoplastic resin | 100 | 100 | 100 | 100 | 100 |
| (A)-1 | 0.05 | 0.05 | 0.05 | 0.05 | 0.05 |
| Comparative nucleating agent 1 | — | — | — | — | — |
| Comparative nucleating agent 2 | — | — | — | — | — |
| (B)-1 | 0.05 | 0.05 | 0.05 | 0.05 | 0.05 |
| (I)-1 | — | — | — | 0.15 | 0.15 |
| (I)-2 | — | — | — | — | — |
| (I)-3 | — | — | — | — | — |
| (I)-4 | — | — | — | — | — |
| (I)-5 | — | — | — | — | — |
| (I)-6 | — | — | — | — | — |
| (I)-7 | — | — | — | — | — |
| (I)-8 | — | — | — | — | — |
| (I)-9 | — | — | — | — | — |
| (I)-10 | — | — | — | — | — |
| (I)-11 | — | — | — | — | — |
| (I)-12 | 0.15 | — | — | — | — |
| (I)-13 | — | 0.15 | — | — | — |
| (I)-14 | — | — | 0.15 | — | — |
| (J)-1 | 0.10 | 0.10 | 0.10 | — | — |
| (J)-2 | — | — | — | 0.10 | — |
| (J)-3 | — | — | — | — | 0.10 |
| (B)/(A) mass ratio | 1.00 | 1.00 | 1.00 | — | — |
| Crystallization temperature (° C.) | 130.6 | 130.5 | 130.6 | 130.6 | 130.6 |
| Flexural modulus (MPa) | 1580 | 1580 | 1580 | 1580 | 1580 |

TABLE 23

|  | Comparative Example 9-1 | Comparative Example 9-2 | Comparative Example 9-3 | Comparative Example 9-4 | Comparative Example 9-5 |
|---|---|---|---|---|---|
| Thermoplastic resin | 100 | 100 | 100 | 100 | 100 |
| (A)-1 | 0.025 | 0.10 | — | — | — |
| Comparative nucleating agent 1 | — | — | 0.05 | — | — |
| Comparative nucleating agent 2 | — | — | — | 0.05 | — |
| (B)-1 | 0.075 | — | 0.05 | 0.05 | — |
| (I)-1 | 0.15 | 0.15 | 0.15 | 0.15 | 0.15 |
| (I)-2 | — | — | — | — | — |
| (I)-3 | — | — | — | — | — |
| (I)-4 | — | — | — | — | — |
| (I)-5 | — | — | — | — | — |
| (I)-6 | — | — | — | — | — |
| (I)-7 | — | — | — | — | — |
| (I)-8 | — | — | — | — | — |
| (I)-9 | — | — | — | — | — |
| (I)-10 | — | — | — | — | — |
| (I)-11 | — | — | — | — | — |
| (I)-12 | — | — | — | — | — |
| (I)-13 | — | — | — | — | — |
| (I)-14 | — | — | — | — | — |
| (J)-1 | 0.10 | 0.10 | 0.10 | 0.10 | 0.10 |
| (J)-2 | — | — | — | — | — |
| (J)-3 | — | — | — | — | — |
| (B)/(A) mass ratio | 3.0 | — | — | — | — |
| Crystallization temperature (° C.) | 130.1 | 129.7 | 125.4 | 120.1 | 112.8 |
| Flexural modulus (MPa) | 1550 | 1560 | 1440 | 1260 | 1160 |

Thermoplastic resin: Impact copolymer product name "J705P" manufactured by Prime Polymer Co., Ltd., melt flow rate = 11.5 g/10 min (2.16 kg × 230° C. according to ISO Standard 1133)
(A)-1: Sodium-2,2'-methylene bis(4,6-di-tert-butyl phenyl)phosphate
Comparative nucleating agent 1: Milliken Chemical product name "Hyperform(R) HPN-20E"
Comparative nucleating agent 2: Sodium benzoate
(B)-1: Sodium stearate
(I)-1: Trade name "ADK STAB LA-77Y" manufactured by ADEKA CORPORATION
(I)-2: Trade name "ADK STAB LA-72" manufactured by ADEKA CORPORATION
(I)-3: Trade name "ADK STAB LA-52" manufactured by ADEKA CORPORATION
(I)-4: Trade name "ADK STAB LA-502" manufactured by ADEKA CORPORATION
(I)-5: Trade name "ADK STAB LA-63P" manufactured by ADEKA CORPORATION
(I)-6: Trade name "ADK STAB T-1640L" manufactured by ADEKA CORPORATION
(I)-7: Trade name "ADK STAB LA-81" manufactured by ADEKA CORPORATION
(I)-8: Trade name "ADK STAB LA-704" manufactured by ADEKA CORPORATION
(I)-9: Trade name "ADK STAB LA-40" manufactured by ADEKA CORPORATION
(I)-10: Trade name "ADK STAB LA-402" manufactured by ADEKA CORPORATION
(I)-11: Trade name "Chimassorb® 944" manufactured by BASF SE
(I)-12: Trade name "Chimassorb® 2020" manufactured by BASF SE
(I)-13: Trade name "Cyasorb® UV-3808PP5" manufactured by Cytec Industries, Inc.
(I)-14: Trade name "Tinuvin® XT-855FF" manufactured by BASF SE
(J)-1: Trade name "ADK STAB LA-36" manufactured by ADEKA CORPORATION
(J)-2: Trade name "ADK STAB LA-29" manufactured by ADEKA CORPORATION
(J)-3: Trade name "Cyasorb® UV-1164" manufactured by Cytec Industries, Inc.

By comparing Comparative Example 9-1 with Examples 9-1 to 9-5, when the mass ratio (B)/(A) exceeds the range of 0.55 to 2.0, a nucleating agent effect was poor. From Comparative Examples 9-3 and 9-4, when a nucleating agent different from the phosphoric acid ester compound represented by the general formula (1) is blended, and, from Comparative Example 9-2, even when the nucleating agent is the phosphate compound (A) represented by the general formula (1), when fatty acid sodium is not blended, a nucleating agent effect was poor.

On the other hand, it was confirmed that the thermoplastic resin composition of the present invention exhibits an excellent nucleating agent effect.

The invention claimed is:

1. A thermoplastic resin composition, comprising:
a thermoplastic resin;
a phosphoric acid ester compound (A) represented by the following general formula (1):

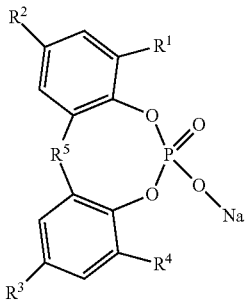

(1)

wherein $R^1$ to $R^4$ each independently represent a hydrogen atom or a linear or branched alkyl group having 1 to 9 carbon atoms, and $R^5$ represents an alkylidene group having 1 to 4 carbon atoms;

a fatty acid sodium salt (B) represented by the following general formula (2):

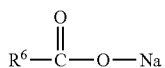

(2)

wherein $R^6$ represents a group introduced from an aliphatic organic acid having 7 to 30 carbon) atoms; and a phosphite compound (E) represented by the following general formula (3):

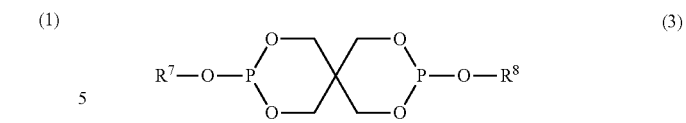

(3)

wherein $R^7$ and $R^8$ each independently represent an alkyl group having 1 to 40 carbon atoms or an aryl group having 6 to 40 carbon atoms;

wherein an amount of the phosphoric ester compound (A) represented by the general formula (1) is 0.001 to 10 parts by mass based on 100 parts by mass of the thermoplastic resin, wherein a ratio of the amount of the phosphoric acid ester compound (A) represented by the general formula (1) and an amount of the fatty acid sodium salt (B) represented by the general formula (2) is in the range of (B)/(A)=0.55 to 2.0 by mass ratio, and wherein the thermoplastic resin composition does not comprise a petroleum resin.

2. The thermoplastic resin composition according to claim 1 wherein the thermoplastic resin is a polyolefin resin.

3. The thermoplastic resin composition according to claim 1 further containing 1 to 80 parts by mass of a thermoplastic elastomer (C) and 1 to 80 parts by mass of a filler (D).

4. The thermoplastic resin composition according to claim 3, wherein the thermoplastic elastomer (C) is a copolymer of ethylene and an α-olefin or a copolymer of ethylene and a vinyl ester.

5. A molded article characterized by using the thermoplastic resin composition according to claim 1.

* * * * *